(12) United States Patent
Sutherland et al.

(10) Patent No.: US 12,229,234 B2
(45) Date of Patent: Feb. 18, 2025

(54) DATA MANAGEMENT SYSTEMS AND METHODS

(71) Applicant: SELF COMPLIANCE LTD., London (GB)

(72) Inventors: Dan Sutherland, London (GB); Sena Gbeckor-Kove, London (GB)

(73) Assignee: SELF COMPLIANCE LTD., London (GB)

( * ) Notice: Subject to any disclaimer, the term of this patent is extended or adjusted under 35 U.S.C. 154(b) by 329 days.

(21) Appl. No.: 17/786,551

(22) PCT Filed: Dec. 17, 2020

(86) PCT No.: PCT/GB2020/053255
§ 371 (c)(1),
(2) Date: Jun. 17, 2022

(87) PCT Pub. No.: WO2021/123783
PCT Pub. Date: Jun. 24, 2021

(65) Prior Publication Data
US 2023/0033192 A1 Feb. 2, 2023

(30) Foreign Application Priority Data
Dec. 17, 2019 (GB) .................................. 1918603

(51) Int. Cl.
*G06F 21/32* (2013.01)
*G06F 21/60* (2013.01)
*H04L 9/08* (2006.01)

(52) U.S. Cl.
CPC ............ *G06F 21/32* (2013.01); *G06F 21/602* (2013.01); *H04L 9/083* (2013.01); *G06F 2221/2141* (2013.01)

(58) Field of Classification Search
CPC ...... G06F 21/32; G06F 21/602; G06F 21/604; G06F 2221/2141; H04L 9/083
See application file for complete search history.

(56) References Cited

U.S. PATENT DOCUMENTS

2019/0114626 A1\* 4/2019 Pogorelik ........... G06F 16/1824
2019/0164156 A1\* 5/2019 Lindemann ........ G06Q 20/4016
(Continued)

*Primary Examiner* — Sangseok Park
(74) *Attorney, Agent, or Firm* — Adam Warwick Bell

(57) ABSTRACT

A data management system (1) for securely managing data transactions comprises a computing system which incorporates, a public key distribution system, a trusted storage system which is in communication with the public key distribution system, the trusted storage system being configured to store a record for each respective party using the system, each record comprising a unique identifier and a public key for a respective party using the system. The system (1) comprises a verification system which is configured to check the identity of a party seeking to participate in a transaction involving an exchange of data. If the verification system is not able to verify the identity of the party seeking to participate in the transaction, the verification system prevents the transaction from being carried out. If the verification system is able to verify the identity of the party seeking to participate in the transaction, the verification system permits the transaction to be carried out and the trusted storage system stores a transaction record comprising a record of the transaction and a record of the party participating in the transaction.

8 Claims, 30 Drawing Sheets

(56) References Cited

U.S. PATENT DOCUMENTS

| | | | |
|---|---|---|---|
| 2021/0176075 A1* | 6/2021 | Chu | ................ H04L 9/3247 |
| 2021/0279731 A1* | 9/2021 | Agrawal | ............ G06Q 20/322 |

\* cited by examiner

DATA MANAGEMENT SYSTEMS AND METHODS

FIELD

The present invention relates to data management systems and methods. The present invention more particularly relates to data management system for securely managing data transactions between client devices.

BACKGROUND

Conventional Internet-based communication does not allow users and other entities to share data freely with others in a secure manner. This leads to the risks, fears and uncertainty that are inherent in conventional Internet-based communication.

For example, conventional Internet-based communication makes it very difficult for parents to protect their children from viewing content or playing games that are not age appropriate. This limits the children from having the freedom to explore and benefit from Internet-based technologies.

It is also very difficult or impossible to share personal data safely over conventional Internet-based communication because there is always a risk that the personal data may be shared more widely than the intended recipients. The way personal data is processed in a connected world is not good for anyone. Capturing personal data, storing it and analysing it all carry an inherent risk for the user and for the organisation. Furthermore, measures designed to make the connected world safer have made the user experience worse and negatively impacted an organisation's ability to communicate with users.

Further problems arise due to modern "big-data" and machine learning (ML) based targeting methods which rely on the asymmetric nature of the relationship between "Big Tech" service providers and the end-users utilising their services. In essence, this results in a massively asymmetric tension between a user who wishes to simply use a service and who has only their own brain, attention and knowledge to protect their data (assuming they are even aware of the risks) and the big tech players who bringing massive amounts data, statistical and ML analysis and manpower to bear on each individual in an attempt to monitor and change their behaviour, usually towards a transaction (but sometimes in order to change their perceptions).

Even current systems which rely on biometrics for improved security suffer problems. For instance, current systems only provide black box proof of a biometric check having been done. In these systems, there is no explicit proof that the check was performed by the same individual. This means, for example, that fingerprint and face recognition on a mobile device can be bypassed relatively easily by adding another fingerprint or face regardless of who they belong to.

The conventional approach for verifying the identity of a user involves the user providing an identity document as evidence of their identity. For instance, a user wishing to verify their identity will typically provide a government issued identity document, such as a passport or driving licence in order to verify their identity.

Conventional arrangements which rely on an identity document are open to abuse by anyone who is able to create and use a fake identity documents.

Online transactions are also vulnerable to abuse by malicious parties creating and using fake identities. To combat this abuse, conventional systems typically attempt to recreate an online equivalent digital identity for a government issued document, such as a passport or driving licence. However, this approach is also vulnerable to abuse by malicious parties who can create fake versions of these digital identities.

There is a need for improved data management systems and methods.

The present invention seeks to provide improved data management systems and methods.

SUMMARY

According to one aspect, there is provided a data management system for securely managing data transactions, the system comprising a computing system which incorporates: a public key distribution system which is configured to distribute a public key of a public/private key pair for each respective party using the system; a trusted storage system which is in communication with the public key distribution system, the trusted storage system being configured to store a record for each respective party using the system, each record comprising a unique identifier and a public key for a respective party using the system; and a verification system which is in communication with the public key distribution system and the trusted storage system, the verification system being configured to check the identity of a party seeking to participate in a transaction involving an exchange of data, wherein: if the verification system is not able to verify the identity of the party seeking to participate in the transaction, the verification system prevents the transaction from being carried out, and if the verification system is able to verify the identity of the party seeking to participate in the transaction, the verification system permits the transaction to be carried out and the trusted storage system stores a transaction record comprising a record of the transaction and a record of the party participating in the transaction.

In some examples, the system comprises a plurality of computing systems which are configured to communicate with one another across a computing network, wherein each computing system of the plurality of computing systems is a computing system according to the computing system of claim 1.

In some examples, each computing system is a computing system of a type selected from a group including, a mobile device, a smartphone, a smartwatch, a health tracker, a fitness tracker, a tablet computer, a laptop computer, a desktop computer, a server or a virtual server.

In some examples, the plurality of computing systems comprise different types of computing systems.

In some examples, the trusted storage system of each computing system is part of a distributed trusted storage system which is configured to store data across the plurality of computing systems.

In some examples, the distributed trusted storage system is a blockchain or a distributed ledger.

In some examples, wherein the trusted storage system of each computing system is part of an immutable storage system or part of an immutable database.

In some examples, the system further comprises: a trusted agent which is in communication with the verification system, the trusted agent being identified by a trusted agent identifier which is pseudonymous or anonymous with respect to a party using the system or a computing system of the system, wherein the trusted agent is configured to provide an output to the verification system in relation to a transaction on behalf of a party using the system or a computing system of the system.

In some examples, the verification system is configured to calculate a trust score which is indicative of a level of trust between a first party and a second party based on a public key of the second party, wherein the trust score is a first value if the verification system verifies the public key of the second party successfully and the trust score is a second value if the verification system cannot verify the public key of the second party, and the trusted storage system is configured to store the trust score.

In some examples, the verification system is configured to parse data stored by the trusted storage and generate a graph of nodes corresponding to parties and edges connecting the nodes, each edge representing a trust score of a trust relationship between two nodes.

In some examples, the verification system is configured to traverse the graph and calculate an aggregated trust score based on trust scores represented by a plurality of the edges.

In some examples, the verification system is configured to check the identity of a party based on the result of a biometric check.

In some examples, the computing system further comprises: a processor; a behavioural data generator which is configured to generate behavioural data in response to the use of the computing system by a party; and a memory storing executable instructions which, when executed by the processor, cause the processor to: store, in the memory, a first block of behavioural data which is generated by the behavioural data generator over a first predetermined length of time; store, in the memory, a second block of behavioural data which is generated by the behavioural data generator over a second predetermined length of time; compare the second block of behavioural data with the first block of behavioural data; generate a surety score based on a similarity between the second block of behavioural data and the first block of behavioural data, wherein the surety score is selected from a range of values, one end of the range of values being indicative of the second block of behavioural data being similar to the first block of behavioural data and the other end of the range of values being indicative of the second block of behavioural data being dissimilar to the first block of behavioural data; and transmit an output to the verification system for the verification system to check the identity of the party using the computing system, wherein the output is indicative of: a verification of the identity of the party if the surety score is beyond a predetermined surety threshold, or a failure in the verification of the party if the surety score is not beyond the predetermined surety threshold.

In some examples, the behavioural data generator comprises at least one sensor which is selected from a group including: a location sensor configured to sense the geographical location of the computing system; a camera configured to capture still images and/or video; a gyroscope configured to sense an orientation of the computing system; or an accelerometer configured to sense an acceleration of the computing system.

In some examples, the behavioural data generator is configured to generate behavioural data comprising at least one of: walking cadence data indicative of the walking cadence of a user walking while carrying the computing system; typing cadence data indicative of the typing cadence of a user typing characters into a keyboard of the computing system; typing rhythm data statistically derived from the rhythm with which a user enters information into the computing system via a keyboard; or retinal saccade data indicative of a retinal saccade pattern of a user.

In some examples, the behavioural data generator is configured to generate behavioural data comprising at least one of: operating system analytics data indicative of the use of an operating system of the computing system by a user; application usage data indicative of the use of at least one executable application installed in a memory in the computing system; keystore access data indicative of the access to an encryption key stored in a memory of the computing system; vocabulary usage data indicative of the vocabulary used by a user inputting words into the computing system; or transaction data indicative of a transaction performed by the user using the computing system.

In some examples, the behavioural data generator is configured to generate behavioural data comprising network data by scanning computer networks which are accessible by the computing system.

In some examples, the computing system comprises: an encryption system which is configured to encrypt behavioural data generated by the behavioural data generator; and a biometrically gated memory which is configured to store encrypted behavioural data generated by the encryption system.

In some examples, the computing system comprises: a liveness score generator which is configured to generate a liveness score for a party based on at least one of: behavioural biometric data generated following the use of the computing system by the party, or the length of time since the party successfully accessed a biometrically gated system of the computing system.

In some examples, the first predetermined length of time is greater than the second predetermined length of time.

In some examples, the first predetermined length of time is between 0.5 hours and 24 hours.

In some examples, the computing system comprises at least one of a fingerprint scanner, a voice recognition system, a facial recognition system or a retinal saccade pattern recognition system.

According to another aspect, there is provided a data management method for securely managing data transactions, the method comprising: distributing, using a public key distribution system, a public key of a public/private key pair for each respective party involved in a transaction; storing a unique identifier and a public key for each respective party in a trusted storage system; and checking the identity of a party seeking to participating in a transaction involving an exchange of data, wherein: if the identity of the party seeking to participate in the transaction cannot be verified, the method prevents the transaction from being carried out, and if the identity of the party seeking to participate in the transaction can be verified, the method permits the transaction to be carried out and the method stores a transaction record comprising a record of the transaction and a record of the party participating in the transaction.

In some examples, the method comprises: providing a trusted agent which is identified by a trusted agent identifier, the trusted agent identifier being pseudonymous or anonymous with respect to a party seeking to participating in a transaction, wherein the method further comprises: providing, on behalf of the party, an output from the trusted agent in relation to the transaction.

In some examples, the method comprises: performing pattern recognition on a party; generating pattern recognition data; and verifying the generated pattern recognition data at the trusted agent by transmitting a query based on the generated pattern recognition data to the trusted agent.

In some examples, the method comprises: training a pattern recognition model for a party by repeatedly: performing pattern recognition on a party; generating pattern recognition data; and verifying the generated pattern recognition data at the trusted agent by transmitting a query based on the generated pattern recognition data to the trusted agent.

In some examples, the method comprises performing at least one type of pattern recognition selected from a group including fingerprint recognition, voice recognition, facial recognition, or retinal saccade pattern recognition.

In some examples, the method comprises: calculating a trust score which is indicative of a level of trust between a first party and a second party based on a public key of the second party, wherein the trust score is a first value if the method verifies the public key of the second party successfully and the trust score is a second value if the method cannot verify the public key of the second party, wherein the method further comprises: storing the trust score in the trusted storage system.

In some examples, the method comprises: parsing data stored by the trusted storage; and generating a graph of nodes corresponding to parties and edges connecting the nodes, each edge representing a trust score of a trust relationship between two nodes.

In some examples, the method comprises: traversing the graph and calculating an aggregated trust score based on trust scores represented by a plurality of the edges.

In some examples, the method comprises: storing, in a memory, a first block of behavioural data which is generated by a behavioural data generator of a computing system in response to the use of the computing system by a party over a first predetermined length of time; storing, in the memory, a second block of behavioural data which is generated by the behavioural data generator of the computing system in response to the use of the computing system over a second predetermined length of time; comparing the second block of behavioural data with the first block of behavioural data; generating a surety score based on a similarity between the second block of behavioural data and the first block of behavioural data, wherein the surety score is selected from a range of values, one end of the range of values being indicative of the second block of behavioural data being similar to the first block of behavioural data and the other end of the range of values being indicative of the second block of behavioural data being dissimilar to the first block of behavioural data; and providing an output which is indicative of: a verification of the identity of the party if the surety score is beyond a predetermined surety threshold, or a failure in the verification of the party if the surety score is not beyond the predetermined surety threshold.

In some examples, the method comprises: incrementing a token register by a predetermined number of tokens if the surety score is beyond the predetermined surety threshold for a predetermined interval of time.

In some examples, the method comprises: selecting the predetermined number of tokens in response to a security configuration of the computing system.

According to another aspect, there is provided a computer program having instructions which, when executed by a computing system, cause the computing system to perform a method as disclosed herein.

According to another aspect, there is provided a computer-readable medium storing a computer program according to a system or method as disclosed herein.

According to another aspect, there is provided a computer-implemented method for authenticating a party involved in a transaction, the method comprising: storing, in a memory, a first block of behavioural data which is generated by a functional module of a computing device in response to the use of the computing device by a party over a first predetermined length of time; storing, in the memory, a second block of behavioural data which is generated by the functional module of the computing device in response to the use of the computing device over a second predetermined length of time; comparing the second block of behavioural data with the first block of behavioural data; generating a surety score based on a similarity between the second block of behavioural data and the first block of behavioural data, wherein the surety score is selected from a range of values, one end of the range of values being indicative of the second block of behavioural data being similar to the first block of behavioural data and the other end of the range of values being indicative of the second block of behavioural data being dissimilar to the first block of behavioural data; and authenticating the party to participate in a transaction if the surety score is beyond a predetermined surety threshold, or blocking the party from participating in the transaction if the surety score is not beyond the predetermined surety threshold.

In some examples, the computing device is a mobile device selected from a group including a smartphone, a smartwatch, a health tracker, a fitness tracker, a tablet computer or a laptop computer.

In some examples, the functional module of the computing device comprises at least one sensor which is carried by the computing device and the method comprises using the at least one sensor to generate at least one of: location data indicative of the geographical location of the computing device; image data captured by a camera carried by the computing device; video data captured by a camera carried by the computing device; gyroscope data captured by a gyroscope carried by the computing device; accelerometer data captured by an accelerometer carried by the computing device; walking cadence data indicative of the walking cadence of a user walking while carrying the computing device; typing cadence data indicative of the typing cadence of a user typing characters into a keyboard of the computing device; or typing rhythm data statistically derived from the rhythm with which a user enters information into the computing device via a keyboard.

In some examples, the computing device is a computing device selected from a group including a desktop computer, a server or a virtual server.

In some examples, the method comprises: generating, using the functional module, behavioural data comprising at least one of: operating system analytics data indicative of the use of an operating system of the computing device by a user; application usage data indicative of the use of at least one executable application installed in a memory in the computing device; keystore access data indicative of the access to an encryption key stored in a memory of the computing device; vocabulary usage data indicative of the vocabulary used by a user inputting words into the computing device; or transaction data indicative of a transaction performed by the user using the computing device.

In some examples, the method further comprises: generating, using the functional module, behavioural data comprising network data by scanning computer networks which are accessible by the computing device.

In some examples, the method further comprises: encrypting the behavioural data generated by the functional module; and storing the encrypted behavioural data in a biometrically gated memory within the computing device.

In some examples, the method further comprises: storing a unique identifier for identifying the party; and storing a link between the unique identifier and a public/private key pair.

In some examples, the method comprises storing the unique identifier and the public key of the public/private key pair in a block in a blockchain.

In some examples, if the method authenticates the party to participate in the transaction, the method comprising adding a new block to the blockchain, the new block comprising at least data indicative of the transaction and the unique identifier.

In some examples, the method further comprises: encrypting the private key and storing the encrypted private key in a memory of the computing device.

In some examples, authenticating a party to participate in a transaction comprises: receiving a credential provided by a third party involved in the transaction; signing the credential using the private key; and sending the signed credential to the third party to provide proof of the authentication of the party to the third party.

In some examples, the method comprises: receiving the credential when the credential is encoded and communicated via a QR code, near field communication (NFC), machine vision using optical character recognition (OCR), sub-audible audio, Bluetooth™, Wi-Fi™ or another transport medium for communicating the encoded credential.

In some examples, the method further comprises: generating a liveness score for the unique identifier based on at least one of behavioural biometric data generated following the use of the computing device by the party or the length of time since the party successfully accessed a biometrically gated feature of the computing device.

In some examples, if a party has not successfully accessed a biometrically gated feature of the computing device within a third predetermined period of time, the method comprises prompting a party to perform a biometric check using the computing device.

In some examples, the biometric check comprises at least one of a fingerprint check, a voice recognition check or a facial recognition check.

In some examples, the first predetermined length of time is greater than the second predetermined length of time.

In some examples, the first predetermined length of time is between 0.5 hours and 24 hours.

In some examples, the method provides a second-factor authentication in a two-factor authentication arrangement.

In some examples, the method further comprises: authenticating a delegated third party to participate in a transaction in response to the authentication of the party to participate in a transaction if the surety score is beyond the predetermined surety threshold.

In some examples, the method further comprises authenticating the party to participate in the transaction by providing a key within a public key infrastructure (PKI).

In some examples, the method further comprises: storing a copy of the first block of behavioural data in a backup memory.

In some examples, the method further comprises: encrypting or decrypting data for communication to a third party in response to the authentication of the party to participate in the transaction if the surety score is beyond the predetermined surety threshold, or blocking the party from encrypting or decrypting data for communication with the third party if the surety score is not beyond the predetermined surety threshold.

BRIEF DESCRIPTION OF THE DRAWINGS

So that the present invention may be more readily understood, embodiments of the present invention will now be described, by way of example, with reference to the accompanying drawings, in which.

DETAILED DESCRIPTION

Figure 1:
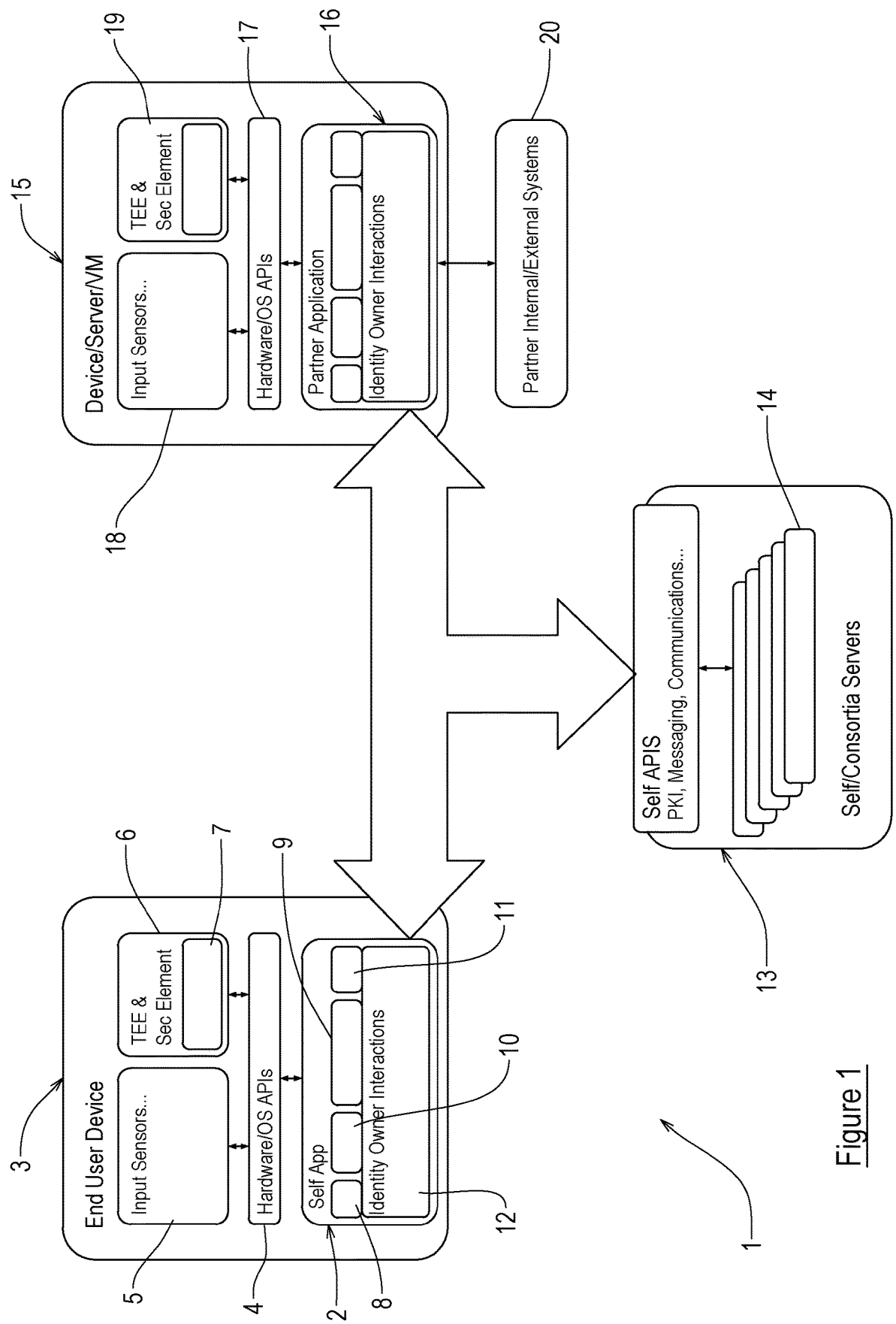
FIG. 1 is a schematic diagram of part of a system of some examples of this disclosure.

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

The following disclosure provides many different embodiments, or examples, for implementing different features of the provided subject matter. Specific examples of components, concentrations, applications and arrangements are described below to simplify the present disclosure. These are, of course, merely examples and are not intended to be limiting. For example, the attachment of a first feature and a second feature in the description that follows may include embodiments in which the first feature and the second feature are attached in direct contact, and may also include embodiments in which additional features may be positioned between the first feature and the second feature, such that the first feature and the second feature may not be in direct contact. In addition, the present disclosure may repeat reference numerals and/or letters in the various examples. This repetition is for the purpose of simplicity and clarity and does not in itself dictate a relationship between the various embodiments and/or configurations discussed.

The following disclosure describes representative examples. Each example may be considered to be an embodiment and any reference to an "example" may be changed to "embodiment" in the present disclosure.

Self Summary

The following disclosure includes examples and use cases of the data management systems and methods which are referred to collectively as "Self". In some embodiments, the data management systems and methods are implemented in the form of a network, also known as the "Self Network".

As will become clear from the following examples, Self is a trusted, secure network which allows parties (e.g. people or companies) to identify each other, authenticate and share verified data in real-time. In some examples, there is no central store of personal data, instead the Self Network connects verified data held by users which they store on their computing devices (e.g. smartphones). The Self Network seeks to give users visibility and control of who has data about them and organisations certainty that the information they receive is accurate.

The Self Network seeks to solve at least the following problems:
1. knowing who a user or organisation is dealing with—identity in real-time and;
2. knowing what data can be trusted—facts that could be shared in real-time.

In some examples of this disclosure, Self is a Network across which its Members can share Facts which have been verified independently and which can be trusted to be true. Analogous to a huge distributed database, Self makes permissioned verified data stored locally by Members accessible to other Members on the Network.

Members create accounts which incorporate any number of verifiable Facts that are stored on any computing device (for example, but not limited to; smartphone, computer, Tablet, Car, Watch). This personal data is then under the control of the person it relates to and not, as has previously been the case, under the control of the data controller in the organisation which might have collected data. When data is shared by a Member it is shared under a contract with a defined purpose and term.

Self Members can be people, organisations and things, both physical and virtual. Self Member accounts are built by incorporating Facts about the Member along with the behaviour of the Member and other Entities which interact with the Member. Trust and surety are provided by the frequent checking of the Member Identity (behavioural, biometric and by control of keys) as well as the real-time nature of the Network (provided by Self's real-time PKI infrastructure, end-to-end encrypted messaging layer and distributed Web of Trust).

Unlike other trust or verification systems, in some examples, the Self Network facilitates on-demand transactional checking of Facts and allows all participating Entities to be sure of the Identity of all parties to a transaction through constant reinforcement and Identity checking every time a transaction is performed.

In some examples of this disclosure, by integrating the above elements, Self puts people in control of their personal data and enables organisations to get access to accurate permissioned information about their users to facilitate frictionless interactions and trust online and in the real world.

The following disclosure describes systems and methods which implement at least some of the elements of Self described above. Initially, examples of systems and methods for authenticating parties involved in a transaction are described. The disclosure then describes other examples and use cases of Self. However, this disclosure is not intended to limit elements of the systems and methods to the described use cases or examples. The elements of any example may be combined with or interchanged with elements of other examples of this disclosure.

Authentication

The methods and systems of some examples seek to provide a proxy electronic identifier (referred to hereinafter as a SelfID) which enables trust between entities both online and in the real world. Unlike traditional systems, which generally attempt to recreate government-issued identity documents (passports, driving licenses, etc.), some examples seek to create an identity incorporating identity documents along with the behaviour of the user and other entities which interact with the user.

In the context of this disclosure:
- An identifier is a unique data identifier or string representing an Entity on the Self Network.
- Identity is the Fact of being who or what a person or Entity is.
- An issuer is a role an Entity can perform by asserting Claims about one or more subjects, creating a verifiable Credential from these Claims, and transmitting the verifiable Credential to a Holder.
- A licence is a grant of permission regarding data shared using the Self Network.
- A Member is the owner of an Identifier on the Self Network.
- A Mimir (or Oracle) is a smart contract or device which acts as a Proxy for the owning Identifier. The smart contract communicates with other Entities on behalf of the proxied identifier.
- A presentation is data derived from one or more verifiable Credentials, issued by one or more Issuers, that is shared with a specific Verifier. A verifiable Presentation is a tamper-evident Presentation encoded in such a way that authorship of the data can be trusted after a process of cryptographic verification. Certain types of verifiable Presentations might contain data that is synthesized from, but does not contain, the original verifiable Credentials (for example, zero-knowledge proofs).
- A proof is a mechanism that verifies the identity and integrity of data. In Self Proofs take the form of signatures which are verified against the Self PKI A proxy is a Member or a Mimir with permission to act on behalf of a Member.

A repository is a secure storage arrangement, such as a storage vault or personal verifiable Credential wallet, that stores and protects access to Holders verifiable Credentials. On the Self Network a Personal Data Store, Application Data Store, Asset Data Store and Organisation Data Store are all Repositories.

Selective Disclosure is the ability of a Holder to make fine-grained decisions about what information to share.

The Self Network is a network of information composed of Entities, relationships and metadata regarding Entities and relationships. Entity and relationship metadata is stored in the Data Stores held on Clients.

A Subject is a thing about which Claims are made.

Validation is the assurance that a verifiable Credential or a verifiable Presentation meets the needs of a Verifier and other dependent stakeholders. This specification is constrained to verifying verifiable Credentials and verifiable Presentations regardless of their usage.

Verification is the evaluation of whether a verifiable Credential or verifiable Presentation is an authentic and timely statement of the Issuer or presenter, respectively. This includes checking that:

the Credential (or Presentation) conforms to the specification;

the proof method is satisfied;

Verification involves the checking of claims regarding the owning entity (for example a business) and provision of signed assertions by a trusted party A verifiable credential is a tamper-evident credential that has authorship that can be cryptographically verified.

A verifier is a role an Entity performs by receiving one or more verifiable Credentials, optionally inside a verifiable Presentation for processing. Other disclosures in the art might refer to this concept as a relying party.

An identity is a means for keeping track of entities across contexts. Digital identities enable tracking and customisation of entity interactions across digital contexts, typically using identifiers and attributes. Unintended distribution or use of identity information can compromise privacy. Collection and use of such information should follow the principle of data minimisation (i.e. the act of limiting the amount of shared data strictly to the minimum necessary to successfully accomplish a task or goal). In some examples, the data minimisation is as defined in the General Data Protection Regulation (GDPR).

The methods and systems of some examples seek to implement a real-time public key infrastructure (PKI). Those skilled in the art are familiar with a PKI and how a PKI system or PKI functionality may be implemented in the systems and methods of this disclosure. Some examples provide an end to end encrypted messaging layer and a distributed web of trust, which is described in detail below.

As will be described below, methods and systems of some examples seek to facilitate cheap, on-demand transactional checking of identity and allow all participating entities to be sure of the identity of other parties to a transaction. Trust and surety are provided by the frequent checking of the identity (both behavioural and by control of keys) as well as the real-time nature of the method and system (provided by the real-time end-to-end encrypted messaging).

Methods and systems of some examples seek to enable online and real world trust through constant reinforcement and identity checking every time a transaction is performed, regardless of the value of the transaction.

Referring initially to FIG. 1 of the accompanying drawings, a system 1 of some examples comprises a processing module 2 (system API) which is configured for operation within a computing system or device 3. In this example, the computing device 3 is a smartphone. However, in other examples, the computing device 3 is any general purpose computing device or system including, but not limited to a mobile computing device, a smartwatch, a health tracker, a fitness tracker, a tablet computer or a laptop computer. In other examples, the computing device is a computing device selected from a group including a desktop computer, a server or a virtual server. The computing device 3 comprises a processor and a memory. In some examples the computing device 3 comprises a display screen, such as a touchscreen. The computing device 3 comprises an operating system 4 which executes on hardware of the computing device 3 and is configured to control the operation of the computing device 3 and to communicate data to and from the processing module 2.

The computing device 3 further comprises at least one functional module or behavioural data generator 5 which is configured to sense a parameter and to generate data indicative of the sensed parameter. The behavioural data generator 5 is configured to communicate the generated data and to receive a signal or data from the operating system 1 of the computing device 3.

In some examples, the behavioural data generator 5 comprises at least one sensor which is selected from a group including an electromagnetic sensor, a camera configured to capture image data and/or video data, a compass, an accelerometer, a gyroscope, a geolocation module (GPS, GLONASS, BDS, etc.), a keyboard, a touchscreen, a mouse, a cellular network module (GSM, 3/4/5G), a Wi-Fi™ module or a Bluetooth™ module. It is however, to be appreciated that the computing device 3 of some examples comprises other types of behavioural data generator which are configured to sense a parameter within the computing device or external to the computing device and to generate functional data for processing within the computing device 3.

The computing device 3 further comprises a secure storage module 6 which is configured to store data securely. In some examples, the computing device 3 is a smartphone which comprises a biometric sensor, such as a fingerprint reader, and the secure memory module 6 is encrypted or otherwise biometrically gated such that access to the data stored by the secure memory module 6 is only permitted after a user has input the correct biometric information via the biometric sensor.

In some examples, the secure memory module 6 is configured to store private keys for use within a PKI and/or mimir or oracle data for use within the system, as discussed in more detail below.

In some examples, the computing device 3 comprises a trusted execution environment (TEE) module instead of or in conjunction with the secure memory module 6. In the same or similar way to the secure memory module 6, the TEE module is, in some examples, encrypted and preferably biometrically gated to permit code to execute securely within the TEE module while minimising the risk of the code being tampered with or the execution intercepted by a malicious party.

The processing module 2 will now be described in more detail. The processing module 2 forms part of the authentication system for authenticating a party using the computing device 3.

The processing module 2 comprises a personal data store (PDS) which stores a user's claims (a claim is an assertion made about a subject), attestations and other personally identifiable information securely. The personally identifiable information stored by the PDS is only shared by the system under explicit licence for usage agreed at the time of sharing and attached to any instance of information being shared with another entity.

In the context of this disclosure, an entity is a thing with distinct and independent existence, such as a person, organisation, or device that performs one or more roles in the Self Network.

In the context of this disclosure, a holder is a role an entity might perform by possessing one or more verifiable Credentials and generating Presentations from them. A holder is usually, but not always, a Subject of the verifiable Credentials they are holding. Holders store their Credentials in credential Personal Data Stores or their equivalents depending on the Entity type.

In some examples, the processing module 2 further comprises a private key storage module line which is configured to store a user's private keys and/or Mimirs/oracles securely in an encrypted form, for instance in a biometrically gated memory. The system is configured such that a user's private keys are protected and that the private keys preferably never leave the computing device 3.

Individual Client—Individual Identity

In some examples, all individual related key operations are performed from a computing device or mobile device. An identity's private keys never leave the device and are protected by the encryption of the secure element where available.

The mobile client stores the user's Claims, Attestations and other data securely in its Personal Data Store PDS. This data is only shared by the user based on the principle of Selective Disclosure under explicit licence for usage agreed at the time of sharing and attached to any instance of information being shared with another Entity.

Organisation Clients—Organisation Identifiers

Organisation Clients are analogous to Individual Clients, but run as executable applications on an organisation's computing infrastructure. Organisation Clients allow organisational Entities (for example companies or partnerships) to be given an Identifier which can act inside the Self Network. Organisational Identifiers (depending on business rules) can either act directly, or through delegation.

In the case of direct action, an organisation's cryptographic keys are allowed to digitally sign attestations.

In the case of delegated operations, an organisation's keys are only able to perform limited operations, specifically those pertaining to the addition or removal of delegates to an ACL. Other operations must be performed by a delegate directly whilst presenting proof of authority by presenting a valid certificate chain along with any operation which uses the delegated authority.

Delegates can be any of the identifier types including but not limited to (Individual, Organisation, Application). Delegations can be re-delegated by adding to the delegation certificate chain.

Organisation Identifiers are created in the same manner as application Identifiers and have the same requirements regarding KYB/KYC.

Application Clients—System Identifiers

Applications represent automatic systems (websites, IOT devices or any autonomous or semi-autonomous system able to act, with or without human intervention.) Application Clients are analogous to both Individual and Organisational Clients in that they have and manage their own keys, except that they identify autonomous applications.

Application clients must be created by a Member (this permission can come from a delegation). That Member must be a verified individual (passed KYC) or organisation (passed KYB). Applications can be, either verified or unverified.

Applications can be verified or unverified, Verification of an application involves a trusted party attesting to the veracity of the application, and the organisation or individual in control of it. This takes the form of a KYC or KYB check. The KYB check is currently implemented via manual checks on data provided regarding the business and the confirmatory assertion is provided by Self. The confirmatory attestation could also be provided by any organisation trusted to provide such an attestation (Companies House, law firms, banks).

Assets

Assets represent non-autonomous Entities which must always be owned by one or more Members. Assets have their own Identifier, but are always operated upon by other controlling Entities (Individual, Organisations or Applications).

Assets consist of an Identifier and ownership key(s) belonging to the Member(s) owning the asset. Operations involving the asset, require the use of ownership key(s).

Depending on the type of asset; KYA (Know Your Asset) verification may be performed, for example by checking with manufacturer databases for assertions of authenticity. Asset Identifiers can be created by Members of any type.

Application Assets

Some Assets are capable of running Applications (e.g. smartphone or car) or of interacting with applications hosted elsewhere which operate upon them (Smart TV, IoT device). These Assets can have some degree of autonomy, depending on their type and use.

Fractional Ownership

Fractional ownership is supported through the recording of a fractional share for each owning Identity. These fractional shares are updated during changes of ownership.

Asset Data Store

Asset meta-data is recorded in an Asset Data Store (ADS) analogous to the PDS. Claims, Credentials, Proofs and Verifications are stored in a similar manner (currently as a subset of the owner(s) PDS Data). Changes to Asset Data can only be performed by Owners though the authority can be delegated. A transfer of Asset ownership requires a signature(s) from the owner(s). The ADS contains a chain of metadata and ownership change information forming an audit log of the history of the Asset. Derivations of this data (such as hashes) are persisted in the trusted storage.

Asset Checks

Asset checks return Asset Identifier and ownership information.

Asset Verification

Know Your Asset (KYA) Verification is dependent on Asset type. For example Assets such as vehicles will be verified through verifiable Credentials (government or manufacturer database correlation and assertion) stored in the ADS. Electronic Assets such as home appliances can similarly be verified through checks against manufacturer databases keyed on serial numbers.

Embedded Client

In some cases, organisations integrating the Self Network into their systems (e.g. banks) will not wish to ask their end-users to download a separate app and will instead wish to be able to integrate Self from within their own App.

In this scenario, the organisation can embed Self Client functionality within their host App. This is done by using the Embedded Self SDK which allows their host App to utilise the Self Network as if it were a Self Client. Self functionality sufficient to meet the needs of the Organisation will be available through an Embedded Self implementation.

The Embedded Self SDK

The Embedded Self SDK has the following capabilities:
1. Embeddable inside 3rd party apps
2. Capable of creating an Identifier
3. Capable of handling a limited set of operations for a specific entity (the embedding organisation) such as a bank.
   a. Create an Identifier
   b. Connect to existing Identifier
   c. Send and receive messages (M2M, P2M, P2P)
   d. Streaming communications: Voice/Video (m2m, p2m, p2p)

The embedded Self SDK is implemented as a Client on the Self Network, which provides support for end-users to access their Identifier from multiple clients.

As a Client the embedded Self instance:
1. Has a set of keys
2. As with a full Client addition of a Client is gated by Self Biometric to prevent compromise by device addition attacks.
3. Self Biometric's ability to tie Biometrics to users allows the system to be sure that the user adding a Client for an Identifier is the same User who registered originally.
4. If not the first Client, embedded Self is added as the nth device and generates its own keys which are signed by an existing set of device keys (gated by Self Biometrics)

If the Embedded Client is creating the Identifier then the Identifier Creation process is identical to the standard Self Client Registration If the Embedded Client is not the first Client it needs to be configured as an additional Client.

Adding a Client
1. Existing Client sends a signed request to the Self API.
2. The request must also be signed by the SelfBiometricMimir belonging to the user or be endorsed by another (configurable) method. (eg by an Organisation or an Authorised party such as a parent)

If the host application is not creating the Identifier then, the embedded application needs to communicate with an existing Identifier.

Communication between processes is carried out using encrypted interprocess communication (for example Intents for Android or App Extension semantics in iOS).

Self API

All interaction between entities on the Self Network is handled by Clients and Mimirs which interact via the exposed APIs providing the underlying Communication and PKI infrastructure.

The API operates according to the following policies

All operations performed against the API are metered and may be charged for.

All operations through the API allow for scoring. Current scoring involves the increment of a score value for whenever attestations are gained by an Entity.

All Entities using the Network rely on the underlying PKI and encrypted message delivery infrastructure.

All operations are digitally signed and have the signing certificates checked for validity before trusting the contents of the message envelope. Envelopes can contain other envelopes.

Returning now to FIG. 1, the processing module 2 further comprises a biometric data storage module 10 which is configured to store biometric data generated by biometric sensors within the computing device 3.

The processing module 2 further comprises a contact module 11 which is configured to store contacts data which specifies identities which are permitted to interact with one another. These identities may be individual organisation identities or application identities. The system is preferably configured such that only the processing module 2 is permitted to interact with all identities which are stored by the contacts module 11.

The processing module 2 further comprises a behavioural data module 12 which is configured to communicate with the other modules 8-11 of the processing module 2. The behavioural data module is configured to store, in a memory within the computing device 3, behavioural data which is generated by the behavioural data generator 5 in response to the use of the computing device 3 by a party. The behavioural data is data which is indicative of the use of the computing device 3 by a user. The behavioural data, therefore, acts as a fingerprint or other identifier which is linked to a user of the computing device 3. As will be described below, the behavioural data which is gathered over a period of time can be used as an identifier to identify a user and to authenticate that user based on continued use of the computing device 3.

The behavioural data module 12 is configured to store behavioural data representing user interactions within the computing device 3, such as, but not limited to, individual identity operations, behavioural biometrics, communications, encryption, assertions or verifications.

Verification is the evaluation of whether a verifiable credential or verifiable presentation is an authentic and timely statement of the issuer or presenter, respectively. This includes checking that: the credential (or presentation) conforms to the specification; the proof method is satisfied; and, if present, the status check succeeds.

A verifier is a role an entity performs by receiving one or more verifiable credentials, optionally inside a verifiable presentation for processing. This concept may also be known as a relying party.

In some examples, the processing module 2 is configured to communicate data to and from a communication module 13. The communication module 13 is preferably an external module from the computing device 3, such as a network-connected server. In some examples, the communication module 13 is configured to communicate using a PKI to enable secure messaging or other communication.

In some examples, the communication module 13 comprises at least part of a blockchain system 14 which is configured to store the information provided by the computing device 3 and other components within the system 1. Those skilled in the art are familiar with blockchain and distributed ledger technology and understand such trusted storage systems and methods may be implemented in the systems and methods of this disclosure.

The communication module 13 allows for communication between different components of the system 1 and the communication module 13 preferably performs a supporting role for the system 1, such as metering, authentication, validation and logging.

In some examples, the blockchain system 14 forms part of an underlying PKI infrastructure of the system 1. In some examples, the blockchain system 1 is configured such that the data within the blockchain system 1 is not directly accessible by a client since all interactions with the blockchain system are mediated through the communication module 13.

The computing device 3 is configured to communicate with a further computing device 15, with the communication between the computing device 3 and the further computing device 15 being controlled and logged by the communication module 13 in conjunction with the processing module 2.

In this embodiment, the further computing device 15 comprises many of the same elements as the computing device 3, such as a further processing module 16, a further operating system 17, a further behavioural data generator 18 and a further secure memory module 19.

In some examples, the further computing device 15, the computing device 3 and additional computing devices which are configured for use with the system are implemented in computer hardware, computer software or a combination of computer hardware and computer software.

In some examples, the further computing device 15 is configured to communicate with other partner internal or external systems 20.

The operation of the system 1 for authenticating a party involved in a transaction will now be described.

In order to authenticate a user of the computing device 3 who might wish to carry out a transaction via the computing device 3, such as a transaction involved with the secure communication of data with the further computing device 15. The computing device 3 stores, in a memory within the computing device 3, a first block of behavioural data which is generated by the behavioural data generator 5 in response to the use of the computing device 3 by the user over a first predetermined length of time. The first predetermined length of time is a length of time which is suitable for the system 1 to gather sufficient behavioural data such that the behavioural data is unique or substantially unique to one or more behaviours occurring when the user is using the computing device 3.

In some examples, the first predetermined length of time is between 0.5 hours and 24 hours. In some examples, the first predetermined length of time is variable between 0.5 hours and 24 hours and comprises one or more time intervals (e.g. 0.5 hour intervals) which, when added together, equate to the first predetermined length of time.

The behavioural data which is generated by the behavioural data generator 5 comprises at least one of:
  location data indicative of the geographical location of the computing device 3;
  image data captured by a camera carried by the computing device 3;
  video data captured by a camera carried by the computing device 3;
  gyroscope data captured by a gyroscope carried by the computing device 3; accelerometer data captured by an accelerometer carried by the computing device;
  walking cadence data indicative of the walking cadence of a user walking while carrying the computing device 3, the walking cadence data preferably being derived from at least one of gyroscope data or accelerometer data from a gyroscope and/or accelerometer carried by the computing device 3 (e.g. within a smartphone, smartwatch or a health/fitness tracker);
  typing cadence data indicative of the typing cadence of a user typing characters into a keyboard of the computing device 3; or
  typing rhythm data statistically derived from the rhythm with which a user enters information into the computing device 3 via a keyboard health data, such as heart rhythm data or cadence analysis data, which is generated by a wearable device (e.g. a health/fitness tracker or a smartwatch).

In some examples, the behavioural data generator 5 is configured to generate behavioural data comprising at least one of:
  operating system analytics data indicative of the use of an operating system of the computing device 3 by a user;
  application usage data indicative of the use of at least one executable application installed in a memory in the computing device 3;
  keystore access data indicative of the access to an encryption key stored in a memory of the computing device 3;
  vocabulary usage data indicative of the vocabulary used by a user inputting words into the computing device 3; or
  transaction data indicative of a transaction performed by the user using the computing device 3.

In some examples, the behavioural data generator 5 is configured to generate behavioural data comprising network data by scanning computer networks which are accessible by the computing device 3.

In some examples, the behavioural data generator 5 is configured to encrypt the behavioural data generated by the behavioural data generator 5 and store the encrypted behavioural data in a biometrically gated memory within the computing device 3.

In order to authenticate a user, the system is configured to store a second block of behavioural data which is generated by the behavioural data generator 5 in response to the use of the computing device over a second predetermined length of time. In some examples, the first predetermined length of time is greater than the second predetermined length of time. In some examples, the second predetermined length of time is between 1 minute and 30 minutes, between 1-2 hours or any length of time between 1 minute and 6 hours.

The system is configured to compare the second block of behavioural data with the first block of behavioural data. In some examples, the comparison is a comparison of one or more values pertaining to one or more specific behaviours represented by the behavioural data. For instance, in the case of behavioural data comprising walking data which is captured when a user is walking while carrying the computing device 3, the comparison preferably involves comparing the inferred stride length, footfall rhythm and/or height of steps (within a configurable tolerance) to previously recorded values.

The system is configured to generate a surety score based on a similarity between the second block of behavioural data and the first block of behavioural data. The surety score is selected from a range of values, with one end of the range of values being indicative of the second block of behavioural data being similar to the first block of behavioural data and the other end of the range of values being indicative of the second block of behavioural data being dissimilar to the first block of behavioural data. In some examples, the surety score is a high score at an upper end of the range of values if the second block of behavioural data is similar to the first block of behavioural data and a low score if the second block of behavioural data is dissimilar to the first block of behavioural data.

The calculation of the surety score is dependent on the type or types of behavioural data that are being compared. In some examples, the surety score is calculated by overlaying the first and second blocks of behavioural data and calculating an amount of deviation between the two. In some examples, the surety score is calculated using a trained machine learning model.

The system is configured to authenticate the user to participate in a transaction if the surety score is beyond a predetermined surety threshold. Alternatively, the system is configured to block the user from participating in the transaction if the surety score is not beyond the predetermined surety threshold.

The predetermined surety threshold is a value in the range of values of the surety score and is set such that the surety score based on the comparison of the blocks of behavioural data falls above or below the predetermined surety threshold depending on the similarity between the blocks of behavioural data. The predetermined surety threshold, therefore, represents the degree of similarity between the blocks of behavioural data which must be met or exceeded in order for the system to authenticate the user.

In some examples, the surety score is calculated based on a comparison of the first block of behavioural with one or more other blocks of behavioural data. The one or more other blocks of behavioural data may comprise data captured at any earlier time or over a moving window of time.

As will be described in more detail below, the first block of behavioural data is a pseudonymous identifier (also known as a SelfID) which is assigned to an identity (e.g. a user) at creation. In some examples, the SelfID does not change for the life of an identity.

Since the behavioural data which is generated as a user uses the computing device 3 is unique or substantially unique to that use of the computing device 3 by the user, the comparison of the first and second blocks of behavioural data provides a robust authentication technique which is very difficult or impossible to be faked.

In some examples, the system is configured to generate a liveness score based on at least one of behavioural biometric data generated following the use of the computing device by a user or the length of time since the user successfully accessed a biometrically gated feature of the computing device 3. The function of the liveness score is described in more detail below.

In some examples, if a party has not successfully accessed a biometrically gated feature of the computing device 3 within a third predetermined period of time, the computing device 3 is configured to prompt the user to perform a biometric check (e.g. a fingerprint check, a voice recognition check or a facial recognition check) using the computing device 3.

The operation of the system 1 with a PKI (all or part of which may be integrated within the system 1) will now be described.

In some examples, the system is configured to store a unique identifier for a user, such as an 11 digit numeric code. The system is also configured to store a link between the unique identifier and a public/private key pair. The generation of the unique identifier and the key pair part is described in more detail below.

The system is configured to store the unique identifier and the public key of the public/private key pair in a blockchain, such as the blockchain which forms part of the blockchain system 14. The system is configured to add a new block to the blockchain if a user is authenticated by the system to participate in a transaction. The new block which is added to the blockchain comprises at least data indicative of the transaction and the unique identifier.

The private key of the public/private key pair associated with the unique identifier is stored securely in a memory of the computing device 3, such as the secure storage module 6 or the memory 9 within the processing module 2.

In some examples, the system is configured to authenticate a user to participate in a transaction by receiving a credential provided by a third party involved in the transaction, such as a further user of the further computing device 15.

A credential is a set of one or more claims made by an issuer. A verifiable credential is a tamper-evident credential with authorship that can be cryptographically verified. Verifiable credentials can be used to build verifiable presentations, which can also be cryptographically verified. The claims in a credential can be about different subjects.

The computing device 3 is configured to sign the credential using the user's private key and send the signed credential to the third party to provide proof of the authentication of the party to the third party.

In some examples, the system is configured to receive the credential when the credential is encoded and communicated via a QR code, near field communication (NFC), machine vision using optical character recognition (OCR), sub-audible audio, Bluetooth™, Wi-Fi™ or another transport medium for communicating the encoded credential.

In some examples, the system is configured to provide a second authentication factor in a two-factor authentication arrangement. This two-factor functionality is described in more detail below.

In some examples, the system is configured to authenticate a delegated third party to participate in a transaction in response to the authentication of the party to participate in a transaction if the surety score is beyond the predetermined surety threshold. This authentication and delegation functionality is described in more detail below.

In some examples, the system is configured to authenticate a user to participate in a transaction by providing a key within the PKI. The additional functionality provided by the PKI is described in more detail below.

In some examples, the system is configured to store a copy of the first block of behavioural data in a backup memory.

In some examples, the system is configured to encrypt or decrypt data for communication to a third party in response to the authentication of the party to participate in the transaction if the surety score is beyond the predetermined surety threshold, or blocking the party from encrypting or decrypting data for communication with the third party if the surety score is not beyond the predetermined surety threshold.

In some examples, Self comprises a data management system for securely managing data transactions. The system comprising a computing system which may be the the computing device 3 of the examples described above or any other general purpose computing system.

The computing system incorporates a public key distribution system which is configured to distribute a public key of a public/private key pair for each respective party using the system. The public key distribution system forms part of a PKI system. In further examples, the full functionality of a PKI system is implemented within the computing system.

The computing system incorporates a trusted storage system which is in communication with the public key distribution system. The trusted storage system is configured to store a record for each respective party using the system. Each record comprises a unique identifier and a public key for a respective party using the system.

The computing system incorporates a verification system which is in communication with the public key distribution system and the trusted storage system. The verification system is a module or other functional module implemented within the memory and processor arrangement of the computing system. The verification system is configured to check the identity of a party seeking to participate in a transaction involving an exchange of data. If the verification system is not able to verify the identity of the party seeking to participate in the transaction, the verification system prevents the transaction from being carried out. If, on the other hand, the verification system is able to verify the identity of the party seeking to participate in the transaction, the verification system permits the transaction to be carried out and the trusted storage system stores a transaction record comprising a record of the transaction and a record of the party participating in the transaction.

In some examples, the processor of the computing system transmits an output to the verification system for the verification system to check the identity of the party using the computing system. The output being indicative of a verification of the identity of the party if the surety score is beyond a predetermined surety threshold, or a failure in the verification of the party if the surety score is not beyond the predetermined surety threshold.

In some examples, the system (Self) comprises a plurality of computing systems which are configured to communicate with one another across a computing network. Each computing system of the plurality of computing systems is a computing system or computer device as described in the disclosure. The plurality of computing systems may be the same as one another or may comprise different types of computing systems.

In some examples, the trusted storage system of each computing system is part of a distributed trusted storage system which is configured to store data across the plurality of computing systems. In some examples, the distributed trusted storage system is a blockchain or a distributed ledger.

In some examples, the trusted storage system of each computing system is part of an immutable storage system or part of an immutable database. In other examples, the trusted storage system of each computing system is part of a mutable storage system or part of a mutable database. The trusted storage is easier to implement when using an immutable database than a mutable database. If a mutable database is used then the system is further configured with logic to prevent unauthorised changes.

In some examples, the system further comprises a trusted agent (also referred to in this disclosure as a Mimir or Oracle) which is in communication with the verification system. The trusted agent is identified by a trusted agent identifier which is pseudonymous or anonymous with respect to a party using the Self system or a computing system of the system. The trusted agent is configured to provide an output to the verification system in relation to a transaction on behalf of a party using the system or a computing system of the system.

In some examples, the verification system is configured to calculate a trust score which is indicative of a level of trust between a first party and a second party based on a public key of the second party. The trust score is a first value if the verification system verifies the public key of the second party successfully and the trust score is a second value if the verification system cannot verify the public key of the second party. The trusted storage system is configured to store the trust score (e.g. in a block on a blockchain).

In some examples, the verification system is configured to parse data stored by the trusted storage and generate a graph of nodes corresponding to parties and edges connecting the nodes, each edge representing a trust score of a trust relationship between two nodes. The verification system may also be configured to traverse the graph and calculate an aggregated trust score based on trust scores represented by a plurality of the edges.

In some examples, the verification system is configured to check the identity of a party based on the result of a biometric check.

In some examples, the behavioural data generator comprises at least one sensor which is selected from a group including a location sensor configured to sense the geographical location of the computing system; a camera configured to capture still images and/or video; a gyroscope configured to sense an orientation of the computing system; or an accelerometer configured to sense an acceleration of the computing system.

In some examples, the behavioural data generator is configured to generate behavioural data comprising at least one of walking cadence data indicative of the walking cadence of a user walking while carrying the computing system; typing cadence data indicative of the typing cadence of a user typing characters into a keyboard of the computing system; typing rhythm data statistically derived from the rhythm with which a user enters information into the computing system via a keyboard; or retinal saccade data indicative of a retinal saccade pattern of a user.

In some examples, the behavioural data generator is configured to generate behavioural data comprising at least one of operating system analytics data indicative of the use of an operating system of the computing system by a user; application usage data indicative of the use of at least one executable application installed in a memory in the computing system; keystore access data indicative of the access to an encryption key stored in a memory of the computing system; vocabulary usage data indicative of the vocabulary used by a user inputting words into the computing system; or transaction data indicative of a transaction performed by the user using the computing system.

In some examples, the behavioural data generator is configured to generate behavioural data comprising network data by scanning computer networks which are accessible by the computing system.

In some examples, the computing system comprises an encryption system which is configured to encrypt behavioural data generated by the behavioural data generator; and a biometrically gated memory which is configured to store encrypted behavioural data generated by the encryption system.

In some examples, the computing system comprises a liveness score generator which is configured to generate a liveness score for a party based on at least one of:
behavioural biometric data generated following the use of the computing system by the party, or the length of time since the party successfully accessed a biometrically gated system of the computing system.

In some examples, the computing system comprises at least one of a fingerprint scanner, a voice recognition system, a facial recognition system or a retinal saccade pattern recognition system.

In some examples, the computing system comprises a retinal saccade pattern recognition system. The retinal saccade pattern recognition system collects data either passively as a user is using a computing system or device, or in a targeted manner when a user performs specific actions. Examples of the collection of saccade pattern data for processing and recognition include any time the user is interacting with the device and where the user's gaze can be measured, either by using general-purpose hardware such as webcams, retinal imaging cameras, infra-red cameras, face recognising depth sensors or more specialised gaze tracking implementations such as those provided by Tobii (https://www.tobii.com/) etc.

Gaze pattern, (movement, frequency) when performing specified tasks (such as reading specific text or performing specific tasks such as liveness tests or reading a paragraph of text, or solving a puzzle can be measured and fingerprinted statistically. These saccade biometrics can then be used to identify individuals in the same way as other biometrics with the added advantage that they can be collected passively during use, without interrupting the user, unlike fingerprint recognitions and traditional liveness checks.

The method of operation of the system of some examples will now be described.

In some examples, a data management method for securely managing data transactions comprises distributing, using a public key distribution system, a public key of a public/private key pair for each respective party involved in a transaction. A unique identifier and a public key is stored for each respective party in a trusted storage system. The method checks the identity of a party seeking to participating in a transaction involving an exchange of data.

If the identity of the party seeking to participate in the transaction cannot be verified, the method prevents the transaction from being carried out. If, on the other hand, the identity of the party seeking to participate in the transaction can be verified, the method permits the transaction to be carried out and the method stores a transaction record comprising a record of the transaction and a record of the party participating in the transaction.

In some examples, the method comprises performing pattern recognition on a party, generating pattern recognition data and verifying the generated pattern recognition data at the trusted agent by transmitting a query based on the generated pattern recognition data to the trusted agent.

In some examples, the method comprises training a pattern recognition model for a party by repeatedly performing pattern recognition on a party, generating pattern recognition data and verifying the generated pattern recognition data at the trusted agent by transmitting a query based on the generated pattern recognition data to the trusted agent.

In some examples, the method comprises performing at least one type of pattern recognition selected from a group including fingerprint recognition, voice recognition, facial recognition, or retinal saccade pattern recognition.

Web of Trust

Figure 2:
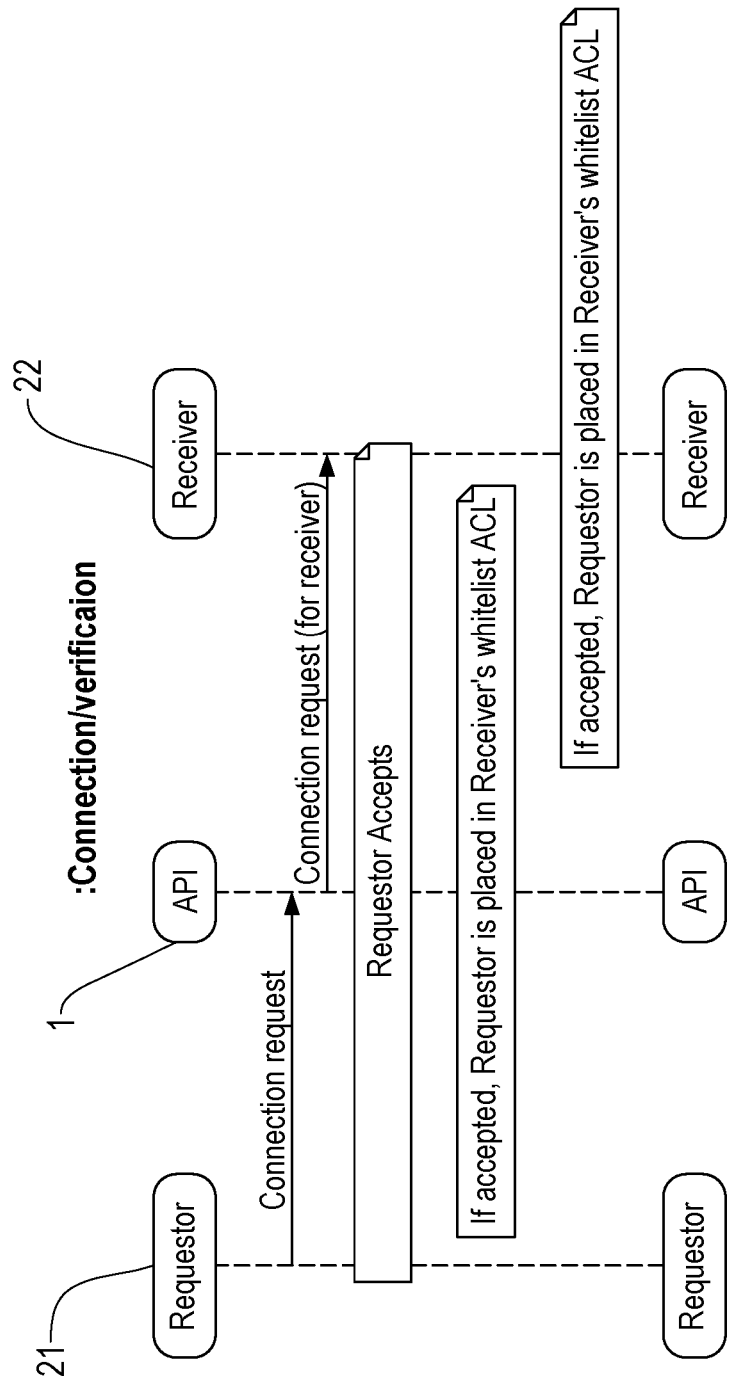
FIG. 2 is a flow diagram of a part of a method of some examples of this disclosure.

Referring to FIG. 2 of the accompanying drawings, a user (Requestor) 21 may use the system (API) to connect or verify a further user (Receiver) 22.

Users can select Members from their Web of Trust with whom they want to share data directly on a peer-to-peer basis. Each user's Client can combine that data into a feed of information about the user's Contacts.

In this manner a secure social network may be implemented, free of the requirement to operate a core platform or the need for users to expose data about themselves beyond their Web of Trust.

Unconstrained by purpose, the network is free to replicate natural human relationships contrasting with the need to silo those relationships into things like work, pleasure or faith as current social networks do.

Creating a Connection

Entities that wish to interact with each other need to have a trust relationship. The system 1 of some examples is configured to establish a Trust Relationship between the users (Identities) wishing to interact with each other. Trust Relationships are bi-directional and can be made in the following manner:

1. Requestor 21 sends a connection request addressed to a Receiver 22
2. Receiver 22 Accepts or Rejects the Request
3. If Accepted, the Receiver 22 is placed in a whitelist access control list (ACL) which is stored both on the computing device of the Requestor (Individual, Application or Organisation) and on a Server Side Whitelist in the Message Delivery subsystem of the system 1. This helps to mitigate denial of service (DOS) attacks against identities.

Trust Relationships can be destroyed. When a Trust Relationship is Removed/Rejected it is removed from the ACL whitelist.

Trusted Contacts sign each other's public keys, the relationship is bi-directional, with uni-directional connections signifying directed trust (signer to signee). When connecting to each other, Contacts sign each other's public key certificates on the blockchain. This creates a web of trust.

In some examples, the entire web of trust is visible to the system, while the clients can only see their own subset of the web of trust:

1. Contacts they trust
2. Contacts which trust them
3. Publicly visible Applications and Organisation (as these are published in a directory by the system).

The web of trust functionality of some examples is described in more detail below.

Organisation Clients—Organisation Identity

While the examples described above refer to a computing device for use by an individual user, other examples comprise a computing device which is used to identify an Organisation. An Organisation is analogous to a mobile client, but the modules are implemented using server hardware as opposed to a mobile device.

Organisation clients allow organisational entities (for example companies or partnerships) to be given an identity which can be used with the system. Organisational identities can either act directly, or through delegation.

In the case of direct action, the system permits the cryptographic keys of an Organisation to digitally sign attestations.

In the case of delegate action, the system only permits the cryptographic keys of an Organisation to perform limited operations, specifically those pertaining to the addition or removal of delegates to an ACL. Preferably, other operations must be performed by a delegate directly whilst presenting proof of authority by presenting a valid certificate chain along with any operation which uses the delegate authority.

Delegates can be any of the identity types including but not limited to (Individual, Organisation or Application).

Delegations can be delegated by adding to the delegation certificate chain.

Application Clients—System Identity

In some examples, the system is configured to interact with and/or authenticate Application Clients which represent automatic systems including, but not limited to, websites, Internet of things (IOT) devices or any autonomous or semi-autonomous system which is able to act with or without human intervention.

In the context of the system of some examples, Application clients are analogous to both Individual and Organisational clients in that they have and manage their own keys.

Application clients are preferably created by an owner. That owner is preferably a Verified Individual (e.g. an individual who has passed a know-your-client check (KYC)). Applications can be, either verified or unverified. Verification involves the checking of claims regarding the owning entity (for example a business) and provision of signed assertions by a trusted third party (e.g. the system itself, a government department, another company, etc.).

Asset Identity

In some examples, the system is configured to interact with and/or authenticate Asset Identities. Assets represent non-autonomous identities which must always have an owner or owners. Assets have their own identity, but are always acted upon by other controlling entities (Individual, Organisations or Applications).

Asset Identities comprise an identifier and at least one ownership key belonging to the owner(s) of the asset. Operations against the asset require the use of ownership key(s).

In some examples, fractional ownership is supported through the recording of a fractional share for each owning identity. These fractional shares are updated during changes of ownership.

In some examples, asset meta-data is recorded in an Asset Data Store (ADS) analogous to the PDS. Claims, Credentials, Proofs and Verifications may be stored in a similar manner (currently as a subset of PDS Data for Owner(s)). Changes to Asset Data can only be performed by Owners though the authority can be delegated.

Transfers of Asset ownership require signature(s) from owner(s). The ADS contains a chain of metadata and ownership change information forming audit log of the history of the Asset. Derivations of this data (such as hashes) are persisted in the blockchain/trusted storage.

In some examples, the system is configured to perform an asset check which returns an Asset ID and ownership information in connection with an asset.

In some examples, the system is configured to verify an asset in a Know Your Asset (KYA) Verification, with the KYA being dependent on the Asset type. For example, Assets such as Vehicles may be verified through Verifiable Credentials (government or manufacturer database correlation and assertion) stored in the ADS. Electronic equipment, such as Home Appliances, can similarly be verified through checks against manufacturer databases keyed on Serial numbers.

Trusted Storage

Trusted storage is used for persisting data and metadata for the Self Network, the immutability and non-repudiation of the data can be enhanced (as is currently the case) with the use of permissioned or non-permissioned Trusted Storage.

In some examples, the system comprises a PKI system with the Public Key repository being provided by a blockchain. Both permissioned and non-permissioned blockchains can be used in the system. In one embodiment, the blockchain system is a Hyperledger Fabric™ implementation behind an API.

In some examples, all operations are be signed using keys with the requisite permissions. Lookups for key verification are performed against the blockchain system which allow the system to operate based on centralised, de-centralised or consortium trust models.

The system of some examples operates according to the following tenets:

All operations performed against the API are metered and may be logged and charged for.

All operation through the API allow for scoring. Current scoring involves the increment of a score value for whenever attestations are gained by an individual user.

All Entities using the network use the underlying PKI and message delivery infrastructure to communicate using end-to-end (e2e) and transport encryption.

All operations are digitally signed and have the signing certificates checked for validity before trusting the contents of the message envelope.

Trusted Storage Contents

Self Identifier (Pseudonymous Identifier)

A Self account has a pseudonymous Identifier assigned to it at creation. The currently valid public and backup keys are stored in the trusted storage and can only be modified by an authorised Entity.

In some examples, the first block of behavioural data represents a pseudonymous identifier (SelfID) which is assigned to an identity at creation. The SelfID preferably does not change for the life of an identity. The currently valid public key and any Backup Keys are stored on the blockchain and can only be modified by an authorised identity. In some examples, the authorised entity is the owner of the identity and the owner of the system (this is due to the configuration of the permissioned blockchain of some examples).

Current Score

The current validity score is determined by the scoring algorithm (numerical). In some examples, the blockchain or trusted storage is configured to store a current Validity Score which represents the degree of validity of an identity as determined by a Scoring Algorithm.

Current Liveness

This represents whether the account in question is considered live. This is ascertained by how recently a verified (biometrically gated) operation has been performed on it (numerical).

Biometrically gated liveness checks are mandated when the behavioural biometric confidence falls below a threshold.

In some examples, the blockchain or trusted storage is configured to store a Current Liveness value which represents whether an identity is considered live. In some examples, the Current Liveness value is calculated based on how recently a verified (biometrically gated) operation has been performed on a computing device.

In some examples, the system is configured to require a biometrically gated liveness check when the behavioural biometric confidence (Current Liveness value) falls below a predetermined threshold.

PKI

Public Keys and ownership meta-data (in the case of Assets) are stored in the trusted storage.

In some examples, the blockchain or trusted storage is configured to store Public Keys of a PKI. Ownership metadata (in the case of Assets) are stored in the trusted storage.

Identity Creation

The system of some examples is configured to create Identifiers and Identities for Subjects (Individuals or Applications)

Figure 3:
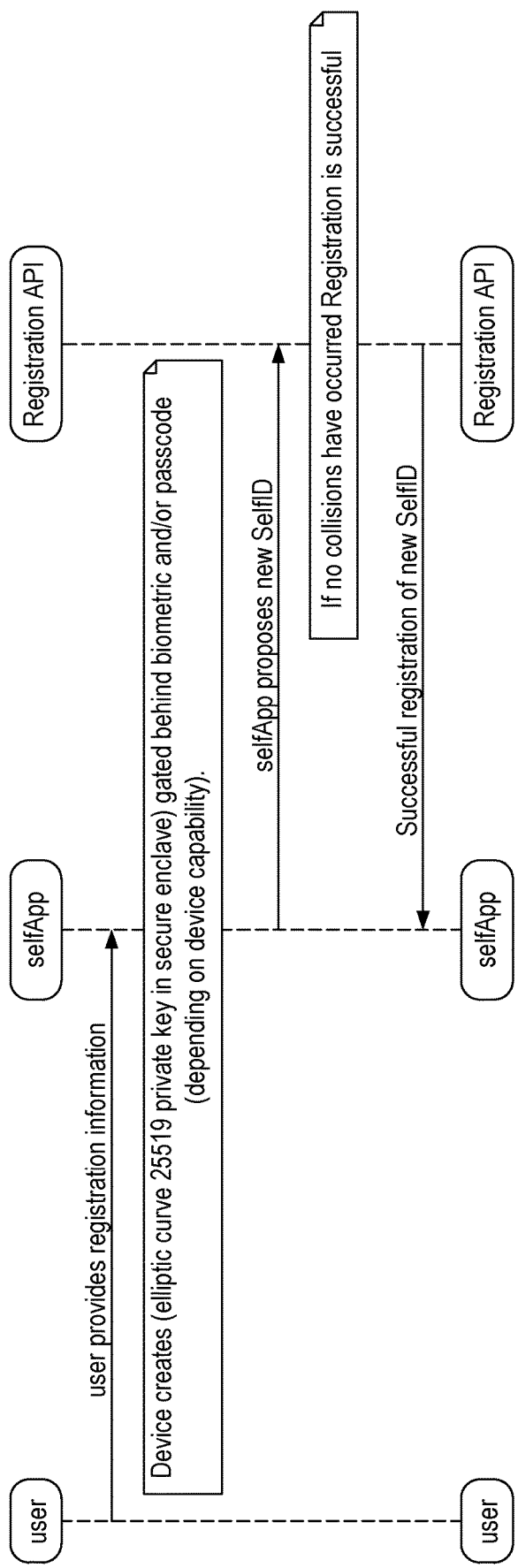
FIG. 3 is a flow diagram of a part of a method of some examples of this disclosure.

With reference to FIG. 3, in some examples, an identifier (SelfID) for an individual is created by a computing device, such as a user's mobile device, as follows:

1. User enters registration information (email and/or mobile phone number, Firstname) via the mobile device
2. Mobile device creates a private key (preferably an elliptic curve 25519 private key in secure enclave) and stores the private key in the device's secure storage gated behind biometric and/or passcode security (depending on device capability).

a. private key is tied to biometric and passcode on mobile device
b. private key is used to secure mobile device storage
c. private key can be used to directly sign operations (where secure enclave supports all necessary operations)
d. If device does not support all necessary operations to maintain the SelfID private keys inside the secure enclave at all times then the secure enclave private key is used to encrypt local app storage and the private key is stored inside this encrypted space with the encryption keys gated behind biometric/passcode.

3. The mobile device calls a Self registration API, sending proposed SelfID Public Key (assuming no key collision).
4. API responds with Self Identifier (preferably an 11 digit numeric code). At this point an unverified SelfID has been created. The Self Identifier and the Public Key are then written to blockchain.
   a. The Registration flow (optionally) contains a Claim regarding a contact detail (email address or phone) which is used to verify that the user of the app is in control of either an email address or phone number. The confirmation is handled in the common manner of sending a code via the communication method and requiring the user to either click on a link once they receive the communication, or enter the code contained, into the device which will check the code with the verification API. Once the verification API has confirmed the codes match, the Claim will be Verified and attested to by Self Application (API endpoint).

Claims, Verifiable Credentials and Verifiable Presentations are stored by individual Apps (IndividualId, OrgId, AppId), as they are cryptographically verifiable against the underlying PKI, they can be shared (using the underlying message delivery infrastructure or externally).

Applications

Application identities are analogous to Individual IDs except that they identify autonomous applications. Registration requires Verified Credentials from the owner who must be a Verified Individual SelfID or Organisation ID.

Applications can be verified or unverified. Verification of an Application involves a trusted party attesting to the veracity of the Application, and the Organisation/Individual in control of it. This takes the form of a KYC or KYB check. In some examples, the KYB check is implemented via manual checks on data provided regarding the business and the confirmatory assertion is provided by the system. The confirmatory attestation could also be provided by any organisation trusted to provide such an attestation (e.g. a law firm).

In some examples, the system is configured to create an Identifiers for Organisations. An Organisation identifier is created in the same manner as an Application identifier and has the same requirements regarding KYB/KYC. It is possible for organisations to be created and owned by Individuals identifiers or other Organisation identifiers.

Claims and assertions can be created with Organisations and Applications as the Subjects.

Identity Local Storage

In some examples, Claims, Credentials and Presentations are stored locally in a secure repository (e.g. the Personal Data Store (PDS, ADS, ODS for other Applications, Orgs, Assets). These assets can be requested, sent and verified using the underlying messaging infrastructure or externally, via any channel in and clear or encrypted manner When shared, Verifiable Claims and Verifiable Credentials are accompanied by Proofs (embodied by signatures). The veracity of the proofs can be checked using the underlying PKI. Revocations of keys are rapid unlike in other systems due to immediate notifications pushed out to Relying parties using the underlying messaging infrastructure (these notifications can also be transported using out of band methods such as email, SFTP, SMS).

In some examples, all operations in the system can take advantage of Self Checks and biometric gated explicit agreement. As all operations are digitally signed, a cryptographically assured audit trail is created when using the system. Applications which integrate with the system can utilise this simply for authentication, or take advantage of the pervasive strong user authentication to enable Trust throughout.

Self Biometrics

Facial Biometrics

Device biometrics cannot tie Claims to individuals since any user can add a biometric without having to match the biometrics which already exist.

Self Biometrics directly connects Claims to a specific individual whilst still potentially maintaining the anonymity of the user.

Current authentication systems relying on biometrics and behaviour involve the collection and transmission or storage of identifying data to a central server. In the case of secure element based biometrics, biometric details are held directly on a user's device where biometric checks are carried out in a "black box" manner by requesting authentication of biometric data to the secure element, via a secured hardware channel such as that the pathway between a smartphone's fingerprint reader and the secure element (storage and processing) which both holds the user's biometric data and is used to check for similarities with the biometric data.

Self seeks to improve on this model through the use of Mimirs Mimirs perform black box operations and communicate based on cryptographic authentication. Similarly to secure elements in mobile phones and microprocessors Mimirs:

Will only answer when they receive an authenticated request

Only respond to a system or user which has been pre-authorised for the request

Only perform the limited set of operations for which they have been authorised

Unlike secure elements which are embodied in hardware, Mimirs are implemented in executable code which can be hosted on mobile devices, servers, IOT devices or any general purpose computing device.

Users are able to authorise Mimirs to collect data about them and keep it securely in an encrypted form. Unlike traditional systems, there is no requirement to send data to 3rd party intermediaries who make judgements about the validity of a User's requests. Unlike traditional systems, Big Tech companies are not collecting and leveraging the user's data to gate their access to systems, or asymmetrically target individuals or groups with impunity. Mimirs are agents acting on behalf of their Users. Countermeasures against the asymmetric distribution, aggregation and processing of data inherent in the client/server model.

Components

1. Face Recognition Mimir (FRM)
2. Self PKI system
3. Self App
4. Mobile device

Initialising Face Recognition Mimir
1. FRM takes a pre-trained general face recognition model
2. FRM user imprinting
   a. Generalised model is taken
   b. User provides imprinting input in the form of a number of positive samples.
   c. Transfer learning (through applied retraining) is used to skew the model and by extension the Mimir which contains and runs it to recognise the user only. Consequently, the facial recognition model is trained using images of a user's own face, unlike conventional facial recognition systems which are trained using training data based on other faces. The FRM system therefore removes the risk of ethnic and/or gender bias which can occur in traditional facial recognition systems which are trained using image data which does not reflect human diversity (e.g. image data consisting primarily of facial images of white males).

Continuous Reinforcement of FRM

Whenever Self requires a strong match between the user of the credentials and the user that registered the identity, a check is performed against the FRM.
1. FRM request a biometric check
2. FRM checks for a face
3. FRM detects a face
4. FRM checks for recognition of imprinted face
5. When FRM recognises the face (sure as the minimum set threshold) the image (including frame(s)) from video are stored for future FRM training (more transfer learning) to increase fidelity. New positives may have multiple image transformations applied to prevent overfitting (rotations, angle of image)
6. The original FRM model is retrained through transfer learning on the user's mobile device. Due to the vector processing performance required, this should be done only when the user is charging their device (in the background).
   a. The training process' GPU and CPU usage can be dynamically controlled to prevent overheating of the mobile devices by modifying the priority given to the training processes whilst monitoring throughput, power consumption and thermal output.
7. Optionally snapshots of the imprinted model can be stored with timestamps allowing re-training of and correction of compromised training models without having to retrain from the start.

Behavioural Biometrics

Trusted Execution Environments for Behavioural Biometrics

In some examples, the system comprises a Behavioural Biometrics running inside a trusted execution environment (either physical and local or remote and/or virtual).

In some examples, the behavioural biometrics processing for each user is run in a separate environment (can be on device), the processing runs using signed code and in a trusted execution environment. This prevents tampering with the model(s) and the code. The system is able to update its models but has no access to the user's data which is encrypted with their private keys.

The available behavioural biometrics data is used for statistical analysis and the training of a model which gives a fractional surety score indicating how sure the system is that the user currently interacting with the system is the owner of the account. Below a predetermined surety threshold it is necessary to make the system more sure (by verification through a KYC, Web of Trust reinforcement or some other configurable method).

The data used to train the behavioural biometrics does not need to leave the device. The use of trusted execution environments and signed code allows the system to trust the output of the behavioural biometrics system. In some examples, the processing may be handled by customised hardware on the device, or an autonomous virtual machine off device running an autonomous instance of the model which can only be fed data by the owning SelfID. This autonomous agent may be authorised to answer other identities and thus form a Zero Knowledge Autonomous Oracle.

The Oracle is provided by the system and always answers truthfully. The Oracle can be asked to answer questions regarding the SelfID that owns it. This allows the user to share synthesised proofs without the need for an external third party.

Use Case

Zero Knowledge Proof of Age Above 18.
1. Relying party sends a request to the user to prove their age is above 18.
2. The user authorise their Oracle to answer the request
3. The Oracle gets the user's verified age credential from their PDS and sends the synthesised result back.

Behavioural Biometrics Data Sources

In some examples, the system is configured to generate behavioural data based on one or more of the following:

OS Device Analytics Gathered from the operating system via analytics APIs and stored and analysed locally on device. In biometrically gated locally encrypted storage. For instance Application usage on a mobile device or Keystore access on a mobile device.

Vocabulary usage data gathered from the operating system or a keyboard via analytics APIs and stored and analysed locally on device. Vocabulary creates a statistical fingerprint of the user's vocabulary usage by tracking and analysing their vocabulary usage.

Financial transactions (e.g. from Open Banking aggregation) gathered via integration with Open Banking then processed to provide a statistically useful derivative on device. Additionally this data can be shared with and analysed by the Identity's Oracle which will only accept and release data to the user unless otherwise authorised.

Sensor Data gathered from the operating system via APIs and stored and analysed locally on device. In some examples this data is stored in biometrically gated locally encrypted storage.

Location
   Location Outdoor (GPS coordinates)
   Location Indoor (combined with outdoor) GPS Coordinates, proximity to beacons, etc. (dependent on availability of indoor tracking)

Camera
   Active engagement of the camera (liveness during transaction). Gathered locally at the device with the liveness assertion checked by the identifier's Mimir or Oracle where Biometric data is compared against securely stored Biometric data.
   This takes the form of captured still and video images and their statistical derivatives (biometric analysis, identity liveness).

Accelerometer (acceleration vectors over time)

Gyroscope
   Walking Cadence, inference of intent, (dropping, forcible taking of device, handing device to a third party (a derivative of information from the accelerometer and/or gyroscope)

Typing cadence
  Collected through access to keyboard application data.
    Requires escalated rights or the provision and installation of a keyboard application.
  A unique "fingerprint" may be statistically derived from the rhythm with which the user enters information into the device keyboard.
  Network data collected locally using device APIs and fed to the identifier's Mimir or Oracle
  Surrounding device scan
Using any available transceiving medium and equipment e.g.
  Bluetooth
  UWB
  NFC
  Wifi
  VLC (Visible Light Communication)
  Audio
  Blacklisted devices or networks
  MAC Addresses
  Health data
  Retinal saccade data
  Some or all of the raw or derivative data may (optionally) be made available to Self for further analysis. The data is used for the training and testing of statistical and ML models.

When queried, these models provide a fractional score indicating how sure Self is that the user currently interacting with Self is the owner of the account. A configurable threshold is set. Below the threshold Self will ask for more checking before authentication (by verification through Self Biometrics, Web of Trust reinforcement or some other configurable method).

The processing can be handled on the Client, or on a Mimir running an instance of the model which can only be populated with data by the owning Self Identifier. This Mimir can be authorised to respond to requests from other Identities. The code for the Mimir is provided by Self and always answers truthfully. The Mimir can be asked to answer questions regarding the Identifier that owns it. This allows the user to share synthesised proofs without the need for an external third party.

Mimirs
  Mimirs enforce the terms of agreements and act as proxies for Members on the Self Network, thus allowing the terms of agreements to be met even after a Client has left the network (for example the uninstallation of a mobile Client).

Biometric Mimir
  Biometric Mimirs provide and maintain Member specific, self-retraining Biometric capability as a service which can be queried by authorised parties. Generally, only the source Member is authorised to query the Biometric Mimir, however as Mimirs respond to any authorised party, it is possible to authorise any Entity(s) to interact with the Biometric Mimir Mimir Providing Anonymisation
  Anonymising Mimirs provide an anonymising Identifier when answering queries, providing uni-direction anonymity. Bi-directional anonymity can be achieved by using anonymising Mimirs for both Entities in a transaction. Anonymising Mimirs provide an API for relying parties to notify the source Member of compliance with the terms of the agreement (eg data deletion) without exposing the source.

Fact Sharing Mimir
  In the context of this disclosure, a fact is a verified Claim. Fact sharing Mimirs persist for as long as a License for the data they are sharing. Fact sharing Mimirs provide an API for the relying parties to notify the source Member of any pertinent changes in the status of the shared Facts whilst also facilitating the refreshing of stale Facts by the source Member.

Use Case
Zero Knowledge Proof of Age Above 18
  1. Relying party sends a request to the Member to prove their age is above 18.
  2. The Member authorises their Mimir to answer the request
  3. The Mimir gets the Member's verified age credential from their PDS and sends the synthesised result back.

Engagement Incentivisation Through a Currency (Proof of Self)
  In some examples, the system allows the collection of Behavioural Data, even if only used by the Zero Knowledge Oracle or similar system requires users to willingly share their data. The collation and processing of this data and the repeated biometric gated validation that the SelfID is being used by its owner constitutes proof of self.

Whilst the SelfID surety score is above a threshold and until the next check is required (e.g. the next day) the user is assigned tokens. In some examples, the method comprises incrementing a token register by a predetermined number of tokens if the surety score is beyond the predetermined surety threshold for a predetermined interval of time. In some examples, the predetermined number of tokens is selected in response to a security configuration of the computing system. Therefore, the rate at which the tokens accrue varies depending on how much data the user allows Self to process (e.g. a user who only allows location to be read when in the app might accrue at a fraction of the rate of one who allows all the sensor data). Furthermore, the behaviour of a user's web of trust relations will also affect the user's accrual rate.

In order to dis-incentivise bad actors, being connected via a web of trust to identities identified as bad actors will have a detrimental effect on the earning rate of the tokens for a SelfID.

Authentication
  The system of some examples is configured to allow Passwordless Authentication by simply presenting and validating a verifiable Credential asserting a specific Self account or, for specific examples involving identity verification, an Identifier (SelfID). The proof is the attached signature which is validated using the underlying PKI.

Figure 4:
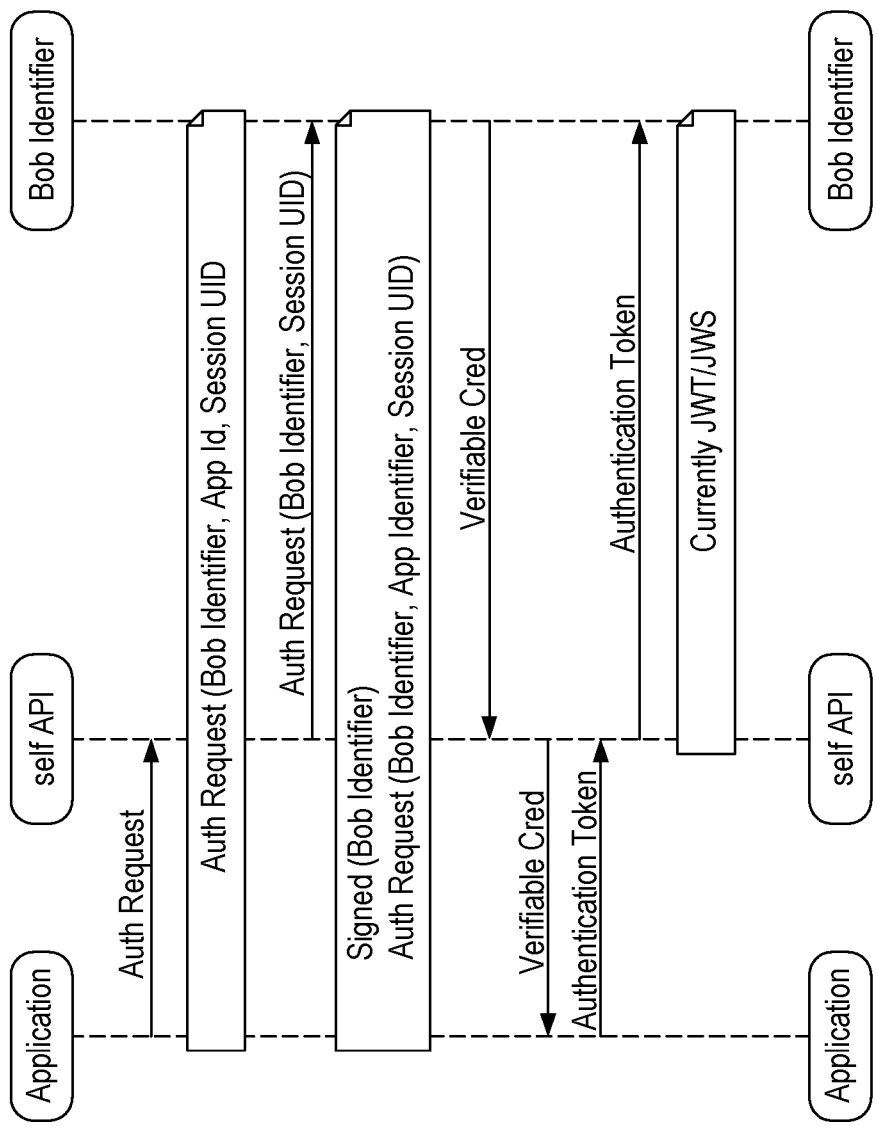
FIG. 4 is a flow diagram of a part of a method of some examples of this disclosure.

Referring to FIG. 4, the system of some examples allows authentication into systems using the Self system is mediated by a Self Authentication system (API). The external application (which has an Application ID) sends a request for verifiable Credentials to the relevant Self account or identity (SelfID) along with a unique identifier identifying the instance of the application (analogous to a session identifier). The Self account presents proof by signing with its Private key and sends the Credential back (using the underlying messaging infrastructure). In order to improve user experience, the session and application Identifiers can be encoded and transported via any securable medium, including but not limited to QR code, near field communication (NFC), Bluetooth™ ultra-wide band (UWB), visible light communication (VLC), WiFi™, audio or via any medium which allows the encoding and decoding of data.

Figure 5:
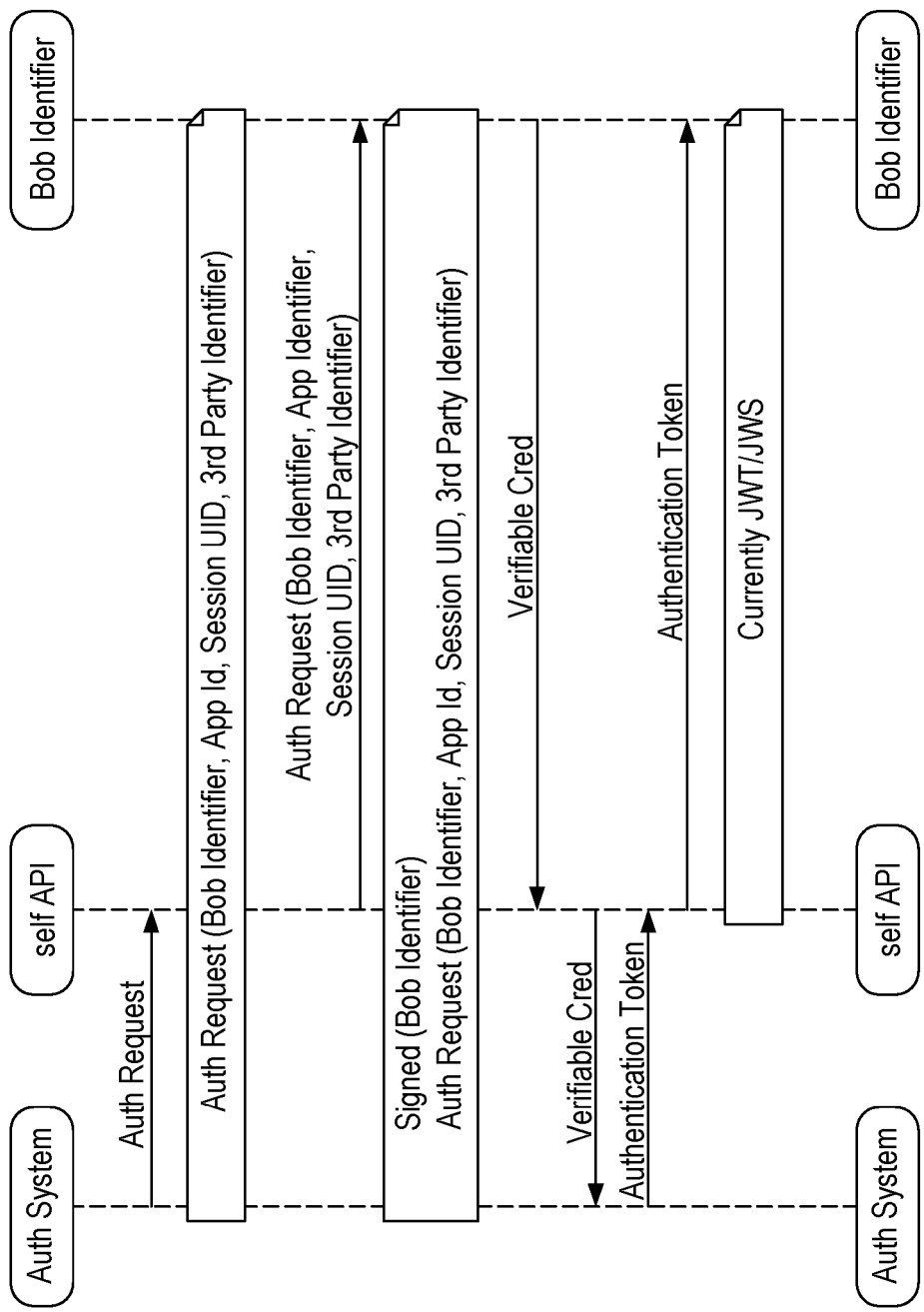
FIG. 5 is a flow diagram of a part of a method of some examples of this disclosure.

Referring to FIG. 5, the system of some examples is configured to use a Self account as an Additional Factor (e.g. 2-Factor, 3-Factor, etc.) for authentication. For example, authentication can be added as a second factor for existing systems (e.g., Active Directory) by requiring a Verified Credential from a Self account as part of the authentication process. The request is sent to the Self account in question via the encrypted messaging infrastructure. Correlation between Self accounts and external identifiers (such as AD logins) is achieved by mapping the Self account to the external unique identifier (username, UID, UUID, etc.).

Figure 6:
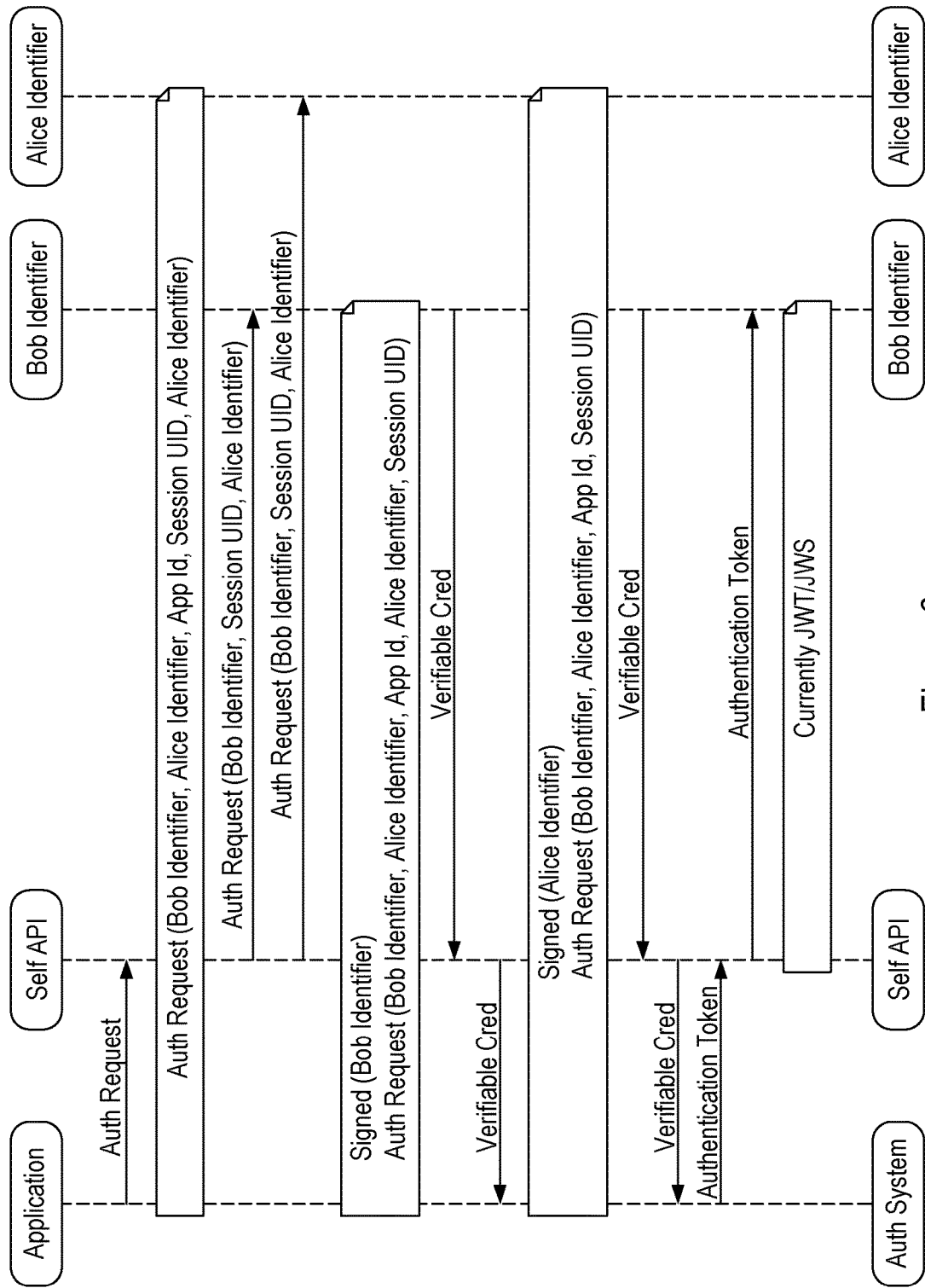
FIG. 6 is a flow diagram of a part of a method of some examples of this disclosure.

In some examples, Self also makes possible more complex authentication flows, such as joint authentication/authorisation. The concept of delegated 2-factor authentication which allows a third party to approve a login if a use case requires it, as shown in FIG. 6. This is especially useful in the case of delegated login approval/authentication for children and the elderly. Furthermore, integration with Self Biometrics enables certainty as to the exact user providing approval.

In some examples, systems such as Kerberos which incorporate key signing can use keys provided by the system PKI if there is support for external key management. In some examples this can be accomplished either directly through the use of the default keyset published to the underlying system PKI or by the generation and management of additional keys if the native keys (e.g. ED25519) are not compatible. Different cyphers and key lengths are configurable via API and as such, the system can support integration with any ciphers and key schemes.

Self Checks

Self Checks provide a fast, cheap check on the trust level associated with an Identifier. Individual account Checks 1. Score Floating Point Numerical score (with higher values signifying higher certainty)

2. Verified Credentials

Whether the number of Verified Credentials is above a set threshold. In some examples, the returned output of this check is a Boolean or numeric value.

3. Liveness

Whether the account is considered live, a combination of behavioural biometrics and whether the user has used biometrically gated features recently.

In some examples, the returned output of this check contains a Boolean or numeric value.

4. Verification Level

Whether the user has performed KYC checks and to what level.

In some examples, this returns a Boolean value with the differing levels of checks being configurable in business logic.

Application Identifier Checks Return the:
  KYB/KYC (Know your Customer/Business) Verification
    Status of an Application, either Verified, with optional metadata visible or unverified.
  Owning Identifier(s)

Organisational Identifier checks return the same information as Application Identifier checks
  Asset Identifier Checks return:
  Ownership information
  Verification Status
  Optional metadata In the context of this disclosure, a Derived Predicate is a verifiable, boolean assertion about the value of another attribute in a verifiable Credential. These are useful in zero-knowledge-proof-style verifiable Presentations because they can limit information disclosure. For example, if a verifiable Credential contains an attribute for expressing a specific height in centimetres, a derived predicate might reference the height attribute in the verifiable Credential demonstrating that the Issuer attests to a height value meeting the minimum height requirement, without actually disclosing the specific height value. For example, the subject is taller than 150 centimetres.

Verification of Credentials

The system of some examples is configured to allow all entities have their Credentials Verified using the underlying PKI.

Requests

Figure 7:
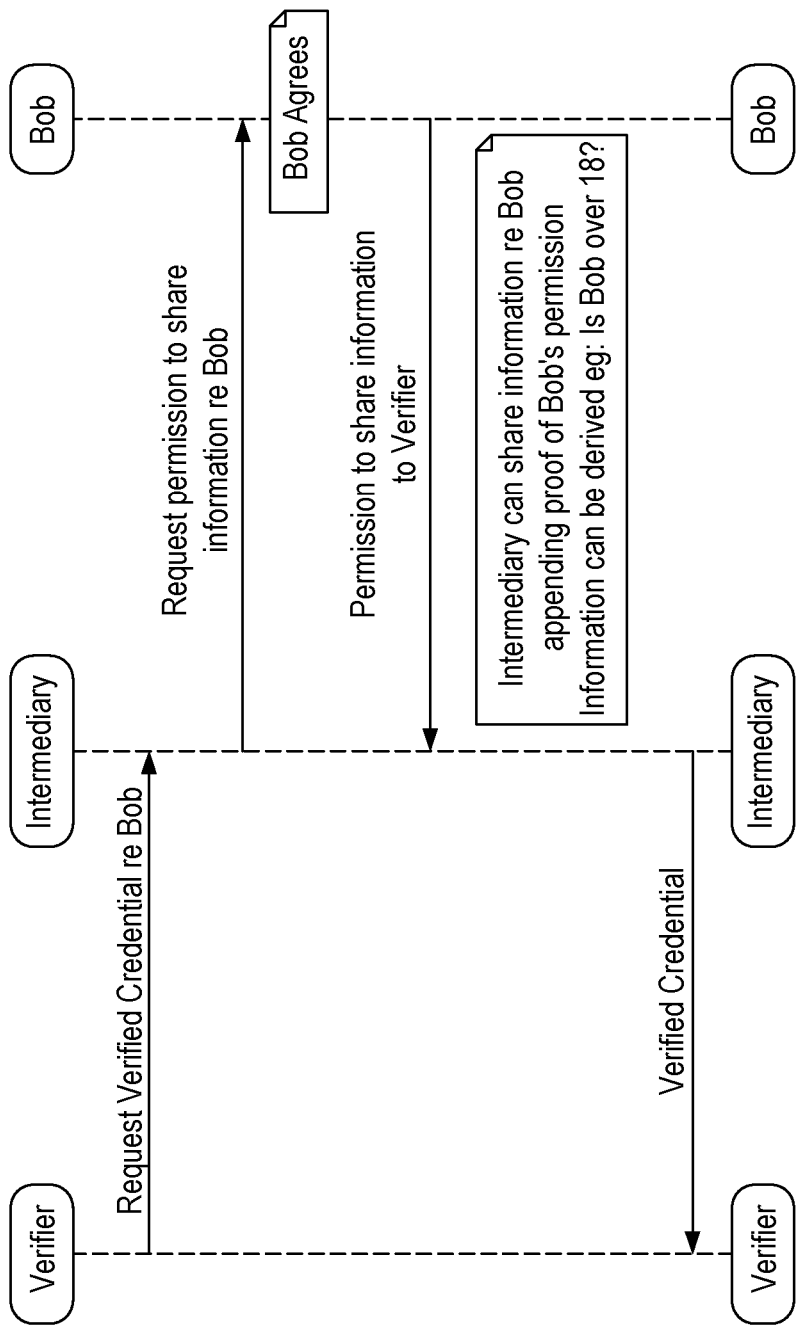
FIG. 7 is a flow diagram of a part of a method of some examples of this disclosure.
Figure 8:
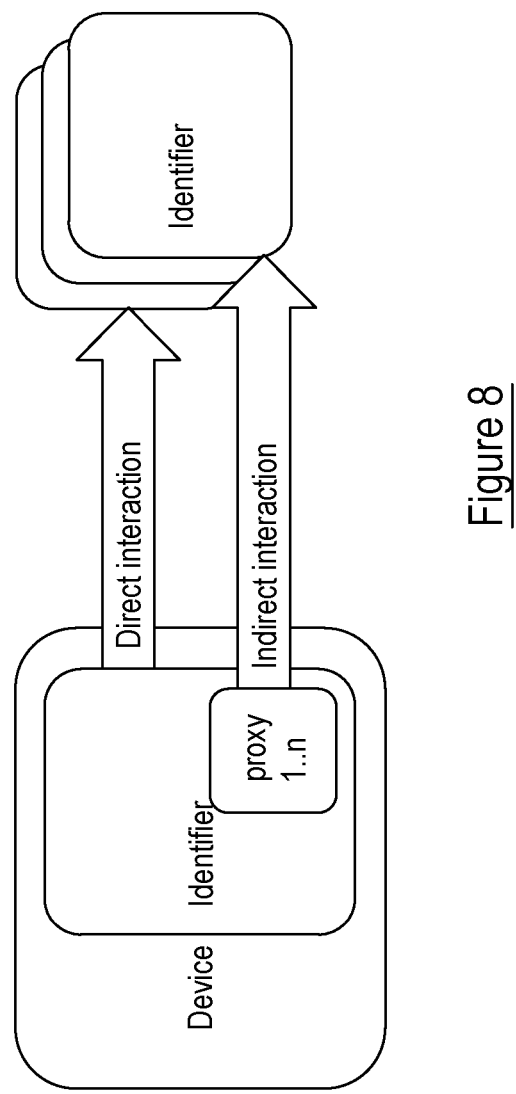
FIG. 8 is a schematic diagram of part of a system of some examples of this disclosure.

Referring to FIG. 7, a requests for a Verified Credential by an Application to an Individual comprises a Relying party desiring a Verified Credential sending a request to the relevant Identifier. The request specifies:
  Desired Credential or Claim
  Desired License type and duration The messaged Identifier then responds, either with the Verifiable Credentials requested, or with a rejection.

Request for Zero Knowledge Verification (Via Third Party)

In some examples, Requests for verifiable Credentials or verifiable Presentations can be made through an intermediary 3rd party to allow Zero Knowledge Verification. In this case the Subject Identity must authorise the request through a biometrically gated, cryptographically signed response.

Request for Zero Knowledge Proof (Via ZKP Encryption)

In some examples, requests for Zero Knowledge Proofs of Claims can be requested, either to an Identity's Proxy, or in the case of equality requests, through the use of Secure Comparator (Zero Knowledge Proof) operations.

Proxies capable of comparison operations can be used for Zero Knowledge logical operations (greater than or less than).

Key Escrow

Key escrow is implemented through the use of a Mimir When escrow is required, a Mimir is set up as usual and populated with data. In order to maintain privacy until required, the keys are split (using Shamir's Secret Sharing), with Self and additional parties requiring agreement in order to decrypt the keys. This allows key escrow whilst avoiding coercion from outside Self, as well as allowing external oversight, for example the keys could be split into multiple fragments and shared amongst a "Privacy Board" which would have to agree on the legality of a decryption request before complying.

Anonymous Identifier Operation

Due to the persistence of the Identifiers attached to Self accounts it is possible for a bad actor to use them as a correlation key enabling the aggregation of data shared over time or from another source (if the data sharing license is ignored).

To avoid correlation, anonymous Identifiers and Mimirs are provided to facilitate both unidirectional and bi-directional anonymous interactions. One or more Proxies can be appointed to a Self account (e.g. one for each relationship they have). The Proxy only takes commands from its controlling Member(s), this is enforced through the use of PKI. When the Identifiers on both sides of an interaction are Proxies, interaction is bi-directionally anonymous. However, depending on the business or legal requirements of the Proxied relationship the proxying contracts can be made to expose their owner. Safely disclosing the owner's data can be achieved using the Key Escrow capability of Self to create an escrow Mimir which can be authorised to divulge the identifiers involved when queried by an authorised party (or parties in the event of split keys).

Backup and Restore

Figure 9:
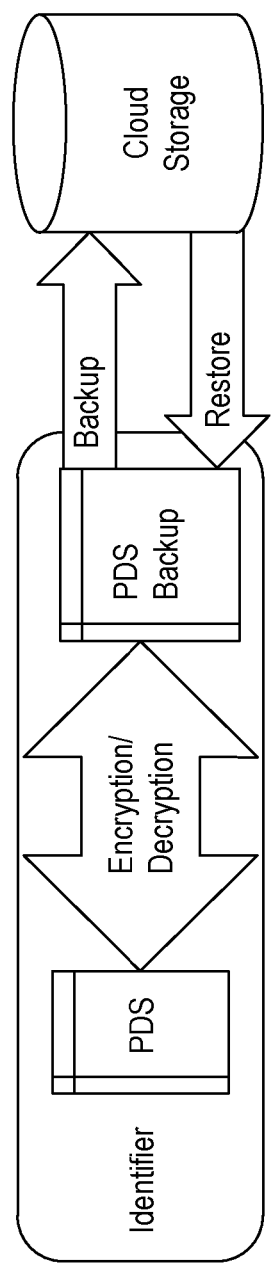
FIG. 9 is a schematic diagram of part of a system of some examples of this disclosure.

Referring to FIG. 9, in some examples the PDS Data on a Client device is backed up in an encrypted form. The encryption keys can be deterministically generated from a Seed (e.g. BIP-39, BIP-34) value which can be used to re-generate the same key pair allowing decryption of the backup data at a later date.

Recovery of Self Accounts and Key Replacement

Figure 10:
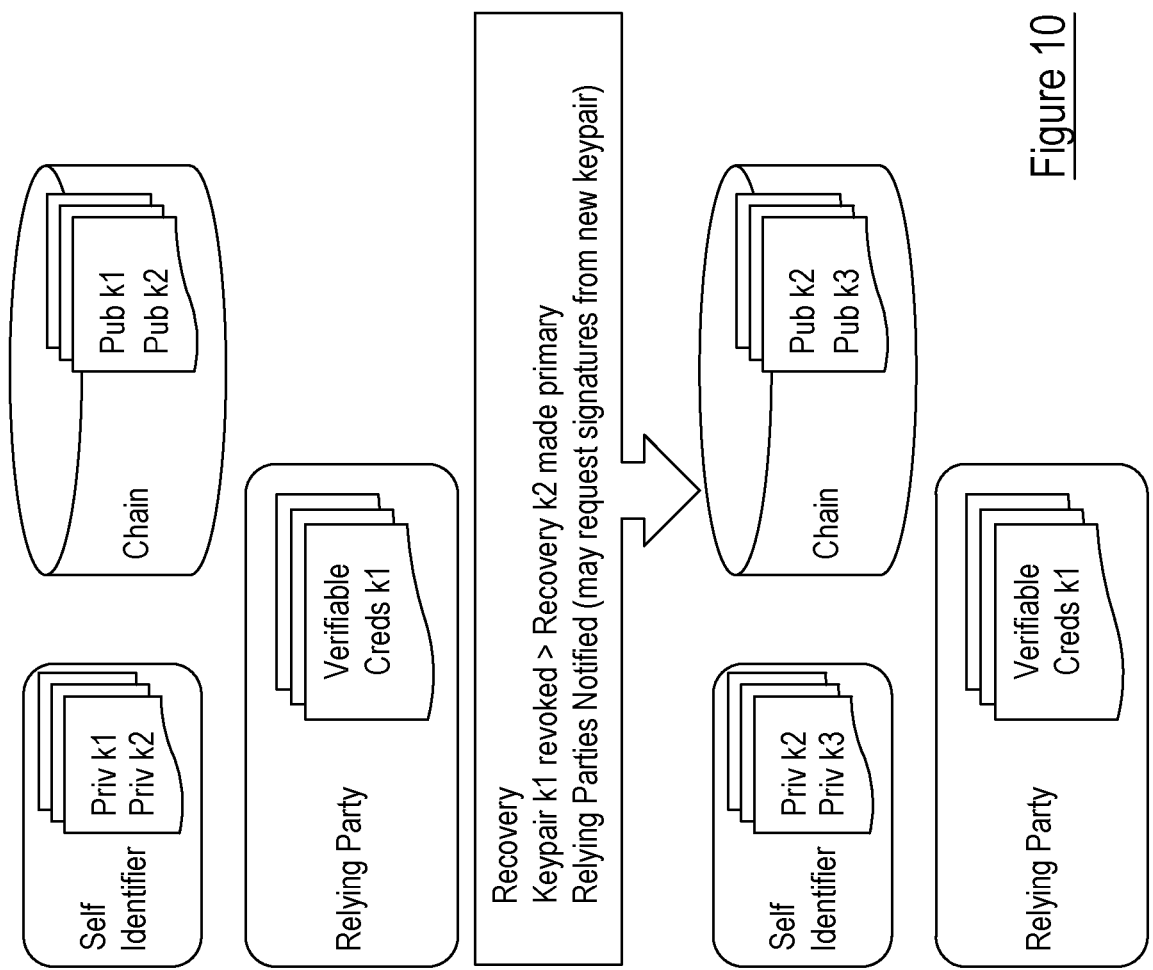
FIG. 10 is a schematic diagram of part of a system of some examples of this disclosure.

Referring to FIG. 10, in some examples a backup key pair (with accompanying seed phrase) is generated on creation of a Self account. The public section of this key pair is given equal rights to the main key and stored on the chain. In the case of an inability to use the main key, the backup key can be used (via the API) to assign a new main key, and so recover an identity. After account recovery verified credentials may need to be re-attested depending on the business rules implemented by the relying parties. Relying parties can be notified of the change of keys (revocation and assignment).

Engagement Incentivisation Through a Currency (Proof of Self)

Allowing the collection of Behavioural Data, even if only used by the Zero Knowledge Mimir or similar system requires users to willingly share their data. The collation and processing of this data and the repeated biometric gated validation that the Identifier is being used by its owner constitutes proof of Self.

Whilst the Identifier surety score is above a threshold and until the next check is required (every 24 hours in one example but other examples are configurable by business logic and the Identifier's usage) the Identifier is assigned tokens. The rate at which the tokens accrue varies depending on how much data the user allows Self to process (e.g. a user who only allows location to be read when the Self app is open might accrue at a fraction of the rate of one who allows all the sensor data). Furthermore the behaviour of a user's Web of Trust relations will also affect the user's accrual rate.

In order to dis-incentivise bad actors, being connected via WoT to Identities identified as bad actors can have a detrimental effect on the earning rate of the Identifier.

Web of Trust Mediated Recovery (Split Keys)

Figure 11:
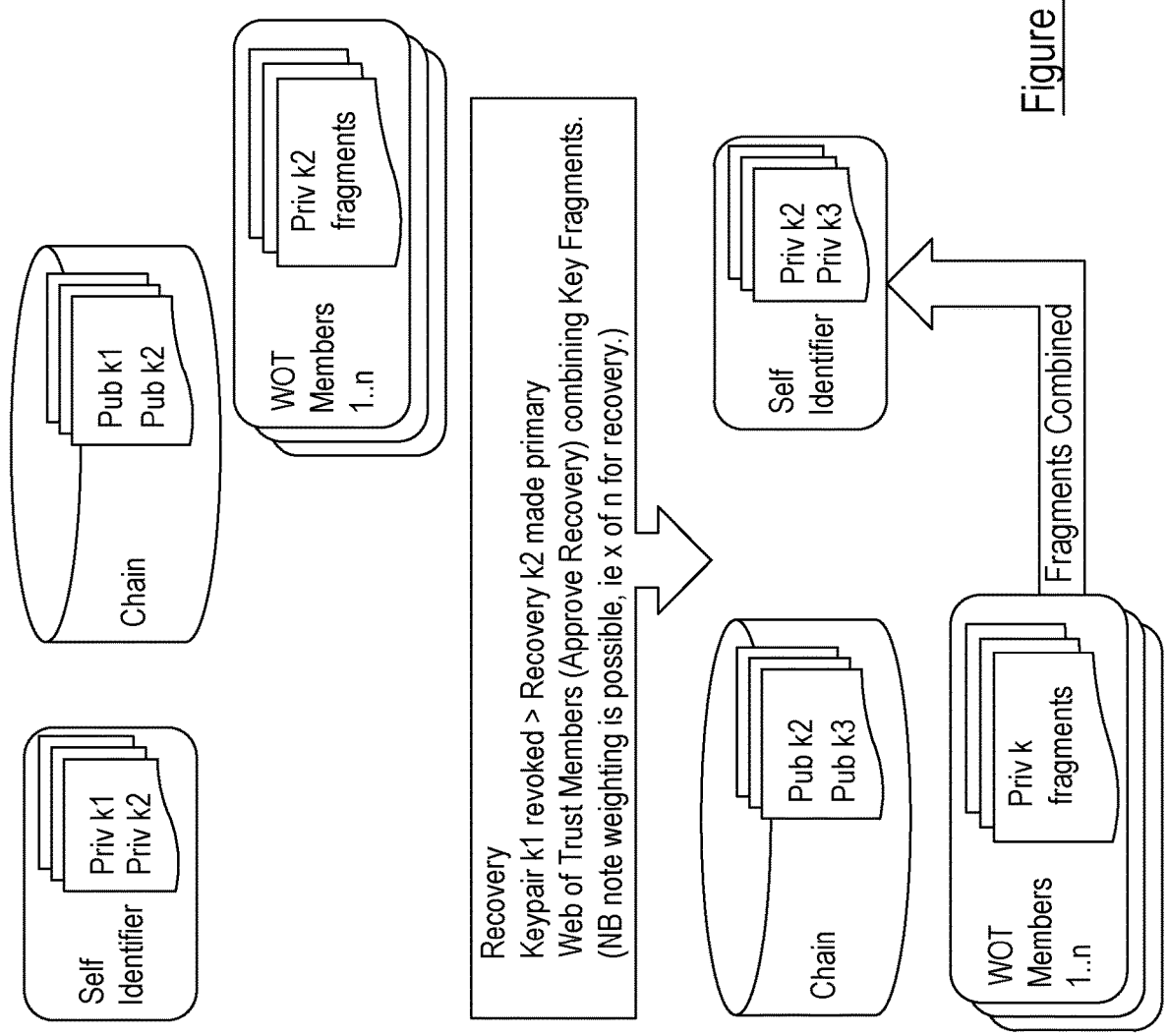
FIG. 11 is a schematic diagram of part of a system of some examples of this disclosure.

Referring to FIG. 11, Web of Trust Mediated Recovery of some examples utilises Key Escrow and optionally a Key Escrow Mimir In the event of recovery, the Trusted Third Parties will be asked to verify that the recovery requestor is entitled to the recovery. On the recombination of the key material, recovery will be possible whilst no individual third party will be able to recover the keys on their own.

Web of Trust Mediated Recovery can be implemented with a Key Escrow Mimir either as an additional party to the Web of Trust or it can form part of a separate network of authorities (e.g. in the case of a regulatory oversight requirement) to allow access to recovery or other keys.

Self Biometric Mediated Recovery

Figure 12:
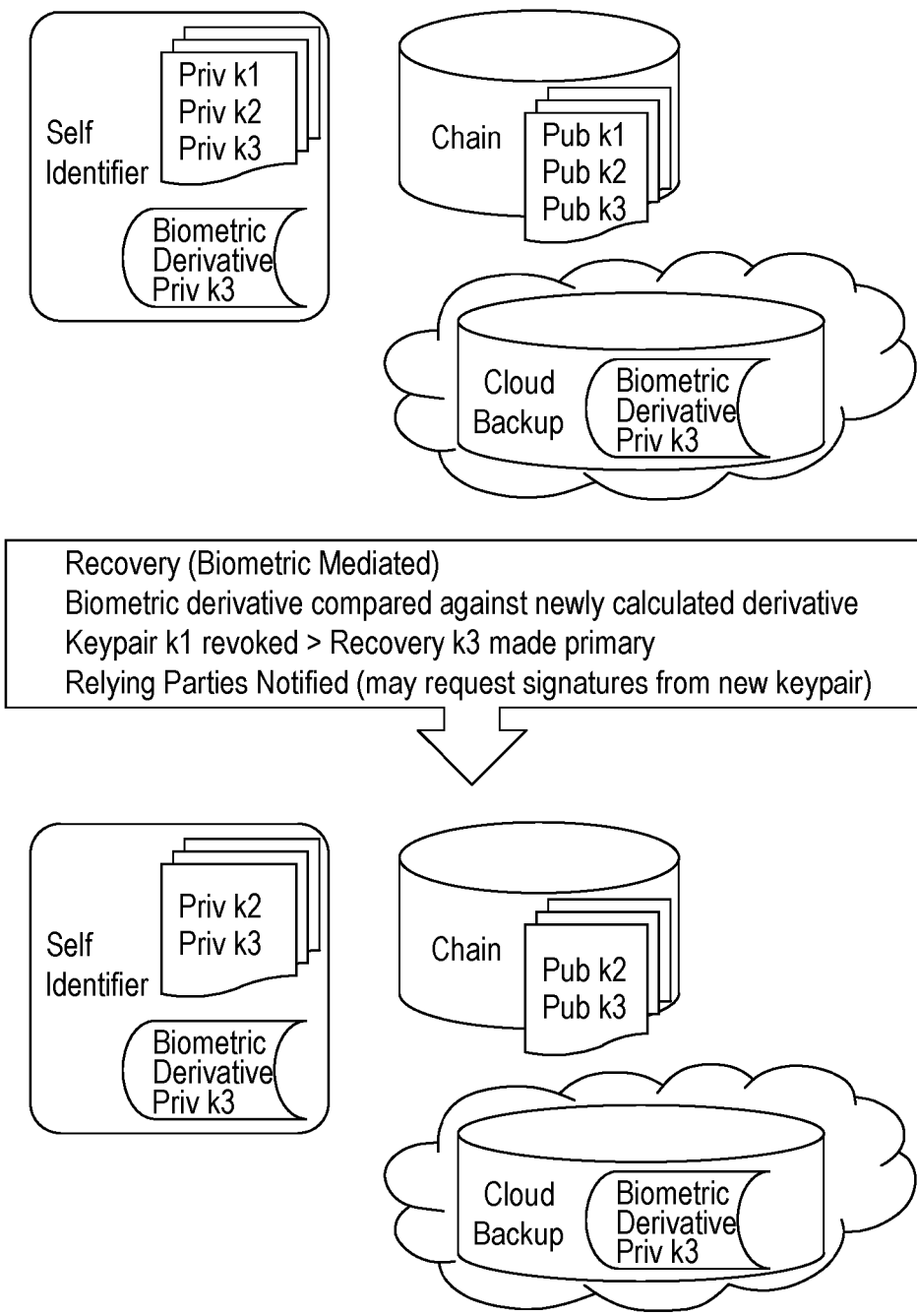
FIG. 12 is a schematic diagram of part of a system of some examples of this disclosure.
Figure 13:
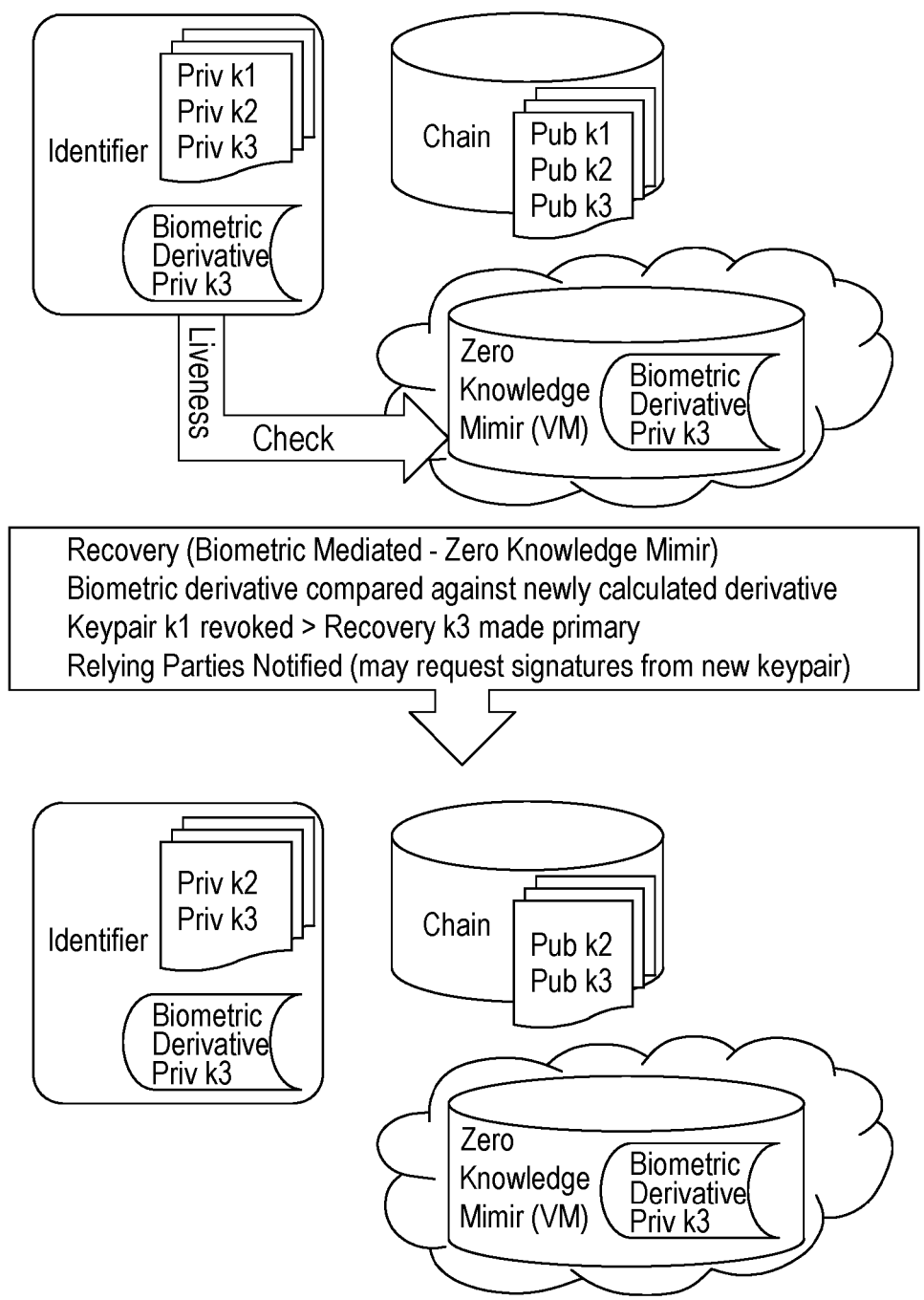
FIG. 13 is a schematic diagram of part of a system of some examples of this disclosure.

In some examples personally identifiable Biometric data (facial comparison points, voice pattern fingerprint, walking cadence, etc.) is processed during individual identity verification and stored to a secure on device location and backed up. Two versions of this capability exist:

1. Referring to FIG. 12, in some examples identifiable derivatives (statistical fingerprints of the data) are stored to the device and backed up off device and are compared to the same biometrics when a user attempts to recover their identity.
2. Referring to FIG. 13, in some examples derivatives of the biometric data are stored by a Mimir or an oracle. The Mimir or oracle will only divulge its information (e.g. recovery keys, or PDS data) when it is presented with a set of secrets verified by Self.

End to End Encrypted Communication

Messaging

In some examples, the system is configured for End to End (e2e) encryption. In some examples, the system uses the Signal protocol with the addition of OMEMO for group distribution. In some examples, the system enables Communications Media Streaming e2e Encrypted with Long lasting base key generation using the Signal protocol.

Media Streaming

In some examples, Media Relays are used for providing network traversal and client IP addresses are masked from each other by using a media-relay on each side of a streaming media connection. ZRTP (composed of Z and Real-time Transport Protocol) is used for key exchange and session management. The ZRTP key exchange and verification (once completed) allows for out of band verification of identities (over voice) using either the usual reading of octets by participants on the call, or the replacement of the numeric codes with emojis or other language neutral iconography.

VPN

The underlying key management of the Self system of some examples allows the deployment of p2p and client-server based VPN. In fact the Media Streaming use-case is a specialised case of a streaming VPN. Any data can be pushed through such a connection and thus benefit from the security provided by the transport encryption and verification.

Constant Identity Confirmation

The system of some examples provides a constant Biometric Authentication against verified Identity document. The system carries out checks, preferably every time an identifier is used, allow relying parties to be sure that the identifier is being used by the same user/party at every usage.

The veracity of the identity in question is influenced by at least one of the following factors:
   Control of cryptographic keys
   Verified Credentials from trusted 3rd parties
   Biometric Identity
   Behavioural Identity
   Liveness Encryption everywhere (Breaking Encryption Silos)

Figure 14:
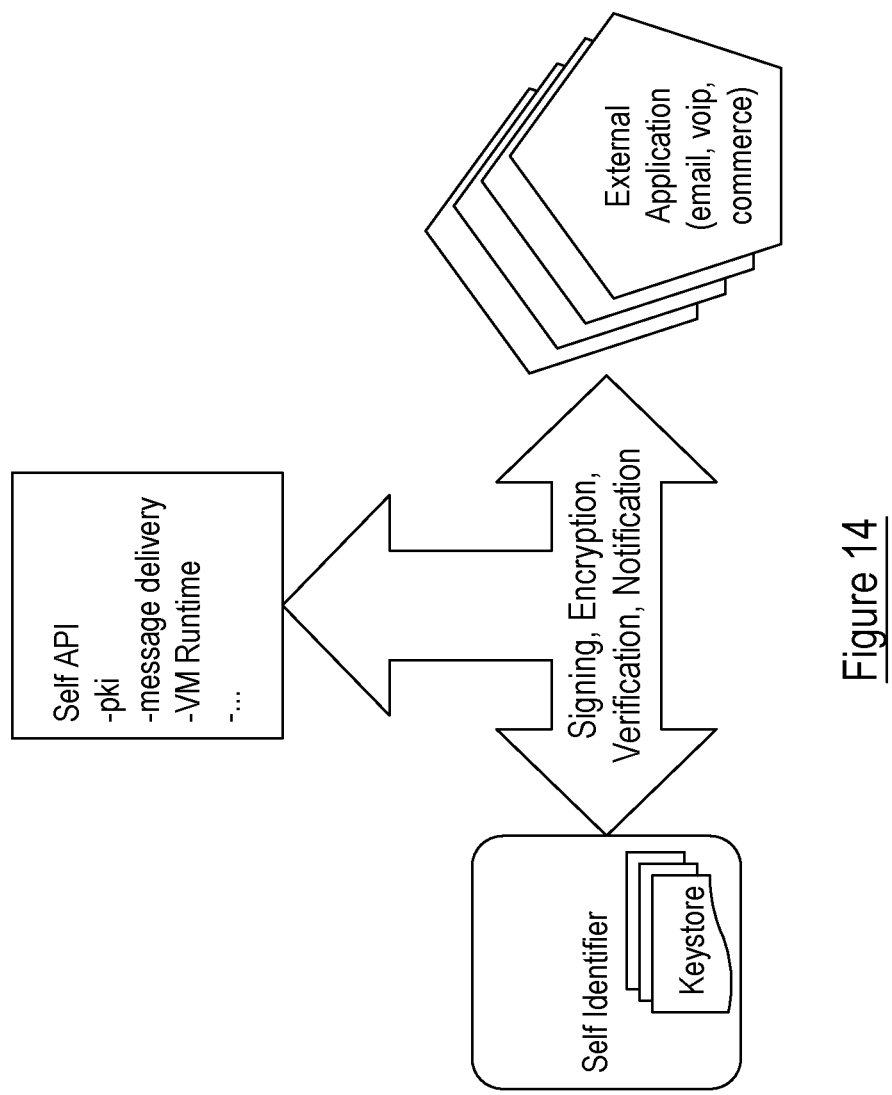
FIG. 14 is a flow diagram of a part of a method of some examples of this disclosure.

Referring to FIG. 14, the system of some examples allows (and encourages) its underlying encryption infrastructure to enable secure operations anywhere where PKI and strong authentication is required (this capability is exposed outside of the system through integration points such as APIs and plugins). Unlike current systems, Self's underlying PKI, messaging, Checking/Scoring capabilities extend to services and applications which integrate with it. Self makes all electronic operations cryptographically verifiable and non-repudiable (through its underlying PKI).

Existing applications such as Email, eCommerce, Messaging and Communications can benefit from the Self PKI and identity management. In some examples, by allowing operations using its PKI, Self enables the encryption and decryption and transmission of arbitrary content (e.g. emails, files, data streams, etc.) between authenticated participants. The ability to verify in real-time, the sender of an email, invoice, payment request (anything sent electronically) allows the elimination of invoice fraud and phishing attacks. The verification of all parties involved in communications and transactions and the ability to trust information regarding them. However the management of the underlying PKI and the difficulty involved in sharing keys has meant that existing systems such as PGP are not used widely.

Credential Claim Verification Via Witnessing

In cases where third parties have not integrated with the Self system to provide attestations, the system of some examples provides a method of witnessing a verification performed by a user.

Driving License Check Example:

A service provider who does not provide Self Attestations, (e.g.the UK Driver and Vehicle Licensing Agency (DVLA)) allows users to utilise the verified Claims held by the service provider even if the provider is not currently a Member of the Self Network.

Self provides a built-in browser which allows the user to authenticate with the service provider's website and get their own data. The custom browser witnesses this using the Document Object Model (DOM) and performs validity checks on the TLS certificate of the service provider's website domain or other PKI infrastructure.

The verified Claims held by the service provider are captured and stored in the user's PDS as Self's embedded browser has verified the information stored about the user on the service provider's systems.

Self has witnessed the presence of the validated Claims by being a party to the check performed by the Subject.

This solution is currently implemented for TLS websites and digitally signed PDF documents.

Distributed Web of Trust (WOT)

The system of some examples is configured to use a Self Distributed Web of Trust (WOT) which enables end-to-end security between clients on a distributed public key cryptography system with Identity Validation based on peer to peer trust relationships. In some examples, the peer to peer trust relationships are established using chains of digital signatures stored on a blockchain used as a distributed ledger.

In the context of this disclosure, a Digital Signature is a data transformation for demonstrating the authenticity of a digital message.

The Self WOT allows clients to establish end-to-end secure connections without prior key exchanges by obtaining and validating keys in a decentralised and indirect manner This enables secure connections to be established through a peer or series of peers, ensuring that the trust on any intermediate servers is not required for secure operation.

Many end-to-end network security protocols depend on the establishment of session keys between the Clients requiring secure transmissions. These keys could be pre-shared via an out of band method (requiring previous out-of-network communication), or more commonly, could be calculated using public-key cryptography.

The out-of-network communication method to exchange keys is not scalable, as the number of keys to exchange increases exponentially with the number of Clients on the network using the formula for the number of edges in a fully connected graph n(n−1)/2.

Public key cryptography solves this issue by allowing users to publish part of their key material (public key) for everyone to use, while keeping another part of their key material confidential (private key). The public key is then made available to other Clients. This is more efficient and it is the most common way to distribute keys (X509 certificates, key servers, etc.).

Such a system still has a problem of identity verification, ensuring that the public key made available corresponds with the right client. Two types of systems are currently available. The first system requires a central party to be trusted by all clients on the system. This party then validates every public key before it is made available. The trust from that centralised party is normally marked using digital signatures. The second system allows users to trust each other's keys directly, but that encoded trust is then placed onto centralised repository so users can access it.

The Self WOT of some examples is a decentralised public key distribution system where the end clients are able to assert or revoke their mutual trust as data blocks containing digital signatures. In some examples, these signatures (or references to them) are placed onto a blockchain that acts as a tamper-proof distributed ledger made accessible to all clients. This allows for full decentralisation and visibility without the need for a trust anchor such as the conventional systems described previously.

The encoded mutual trust will have a weight parameter, indicating the different degrees of trust between end clients.

Clients can then parse the blockchain to generate an internal graph representation of the current trust relationships between all public keys present on the system. This internal graph representation will contain the different public keys as the graph nodes and the encoded trust relationships as the graph edges.

Once that internal graph representation is available on the client, the client will be able to calculate the level of indirect trust for any two non-contiguous nodes on the graph by using the number of paths available between those nodes and the combined aggregate weight of the edges traversed by each of those paths.

In this example, the level of indirect trust is calculated by traversing a graph. However, other examples use a different approach. For instance, in one example the WOT could be modelled using normalised or de-normalised database structures (for example) and still produce the same functionality. This would, however, be less efficient without changing the underlying structure being modelled.

In the case of a database or other data structure, the level of indirect trust is calculated by iterating through the data structure and thereby parsing data stored by the data struture.

WOT System

The following description sets out the elements of the decentralised web of trust system of some embodiments which utilises a blockchain.

Client

Figure 15:
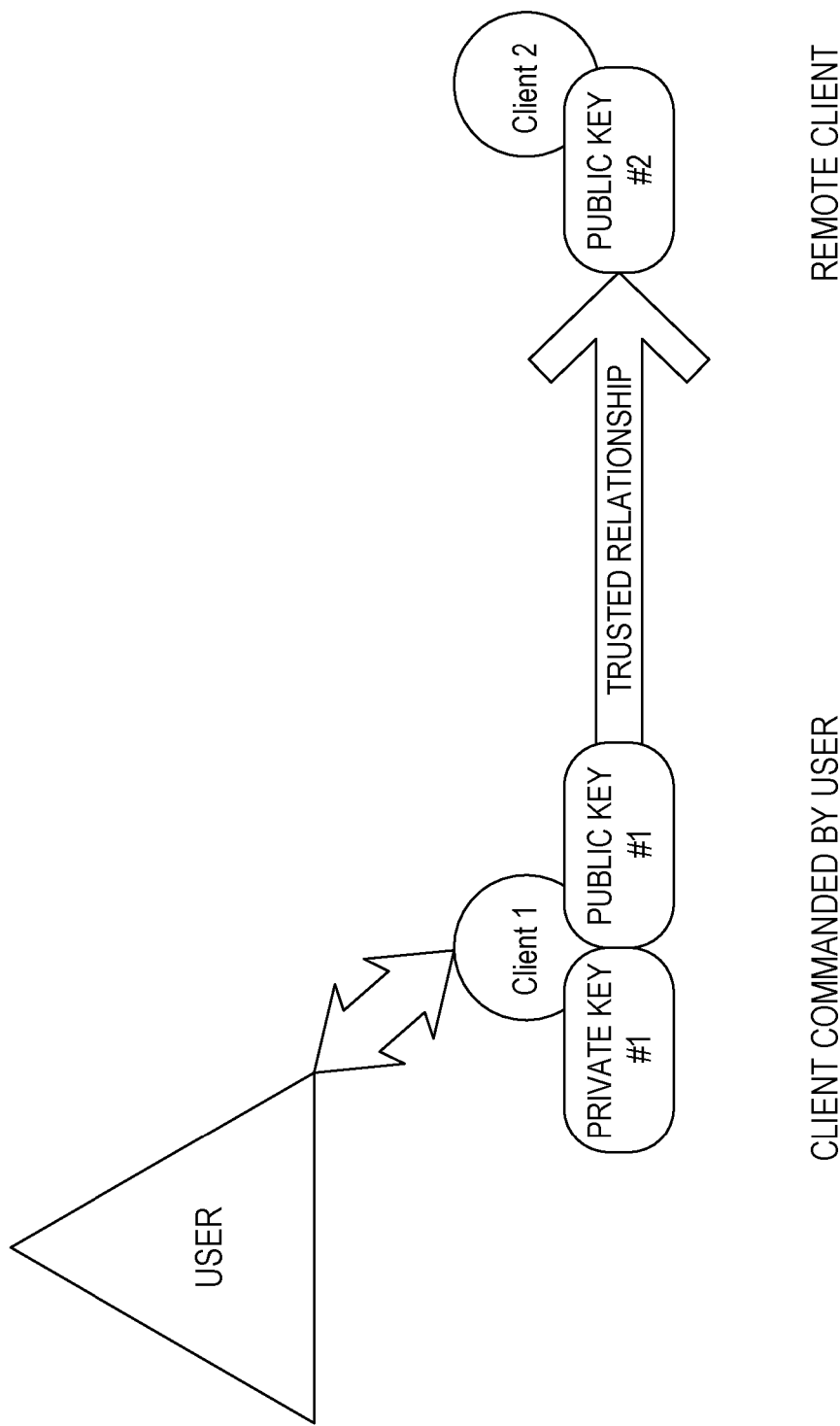
FIG. 15 is a flow diagram of a part of a method of some examples of this disclosure.

A Client herein refers to a software or hardware entity that generates a public key cryptography key pair (with a public and a private pair) and participates on the system. A client is fully identified on the system via its full public key or (if key sizes are long) a shorter, but by large unique representation of it. A "user" is a machine or person commanding one or more clients to access the system. FIG. 15 shows a local client (both private and public key visible) and the local client visibility of a remote client (public key only)

Trust Relationship

A Trust Relationship herein refers to the degree of confidence a user attributes to the perceived value of another client's public key. This can vary from "none" if the trust relationship is to be terminated, or "full" if the trust relationship asserted by the user is absolutely certain (typical of trust asserted by a user on its own client public key). Trust relationships do not need to be symmetrical (i.e. client A may trust client B, but client B may not trust client A).

Trust relationships can be reissued if the degree of confidence changes over time, as users gain or lose confidence on the clients.

A special case is the "own trust relationship" which is a degree of confidence a user asserts on its own client's public key. By default this would be "full" under normal operation, but it could be downgraded to "none" on a new reissue, allowing the user to indicate the rest of the network that this particular client is no longer to be trusted. This event will mark a key revocation.

Trust Signature Block (TSB)

TSB is the digital encoded pattern of a trust relationship. This would be a pattern of digital data encoding comprising at least one or more of the following fields:

1. tsb-pk1
the public key of the client making the trust assertion (or a shorter representation of that public key—for longer key sizes),
2. tsb-pk2
the public key of the client under assertion (or a shorter representation),
3. tsb-weight
a weight value indicating the level of such trust relationship,
4. tsb-timestamp
a timestamp indicating the time when this assertion takes place and
5. tsb-sign
a digital signature performed with the private key of the client making the trust assertion of the four previous fields.

Figure 16:
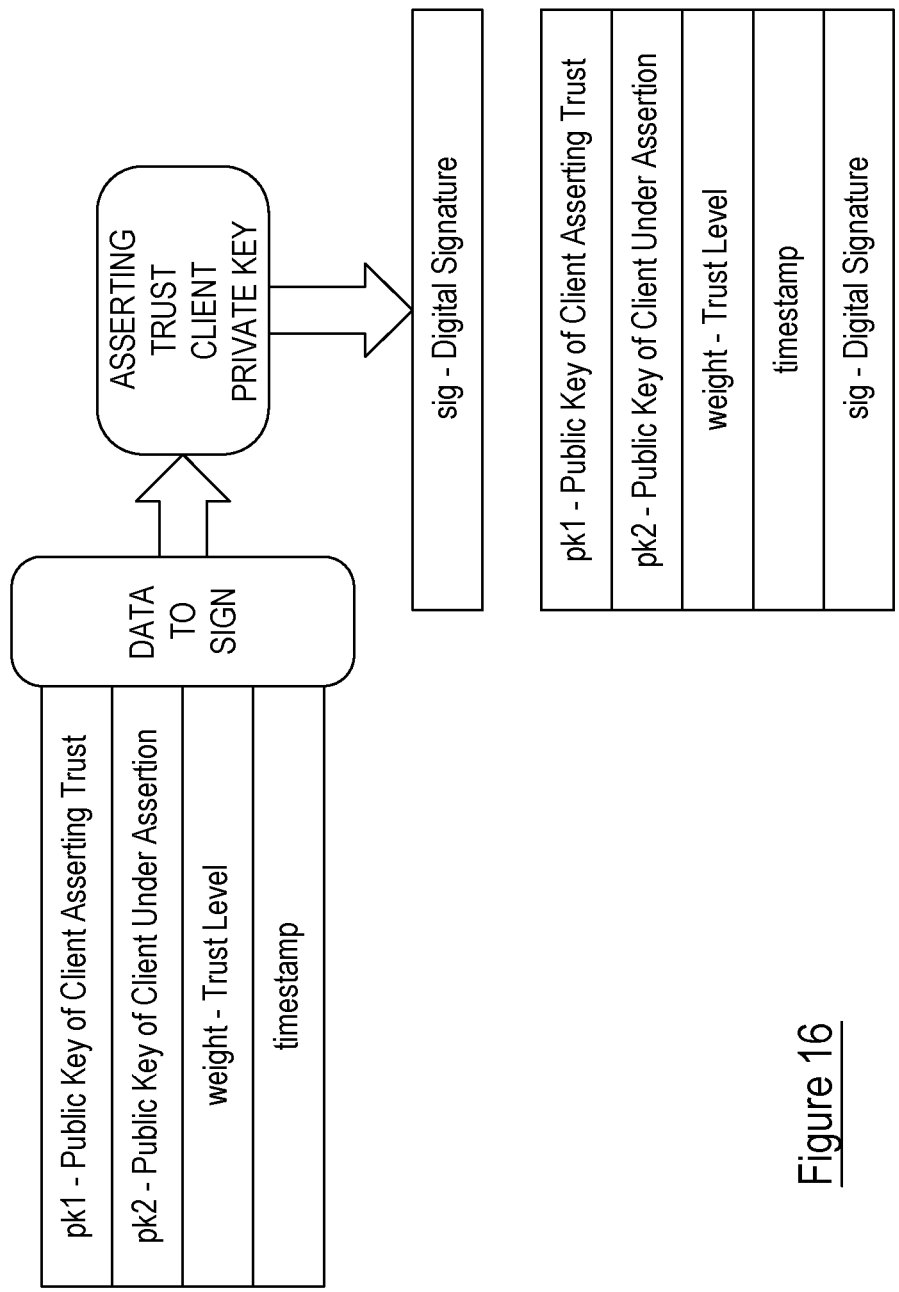
FIG. 16 is a flow diagram of a part of a method of some examples of this disclosure.

A system implementation may add other optional fields, but there would be no need for them to be included on the list of fields to sign-on. An example TSB is outlined in FIG. 16.

New/Revocation tsb

A special case is a new key publication or revocation trust signature block where the public key on tsb-pk1 and tsb-pk2 will be the same. On new key publication, the value on tsb-weight will be different to "none" (typically an encoding of the maximum value "full trust"). On revocation, the value will be set to "none". A new key publication and key revocation TSB are displayed on FIG. 16, note that the two public keys on the TSB on both cases are equal. The digital signature can only be performed with the client private key ensuring only the original client is capable of producing these two special cases TSBs.

Publication

Figure 17:
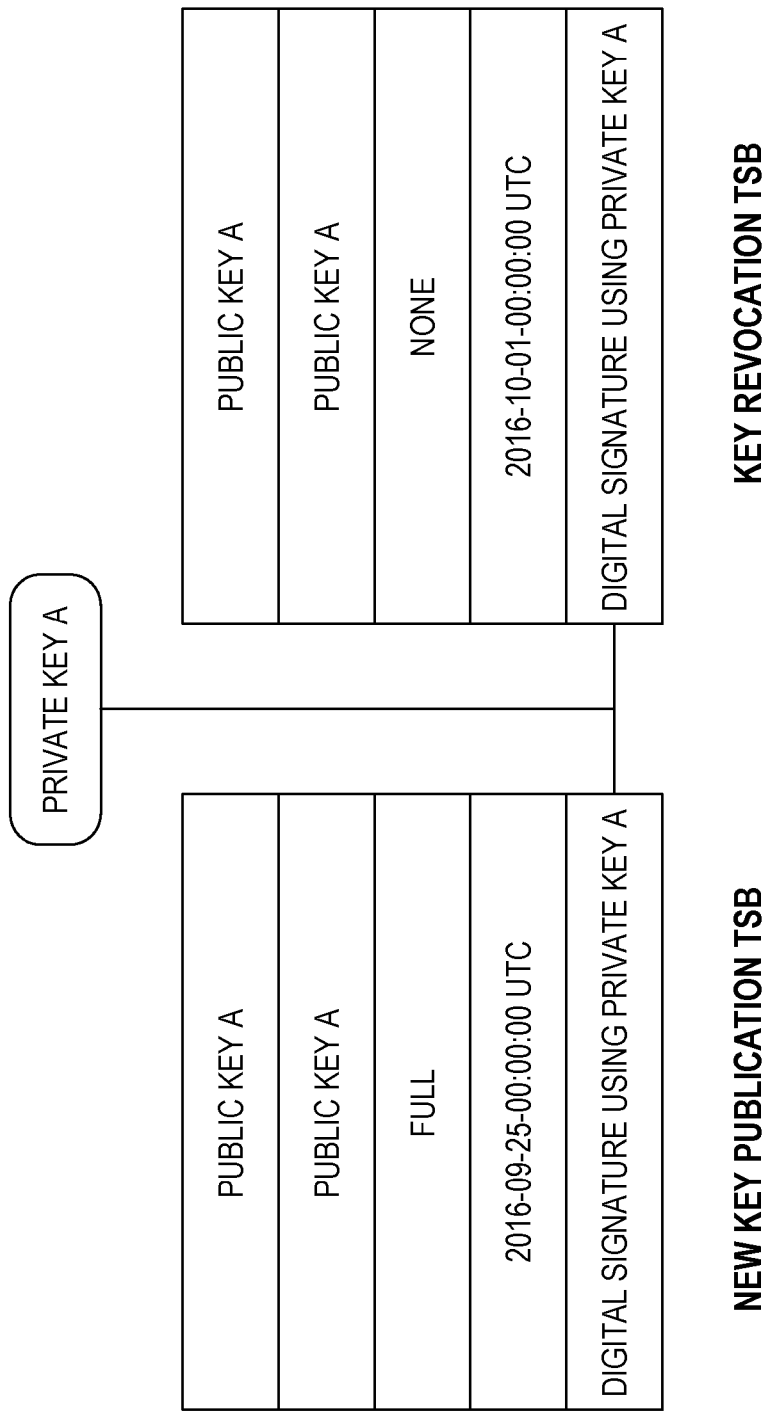
FIG. 17 is a flow diagram of a part of a method of some examples of this disclosure.

A publication event is the mechanism where the encoded TSB is inserted on the blockchain as a transaction. Depending on the blockchain implementation the transaction will take a variable period of time to be confirmed. Once inserted, the TSB created will be embedded inside a blockchain block as per normal blockchain operation. This is illustrated in FIG. 17.

Timestamp Rules

The timestamp field tsb-timestamp will be used to ensure that these events are in order and comply with the following system rules:

1. Timestamps on TSBs cannot be higher than the timestamp on the blockchain block containing it. Such TSB will be rejected by the blockchain network or parsing clients.
2. Timestamps on TSBs cannot be much lower than the timestamp on the blockchain block containing it to prevent backdated signatures.
3. Public keys on the system need to be published (new key publication) before they can be used on a TSB. A new key publication TSB with a prior timestamp needs to be present on the blockchain for a TSB to be processed.

A client on the system will be able to access and parse the blockchain from its genesis block (first block) and read all TSBs embedded on it. TSBs should be processed using their internal timestamp order, rejecting those TSBs discarded due to the timestamp field rules.

The client will build an internal representation of the graph database as TSBs are being parsed.

In some examples, as each trust signature block is parsed the following steps will be taken:

The TSB digital signature (tsb-sign) will be validated against the public key on tsb-pkl. If the TSB signature is invalid the TSB will be discarded.

The two public keys tsb-pk1 and tsb-pk2 will be looked up to ensure that:

If they are the same, process the key publication or revocation event.

A new key publication TSB will add a new node tagged with the public key to the graph database A key revocation TSB will remove the relevant node from the graph database, also automatically invalidating/deleting all edges leading to/from that node.

If both keys are distinct, the client will check that a new key publication TSB exists with a prior timestamp for either key and that neither key has yet been revoked with a revocation TSB. That being the case a new edge will be added to the graph, tagged with the trust level value indicated on tsb-weight. If the new trust on the TSB is "none" an existing edge will be removed from the graph.

Figure 18:
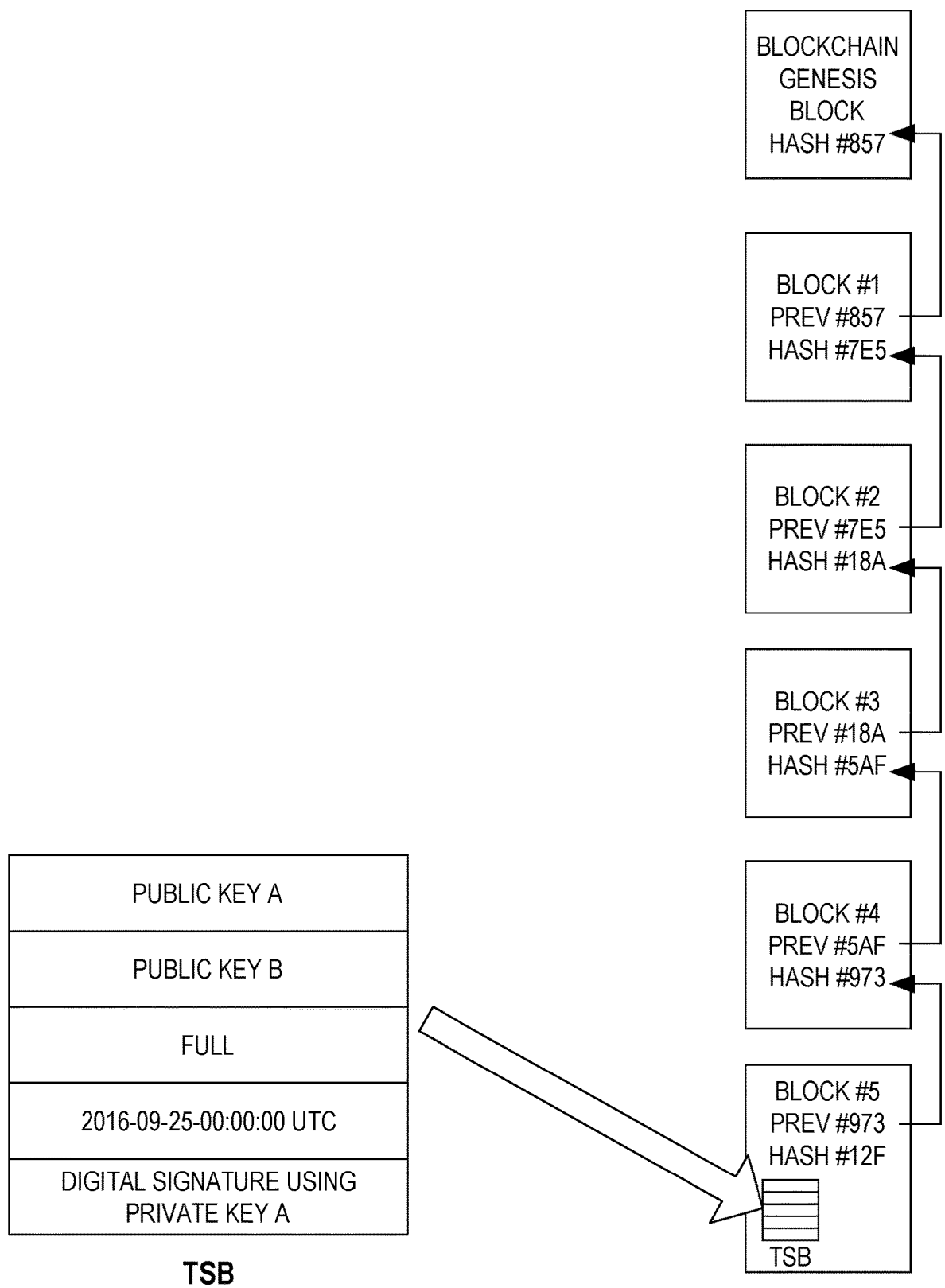
FIG. 18 is a flow diagram of a part of a method of some examples of this disclosure.

An illustration of a simplified process on a short blockchain (5 blocks with only 26 TSB events) is outlined on FIG. 18, with the dynamic representation of the internal graph database on the left hand site adding and removing nodes and edges as indicated by the blockchain transactions.

Figure 19:
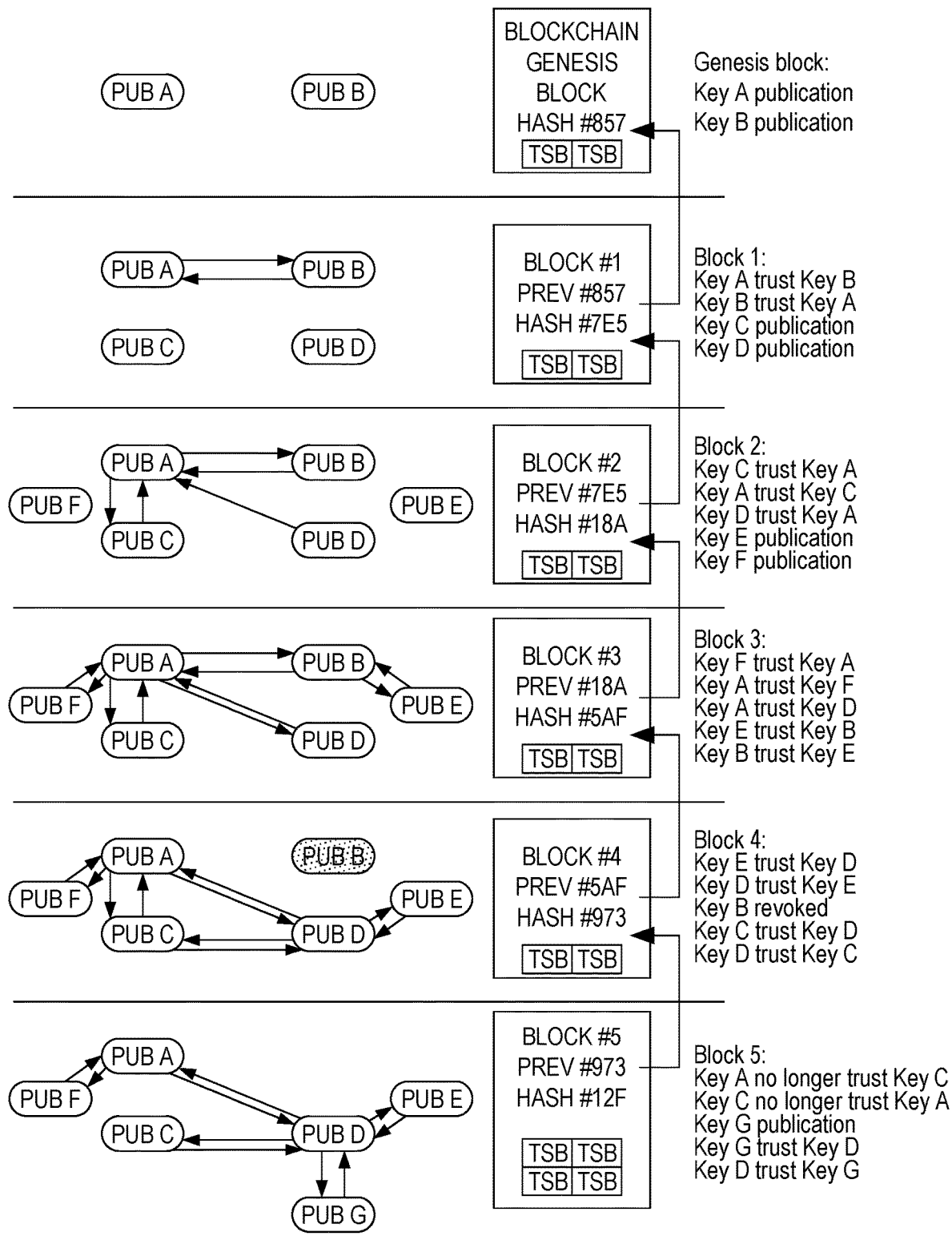
FIG. 19 is a flow diagram of a part of a method of some examples of this disclosure.

Once a full internal representation of the graph database has been built, the client will have full visibility of clients on the system, as identified by their public keys, and their trust relationships between them. The graph is still anonymous (FIG. 19), as the system does not provide an explicit manner to link users and their clients.

The client will store this built graph database alongside the latest TSB timestamp entered on it. Whenever new communications are required, the client will perform an incremental update of its internal graph database by parsing new blockchain blocks with new TSB before re-examining the graph database.

Figure 20:
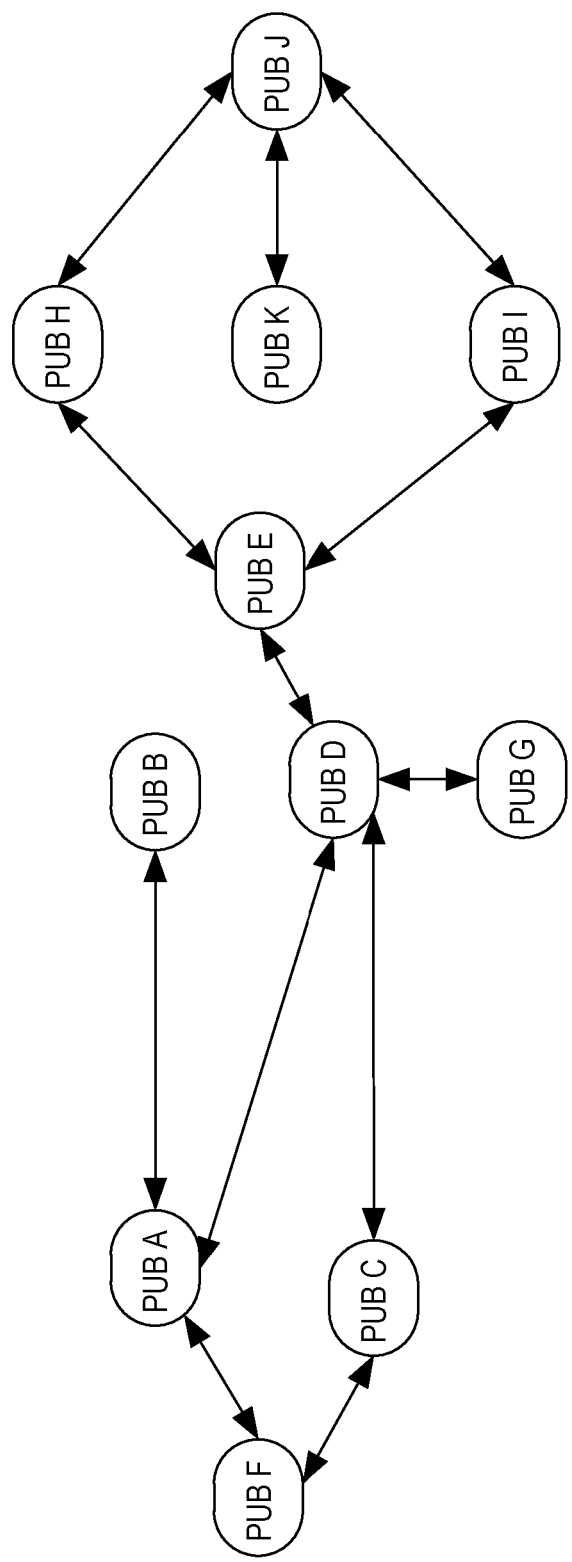
FIG. 20 is a flow diagram of a part of a method of some examples of this disclosure.
Figure 21:
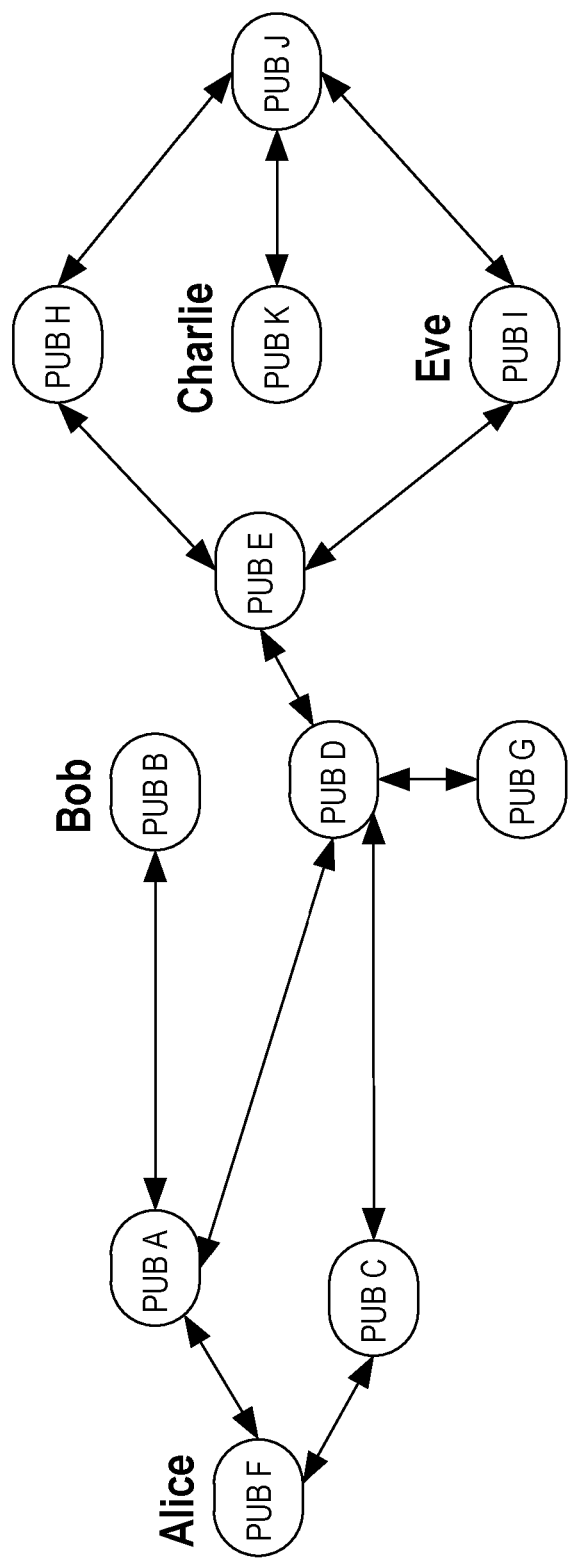
FIG. 21 is a flow diagram of a part of a method of some examples of this disclosure.

This link between users and public keys can be done similarly to the way entities would exchange email addresses or telephone numbers. A client could optionally implement a contact list functionality linking a short number of users with their one or many public keys on the system. An updated graph with a public key/contact matching is shown in FIG. 20.

Given the nature of public key cryptography this exchange of public keys does not strictly require secure transmission. Once received the public key will be matched to an internal graph node.

In order to establish a secure communication with another client once a public key is received, a client will need to calculate the available paths between the node representing its own public key and the node representing the received key. An example of such representation is in FIG. 20.

If no paths are available on the graph database, the client indicates to its user that an indirect trust relationship could not be established and that the received key is untrusted.

If one or more paths are available between the two keys, the client calculates an aggregated indirect trust score of the available paths and presents it to the user. Higher scores indicate a higher degree of trust. The user on the system could then use the received public key for a secure communication exchange with the calculated degree of trust.

One example process comprises taking two items from each available path: number of edges along the path and lowest trust level of an edge along the path in a tuple (num edges, lowest trust level). To calculate the aggregated trust score for all available paths we can take the tuple with the highest trust level. In the event of a tie, take the tuple with the lowest number of edges. The client could present this tuple alongside the number of available paths to the user in order for the user to make a decision on whether to proceed with secure communications or not.

Figure 22:
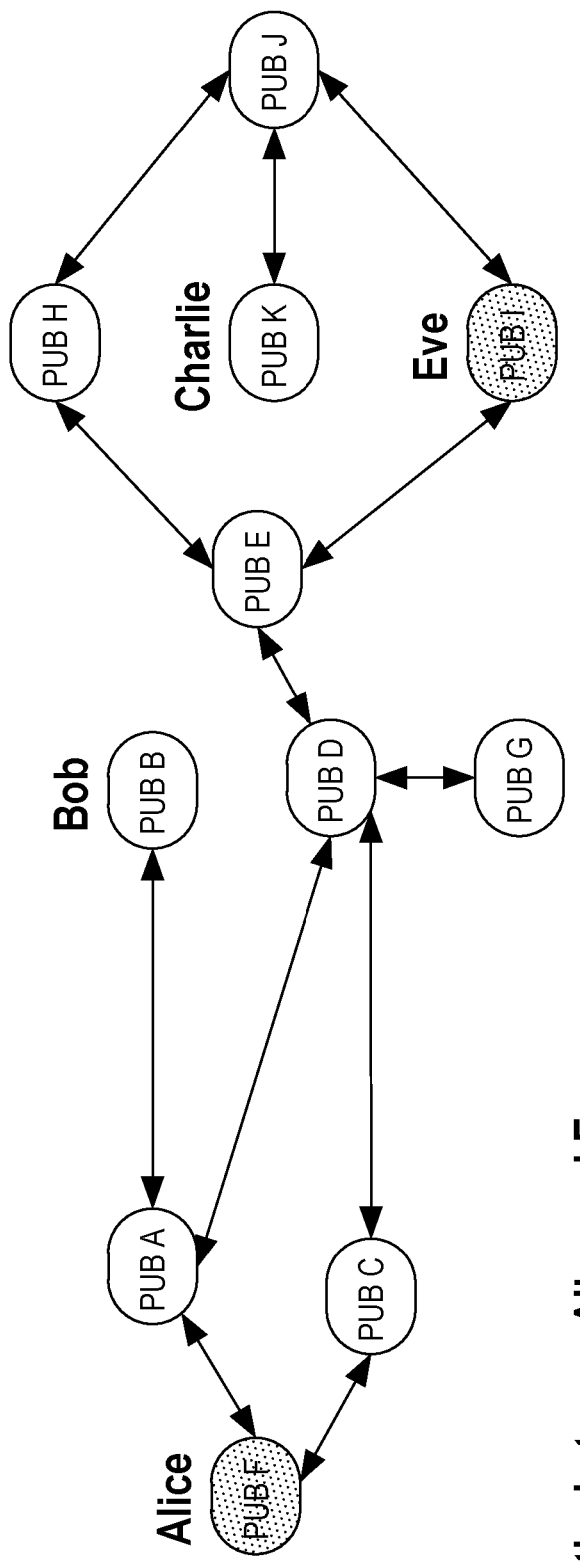
FIG. 22 is a flow diagram of a part of a method of some examples of this disclosure.
Figure 23:
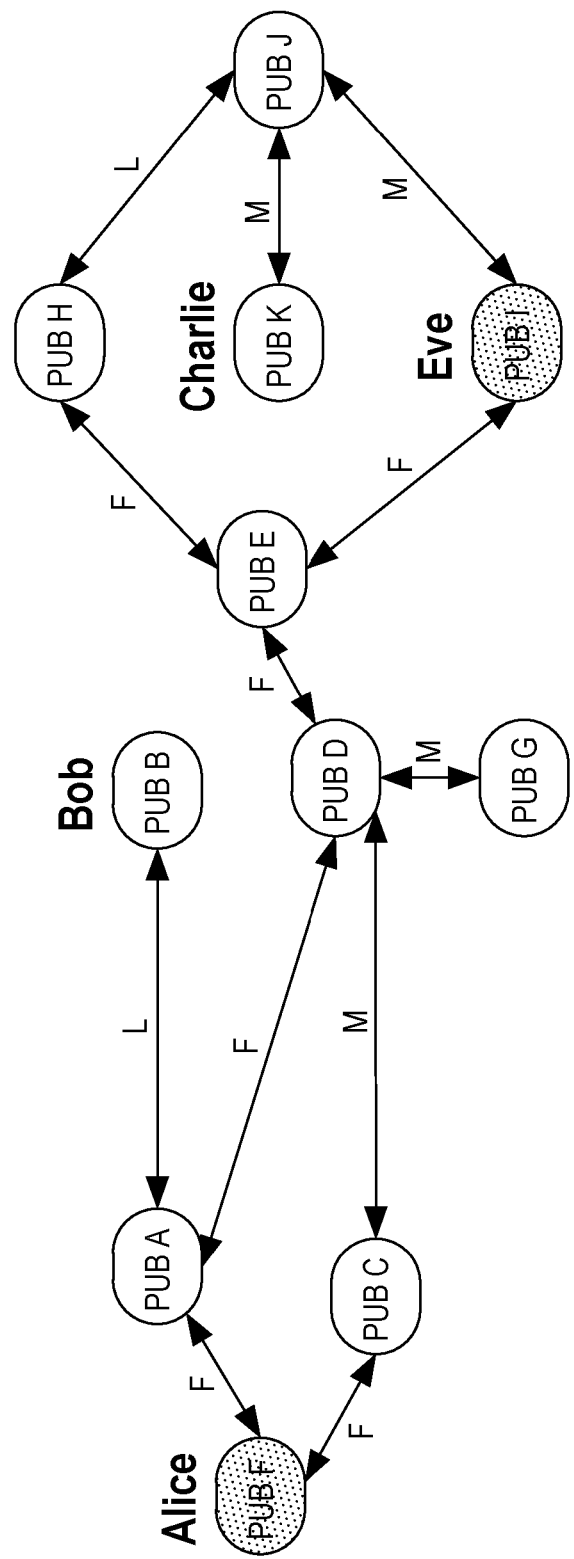
FIG. 23 is a flow diagram of a part of a method of some examples of this disclosure.

Under this example process, scores are more trustworthy if the number of paths is higher, the number of edges on a path is lower and the trust level if higher, with "1 path (1 edge, full trust)" being fully trusted, and equal to the trust a client has on itself. An example calculation is shown in FIGS. 22 and 23.

This decentralised public key infrastructure (DecPKI) may advantageously be applied in securing communications in numerous fields:

Finance—financial transactions (e.g. bank, funds and shares transfer)

General messaging—email, instant messaging, teleconferencing, conducting phone conversations E-commerce—establishing, following and enforcing contractual relations as well as controlling payment method and beneficiary rights Data transfer—ensuring data is securely transferred with over calculated level of trust, according to local data classification policies Deficiencies with Existing WOT Solutions that are Addressed by Self Pure conventional WoT solutions contain a number of drawbacks which Self seeks to remove.

Scaling a WoT is difficult due to the necessity for parties to verify their true identities which is usually carried out using in-person or virtual in-person meetings (in the case of individuals) where identity is verified and keys are signed. Self through the use of it's end-to-end communications infrastructure, embedded PKI and Fact and Identity verification enablement allows the creation and maintenance of a large (population) scaleWoT in which all parties can be identified.

Maintaining privacy in public WoT solutions is difficult due to the need for key lookup. Even though keys are pseudonymous, the public nature of key lookup and the possibility of correlating keys with their owners (by analysing email signatures etc.) has historically made PKI based WoT implementations (such as Keybase and PGP) eminently data minable. WoTs rely on the connection metadata and signatures between parties which are checked to produce a network of trusted Entities. Self's implementation of both pseudonymous and anonymous identity results in the elimination of the privacy problems caused by the data minability of existing systems.

Trust in both WoT and more traditional certificate authority type systems such as that maintained for TLS/SSL certificate provision relies on revocation lists which should be checked by certificate authorities and clients to make sure that trust is not placed in entities (in a certificate chain) which no longer have trusted status. Unfortunately, due to a mixture of flawed implementations, long validity times and human error, vulnerabilities are common. The Self Network communicates changes in the trusted status of Entities with Relationships securely using end-to-end encrypted communication. This means that the trust relationships embodied by the network are constantly refreshed and strengthened or broken. With these status changes being communicated immediately to interested parties.

The WOT of Some Examples Seeks to Provide the Following Improvements Over Existing Systems:

1. Ability to establish a network of public keys using indirect trust via digital signatures, the method comprising:
    a. software or hardware clients able to generate unique asymmetric cryptographic key pairs
    b. clients asserting or revoking direct trust relationships (when commanded by their users—which could be persons or machine code).
    c. clients will then publish their direct trust relationships onto a decentralised/distributed database accessible to other clients.
2. Able to maintain aforementioned network in a decentralised manner by publishing the trust relationship between those keys using a blockchain, the method comprising:
    a. clients encoding their direct trust relationships between their public keys using digital signatures onto time-stamped data blocks
    b. publishing these data blocks as transactions in a blockchain available to all clients on the network.
3. Ability to allow a client to parse all entries in a blockchain to generate a separate, internal and independent representation of the current state of trust relationships between those keys, the method comprising:
    a. Parsing and validating all direct trust relationship blocks contained within the blockchain.
    b. Converting the information on these parsed blocks onto actions on an internal graph database representation with nodes and edges addition and deletion within a client internal graph representation.
4. A client can calculate an indirect trust score between two given public keys on the system, the method comprising:
    a. Examining the resulting graph database generated via claim 3, to ascertain the available paths between the two nodes representing the two public keys under analysis
    b. Calculating an aggregated score using the data available for each available path.
5. A client can update its internal representation of the current state of trust relationships, this method comprising:
    a. Storing the internal graph database alongside the timestamp of the last direct trust relationship block parsed.
    b. Scanning the block chain to identify the block containing that last timestamp.
    c. Incrementally updating the existing graph database with the information stored on new direct trust relationship blocks store in the blockchain but not yet parsed.

Biometrically Tying Claims to an Individual

Current systems only provide black box proof of a biometric check having been done. Unfortunately they do not explicitly prove that the check has been performed by the same individual. This means, for example, that fingerprint and face recognition on mobile devices can be bypassed by adding another finger or a different face regardless of who they belong to. Self Biometrics will not allow the addition of facial biometrics, or behavioural biometric data from unrelated individuals. In addition, the Self Biometric accuracy improves over time as more samples are added to the model.

Trusted Agents

In some examples, Self takes advantage of trusted agents or autonomous agents referred to herein as Mimirs which enforce the terms of agreements, provide pseudonymity or anonymity and act as a proxy for an Entity.

Unlike conventional systems, the terms of an agreement can therefore persist beyond the initial interaction between Entities. Where necessary, the contracts in question and the data which the contracts govern can be kept available and up to date for the duration of the agreement. Crucially, this means that contracts can persist after a user has uninstalled or left a service, providing a solution to one of the problems of using fully digital contracts.

By acting as proxies for Entities on the Self Network, Mimirs are also able to provide unidirectional or bidirectional anonymity which can be combined with intermediary or zero-knowledge methods to provide interactive or pre-agreed disclosure of facts with logical triggers.

Modern "big-data" and machine learning (ML) based targeting methods rely on the asymmetric nature of the relationship between service providers such as Facebook and Google and the end-users utilising these systems. In essence, this results in a massively asymmetric tension between a user who wishes to simply use a service and who has only their own brain, attention and knowledge to protect their data (assuming they are even aware of the risks) and the big tech players (Facebook, Google, Amazon) who bringing massive amounts data, statistical and ML analysis and manpower to bear on each individual in an attempt to monitor and change their behaviour, usually towards a transaction (but sometimes in order to change their perceptions, e.g. Facebook news bubbles).

Self Mimirs, when acting as proxies are able to obfuscate and misdirect big tech's tracking and manipulation by being able to present multiple identities per Entity relationship. This stops the correlation, tracking and manipulation of users across multiple sites and apps and allows users to selectively disclose only the data they wish to. Additionally, the attachment of licenses to all data disclosure and the ability of Mimirs to enforce these relationships, for the first time gives individuals the ability to enforce the correct usage of their data with accountability built in.

Social Networks

The Self Network seeks to securely connect people/entities, and then to let those people/entities interact with each other without the risks, fears or uncertainty that is inherent in Internet-based communication.

Just as we are used to doing on social channels today, Self provides the facility for users to post updates, statuses and other data to be read by their connections. Unlike today's social media, the posts are combined, not on a web platform, but in the recipient's Self Client. This peer to peer social network leverages the Self WoT to mean that only people the user trusts can see their posts.

Parents can protect their children, while allowing the children to have the freedom to explore technology.

Challenges Addressed by Self

In developing Self, the first problem to tackle was how to create a real-time internet identity, something that wasn't tied to nationality, but was inherent in the uniqueness of everyone. Replicating state identity wasn't sufficient; it's not universal, is often compromised and is out of the control of the user. The purpose of an internet identity is focussed on simplifying and securing the everyday interactions between people, companies and things.

The second problem was about proving that data was accurate and current so that decisions, plans and contracts could be based on truth. We spend so much time and effort re-proving things which have already been proved. Life would be so much easier if the information we need could be there when we need it. Imagine how quickly a house sale could happen; imagine always having your medical records available; imagine letting your kids online without being worried they'd come to harm. Accurate, current data can do that.

Self seeks to solve these problems by going back to the first principle of all human interaction, the people. Self empowers people with tools to gather data held about themselves and give them the ability to verify that data using automated subject access requests. People become their own single source of truth. Companies become the consumers of people's data, but with consent and purpose, so all the data they have is useful.

In some examples, Self is a network, accessed from a consumer or embedded app and by API that allows anyone to request verified data from anyone else they are connected to through the network. Users store structured data about themselves on their smartphones which they then verify. Requests for the data from a user's connections are made by API call and fulfilled either by the user directly or by autonomous agents acting on the user's behalf and the responses are licenced, permissioned and encrypted.

Self seeks to vastly improve user experience by making it possible to embed strong customer authentication and KYC into every login or transaction, so you don't have to repeatedly do the same thing. In the process Self seeks to de-risk organisations and gives them the certainty that the data they use is permissioned and accurate in real-time. It replaces slow and expensive fact or identity verification with trusted relationships built around a new data model with the consumer at its heart.

Use Cases

Several use cases for the systems and methods of this disclosure are set out below. However, it is to be appreciated that these are non-limiting examples of certain specific use cases of the systems and methods described in this disclosure.

Use Case: Electronic Voting

The ability to trust in the integrity of a voting process is critical to trust in and compliance with democratic process. Voting systems are currently based on process which is decades if not centuries old, it fails to take account of the out of band ability to subvert it and it was designed for a time when the number of voters was significantly lower. Now, even in low turnout democracies such as the US there are queues at polling stations and some people are unable to cast their votes. Mail in votes cause controversy and there are lots of attack vectors for a system which has become complex.

Electronic voting has been tried, but it remains an electronic version of the existing process, which retains the existing flaws and adds new ones.

Figure 24:
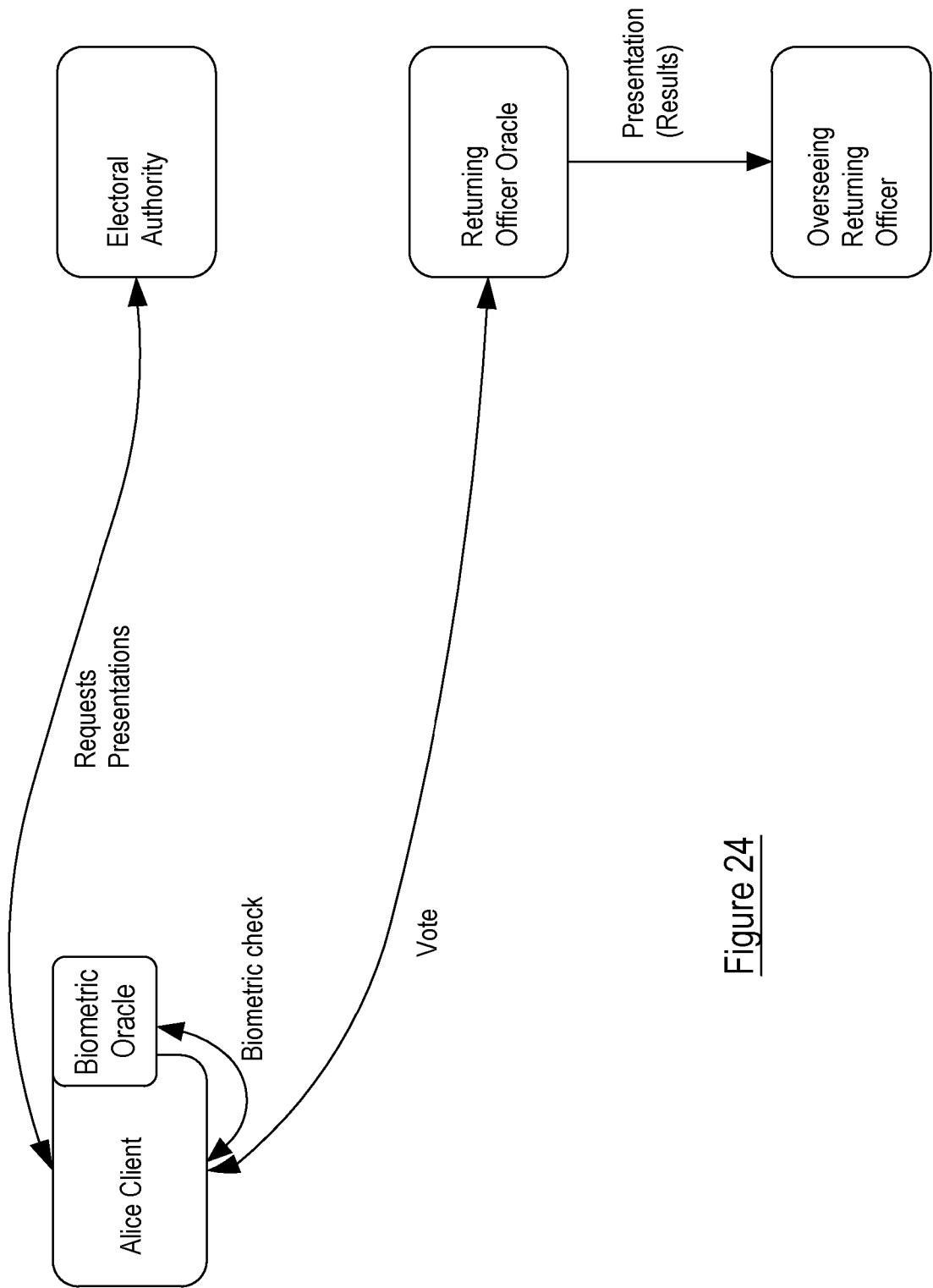
FIG. 24 is a flow diagram of a use case of this disclosure.
Figure 25:
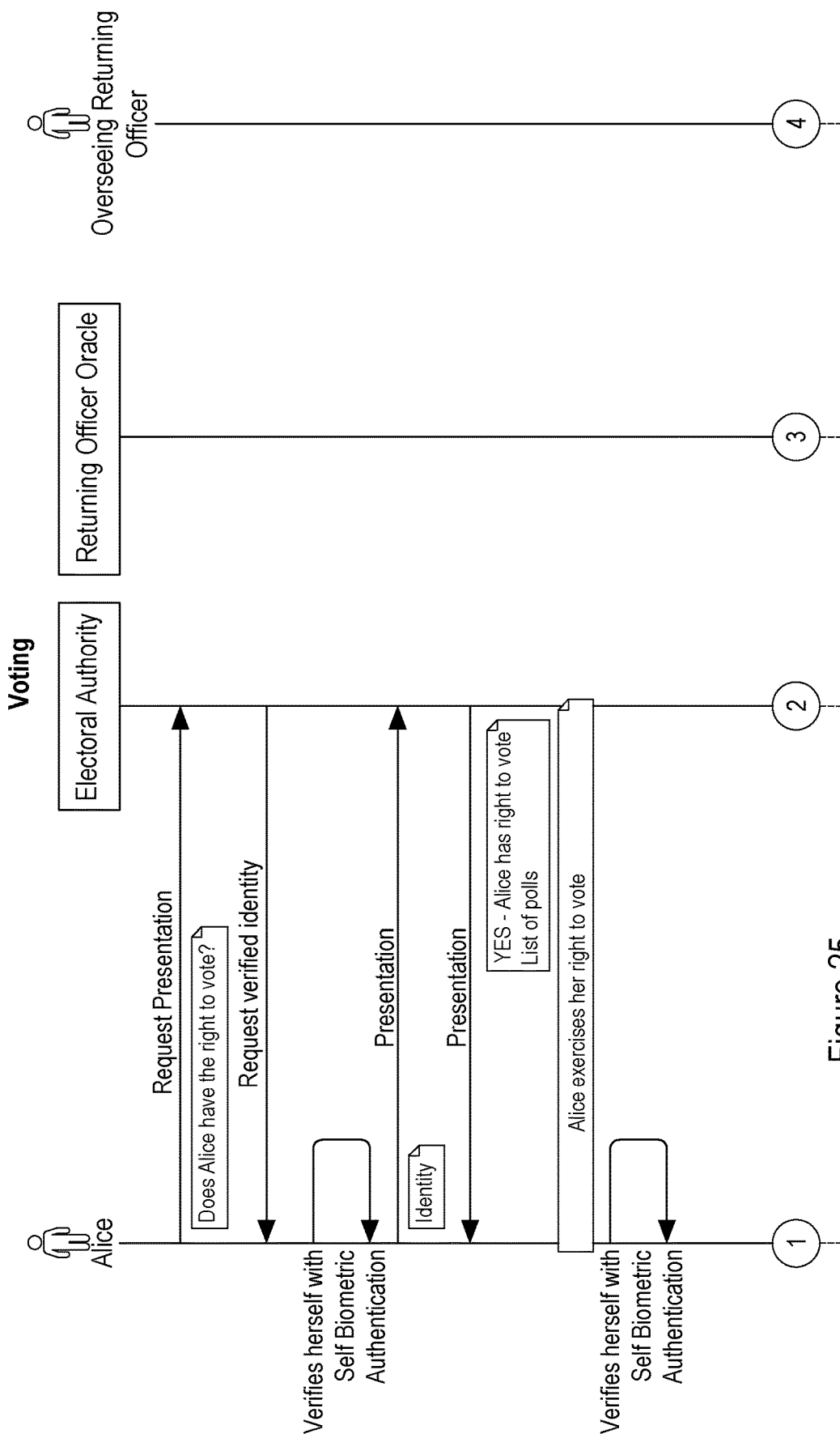
FIG. 25 is a sequence diagram of a use case of this disclosure.
Figure 25:
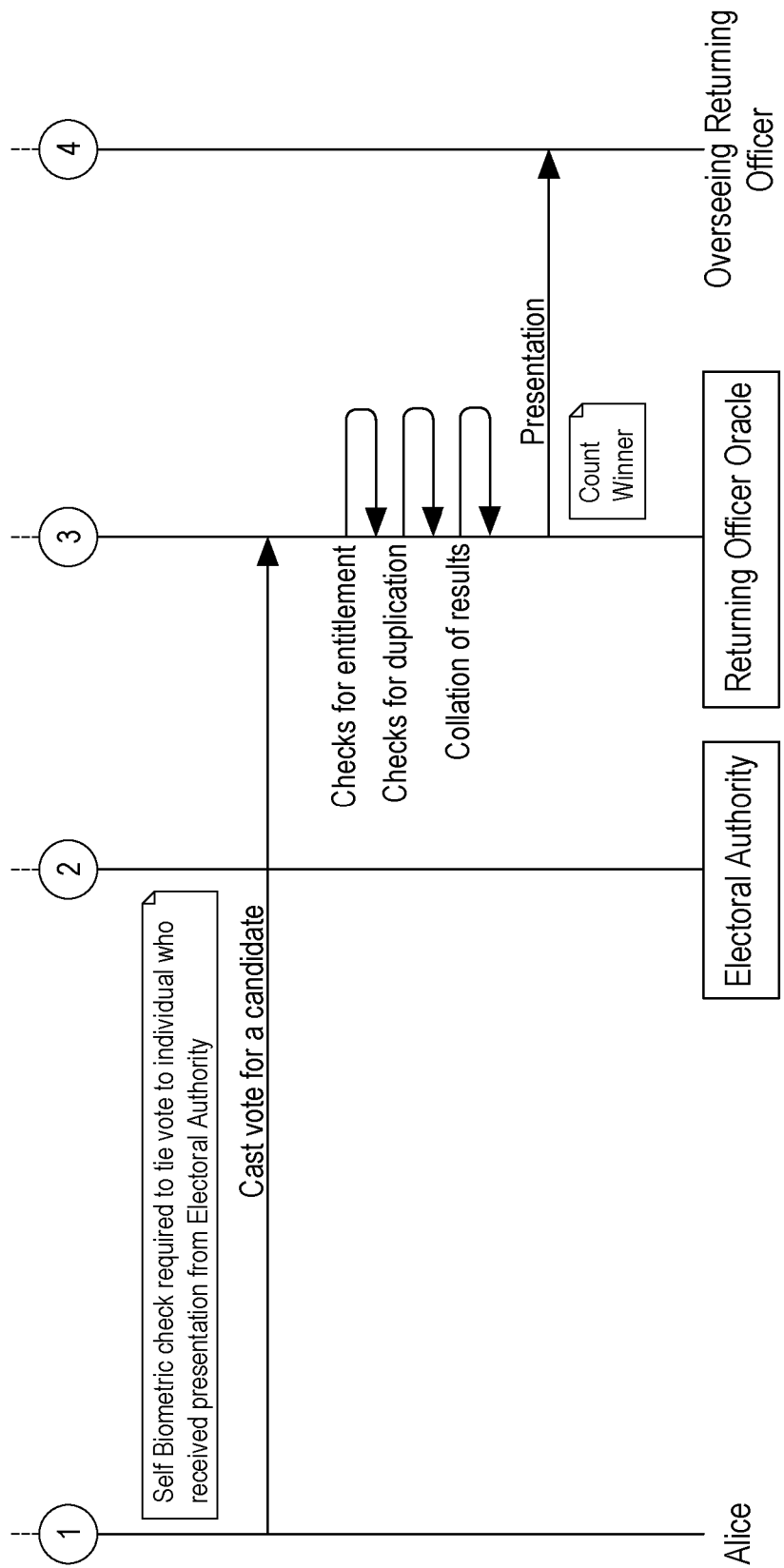

Self enables voting processes to be cryptographically secure, based on verified facts and tied to real time biometrics. It also allows voting from anywhere using the device in your hand. It's approach is simple, know who is voting, know what elections they are entitled to vote in, and count the votes. It makes it impossible to duplicate a vote, impossible to vote without entitlement and impossible to know who the vote has been cast by. In all that it mimics the core democratic principles which are the hallmark of modern democracy, but it handles the issues the now arise from the numbers of voters and the ability to corrupt elections through technology and the broad spectrum of voting processes. FIGS. 24 and 25 outline the process.

Use Case: Keeping Children Safe Online

Both parents and children can have Self accounts attached to a verified ID. Parents can have admin rights over their children's accounts which can be used to restrict a child's access to the internet based on safety criteria set by the parents.

A child's account could also be connected to their school, their doctor and to their accounts on gaming and social platforms. This cross-referencing of accounts against a verified Self account allows segmenting contact by age group, school or class, and it can be used to manage safeguarding issues—a school and parents working together could stop cyberbullying for example.

Almost all of this allows a zero-knowledge approach to protecting children. What they can do can be enforced based on verified fact, but without parents getting to see their kids online activity. The children can be free to safely experience the internet and technology without feeling their privacy is being invaded.

Here we have worked up a real world example wherein Schools in the US are being asked by parents to be intermediaries (currently using paper forms) in the process of ensuring children only get access to multiplayer games when the players are all approved by and known to the parents. For example all the kids in a school, or a class or a social circle can play together, but anyone else is excluded. This is a problem at scale; Fortnite alone has 80 million daily players under 18. They typically log in to the game on their return from school and use the games open chat function as a big live zoom call with their friends while doing homework or playing.

The Self Network could be used to automate the permissions process while giving children more anonymity and freedom (within a controlled world) than the current paper process allows them.

Figure 26:
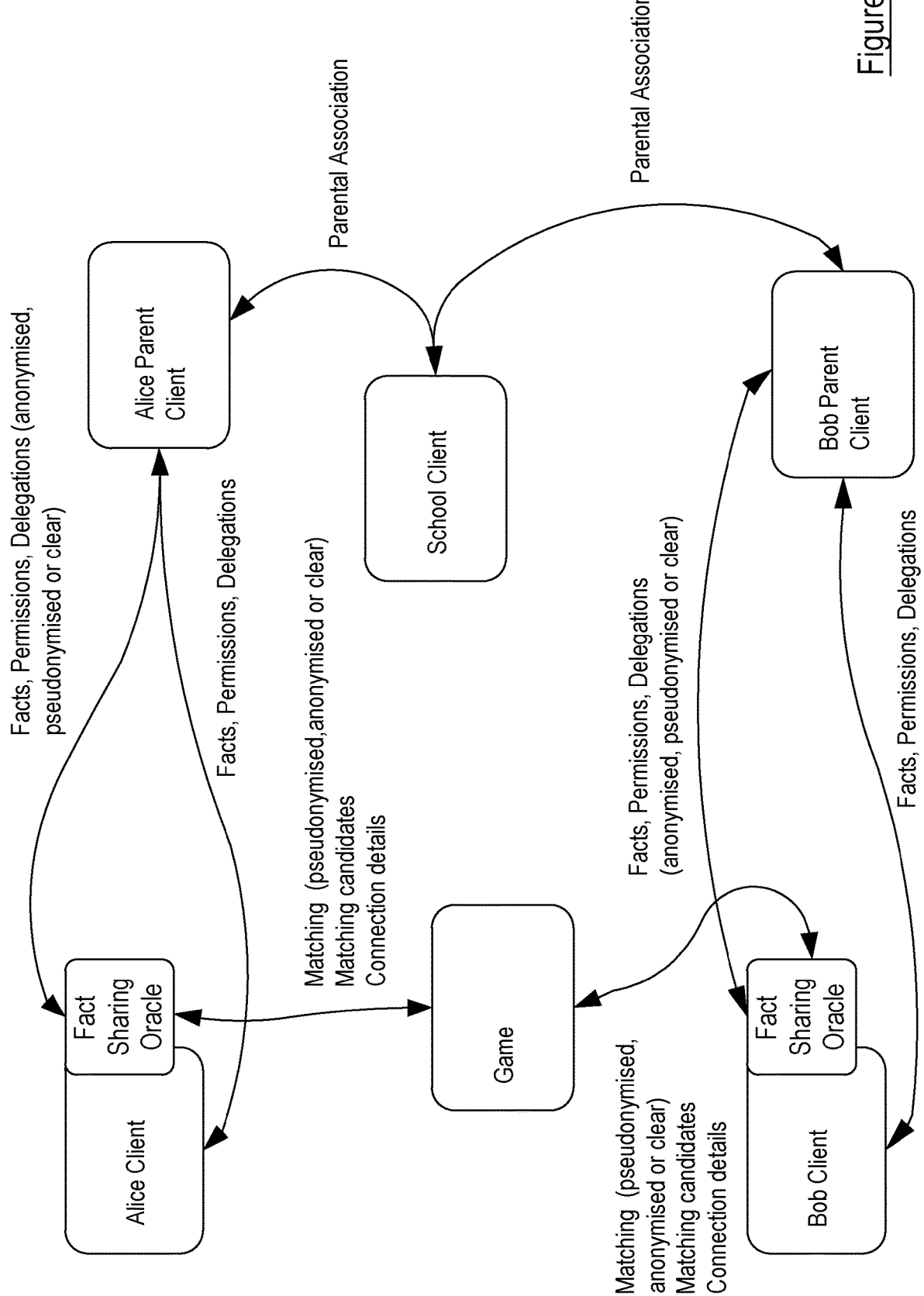
FIG. 26 is a flow diagram of a use case of this disclosure.

In our worked example the child has a smartphone and a self account, astonishingly this is not as unrealistic as it might seem! Their parents can set criteria around who they can play with (the age group, the location, the organisation like a school or club the child is associated with) but they can't select individual children without intermediation from an authority like a school (this prevents the system being used to further prejudice amongst other things). FIG. 26 outlines the process.

Use Case: Renting a Car Without Sharing Any Personal Information

A consumer renting a car could log in to their account with the rental company using Self. This would confirm they were the actual account holder. Once they have chosen a car and decided to rent, the company could ask them for the information they needed. This wouldn't be the personal data they ask for today, but the information that data gives them in the form of zero-knowledge facts, key signed by either Self or the authority providing them. For example:

Is the driver between 25 and 70?
Do they have a valid licence from an accepted country?
Does the licence meet their requirements?
Does the insurance record meet the requirements?

The parties execute a smart contract for the rental and the user pays, securing their card transaction with a Self verification confirming that they are the one paying. The user collects the car, identifying themselves with Self and using the rental company app to access the vehicle.

At this point, the user has had to supply no personal information, not even a name. However, the rental company might need some personal information in the event that a problem occurs. So, in the smart contract, the user delegated permission to their autonomous agent to share things like their name or address during the term of the contract if it's needed. Provided it is not needed, the user would have rented without sharing any personally identifiable information, while the company would have had all the information they needed to deliver their service.

Figure 27:
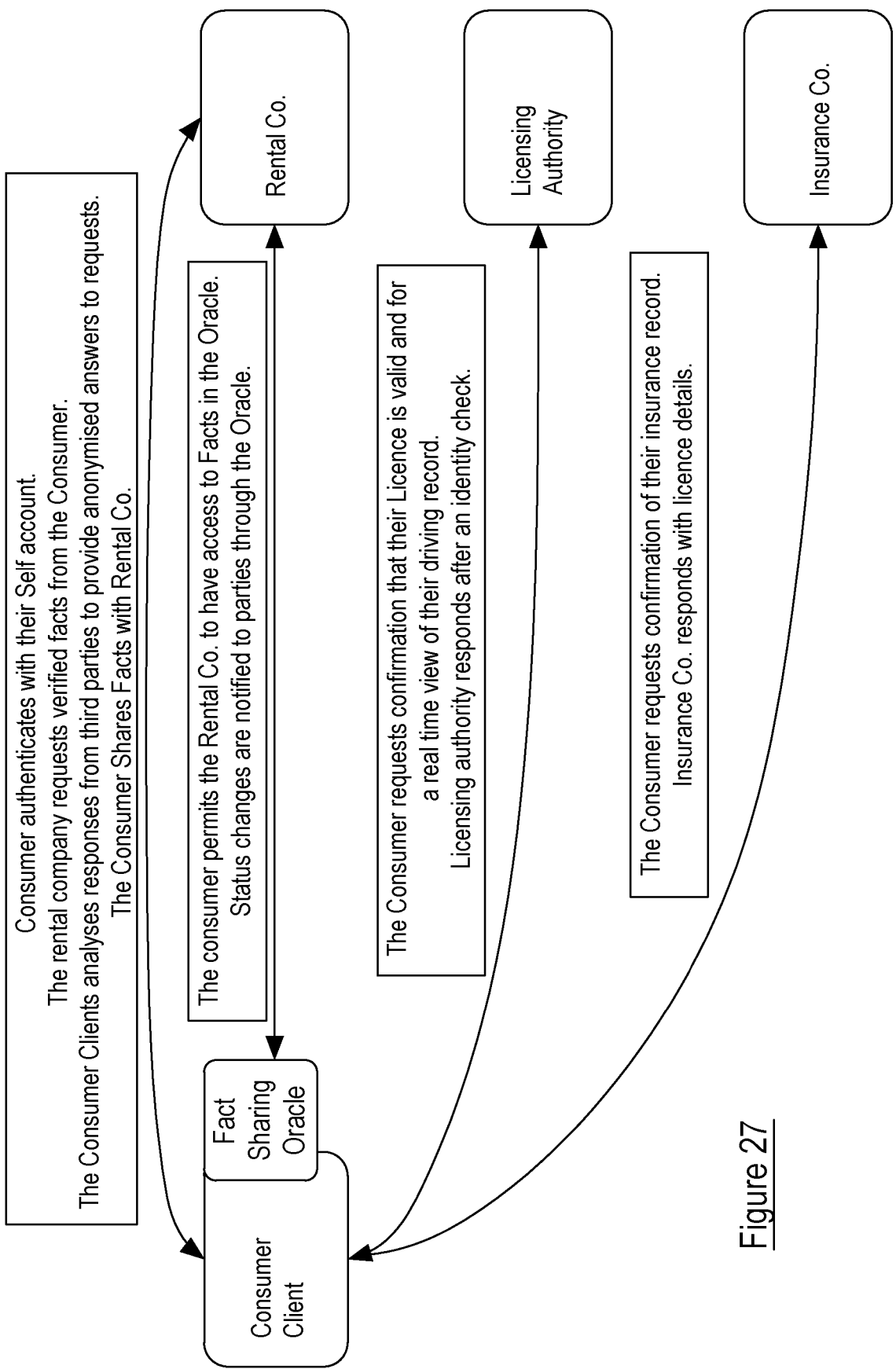
FIG. 27 is a flow diagram of a use case of this disclosure.
Figure 28:
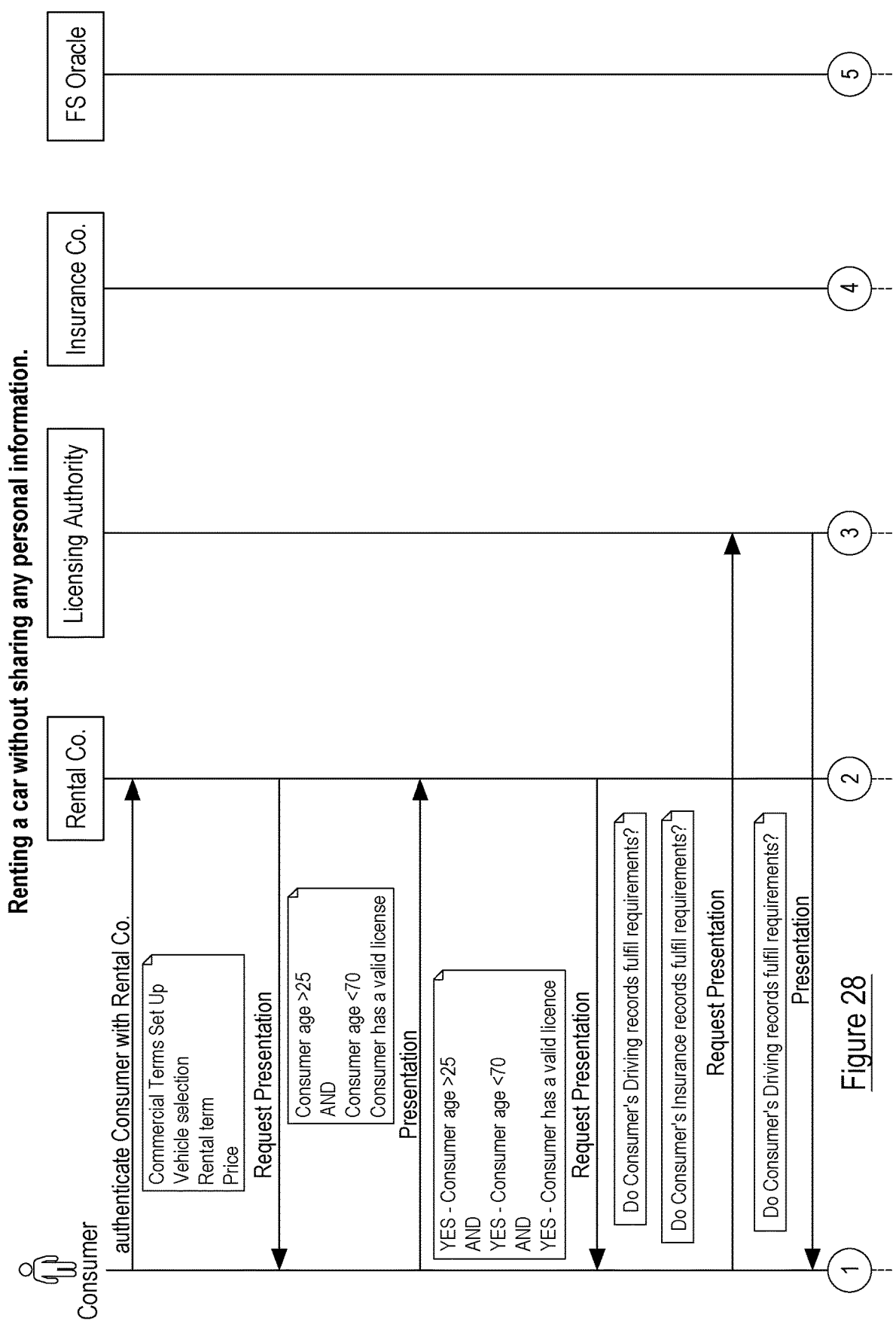
FIG. 28 is a sequence diagram of a use case of this disclosure.
Figure 28:
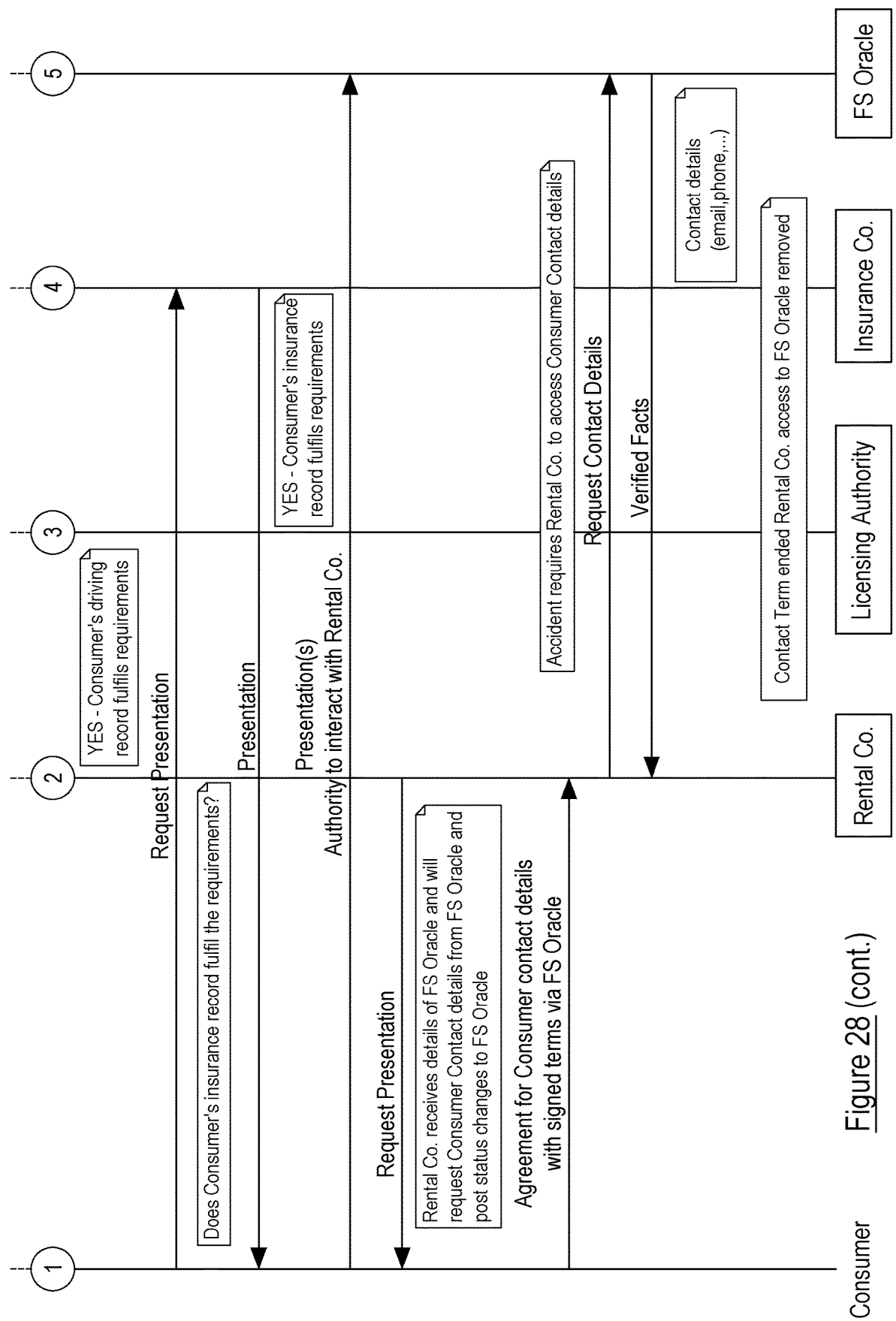

Of course to the customer and the rental company this is all much simpler. The customer signs in without the need for a username and password, selects a car, agrees to share some information and pays for the rental. In less than half the steps they currently have to go through they're ready to drive away and they've needed no paperwork. For the rental company, they have the opportunity of an entirely automated rental process, from booking through to collecting the car with all the cost benefits and efficiencies that entails. They also have access to more accurate information, no card fraud, information they couldn't access before like insurance records—allowing them to develop more bespoke offerings and improve the customer experience. FIGS. 27 and 28 show the flow of information within the Self Network.

The foregoing outlines features of several examples or embodiments so that those of ordinary skill in the art may better understand various aspects of the present disclosure. Those of ordinary skill in the art should appreciate that they may readily use the present disclosure as a basis for designing or modifying other processes and structures for carrying out the same purposes and/or achieving the same advantages of various examples or embodiments introduced herein. Those of ordinary skill in the art should also realise that such equivalent constructions do not depart from the spirit and scope of the present disclosure, and that they may make various changes, substitutions, and alterations herein without departing from the spirit and scope of the present disclosure.

Although the subject matter has been described in language specific to structural features or methodological acts, it is to be understood that the subject matter of the appended claims is not necessarily limited to the specific features or acts described above. Rather, the specific features and acts described above are disclosed as example forms of implementing at least some of the claims.

Various operations of examples or embodiments are provided herein. The order in which some or all of the operations are described should not be construed to imply that these operations are necessarily order dependent. Alternative ordering will be appreciated having the benefit of this description. Further, it will be understood that not all operations are necessarily present in each embodiment provided herein. Also, it will be understood that not all operations are necessary in some examples or embodiments.

Moreover, "exemplary" is used herein to mean serving as an example, instance, illustration, etc., and not necessarily as advantageous. As used in this application, "or" is intended to mean an inclusive "or" rather than an exclusive "or". In addition, "a" and "an" as used in this application and the appended claims are generally be construed to mean "one or more" unless specified otherwise or clear from context to be directed to a singular form. Also, at least one of A and B and/or the like generally means A or B or both A and B. Furthermore, to the extent that "includes", "having", "has", "with", or variants thereof are used, such terms are intended to be inclusive in a manner similar to the term "comprising". Also, unless specified otherwise, "first," "second," or the like are not intended to imply a temporal aspect, a spatial aspect, an ordering, etc. Rather, such terms are merely used as identifiers, names, etc. for features, elements, items, etc. For example, a first element and a second element generally correspond to element A and element B or two different or two identical elements or the same element.

Also, although the disclosure has been shown and described with respect to one or more implementations, equivalent alterations and modifications will occur to others of ordinary skill in the art based upon a reading and understanding of this specification and the annexed drawings. The disclosure comprises all such modifications and alterations and is limited only by the scope of the following claims. In particular regard to the various functions performed by the above described features (e.g., elements, resources, etc.), the terms used to describe such features are intended to correspond, unless otherwise indicated, to any features which performs the specified function of the described features (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

Examples or embodiments of the subject matter and the functional operations described herein can be implemented in digital electronic circuitry, or in computer software, firmware, or hardware, including the structures disclosed in this specification and their structural equivalents, or in combinations of one or more of them.

Some examples or embodiments are implemented using one or more modules of computer program instructions encoded on a computer-readable medium for execution by, or to control the operation of, a data processing apparatus. The computer-readable medium can be a manufactured product, such as hard drive in a computer system or an embedded system. The computer-readable medium can be acquired separately and later encoded with the one or more modules of computer program instructions, such as by delivery of the one or more modules of computer program instructions over a wired or wireless network. The computer-readable medium can be a machine-readable storage device, a machine-readable storage substrate, a memory device, or a combination of one or more of them.

The terms "computing device" and "data processing apparatus" encompass all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, a runtime environment, or a combination of one or more of them. In addition, the apparatus can employ various different computing model infrastructures, such as web services, distributed computing and grid computing infrastructures.

The processes and logic flows described in this specification can be performed by one or more programmable processors executing one or more computer programs to perform functions by operating on input data and generating output.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Devices suitable for storing computer program instructions and data include all forms of non-volatile memory, media and memory devices, including by way of example semiconductor memory devices, e.g., EPROM (Erasable Programmable Read-Only Memory), EEPROM (Electrically Erasable Programmable Read-Only Memory), and flash memory devices; magnetic disks, e.g., internal hard disks or removable disks; magneto-optical disks; and CD-ROM and DVD-ROM disks.

To provide for interaction with a user, some examples or embodiments are implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The computing system can include clients and servers. A client and server are generally remote from each other and typically interact through a communication network. The relationship of client and server arises by virtue of computer programs running on the respective computers and having a client-server relationship to each other. Examples or embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described is this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

In the present specification "comprise" means "includes or consists of" and "comprising" means "including or consisting of".

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilised for realising the invention in diverse forms thereof.

The invention claimed is:

1. A data management system for securely managing data transactions, the system comprising a computing system which incorporates:
   (i) a public key distribution system which is configured to distribute a public key of a public/private key pair for each respective party using the system;
   (ii) a trusted storage system which is in communication with the public key distribution system, the trusted storage system being configured to store a record for each respective party using the system, each record comprising a unique identifier and a public key for a respective party using the system; and
   (iii) a verification system which is in communication with the public key distribution system and the trusted storage system, the verification system being configured to check the identity of a party seeking to participate in a transaction involving an exchange of data, wherein:
   (a) if the verification system is not able to verify the identity of the party seeking to participate in the transaction, the verification system prevents the transaction from being carried out, and (b) if the verification system is able to verify the identity of the party seeking to participate in the transaction, the verification system permits the transaction to be carried out and the trusted storage system stores a transaction record comprising a record of the transaction and a record of the party participating in the transaction, and wherein the verification system is configured to check the identity of a party based on the result of a biometric check:
   further wherein the verification system is configured to calculate a trust score which is indicative of a level of trust between a first party and a second party based on a public key of the second party, wherein the trust score is a first value if the verification system verifies the public key of the second party successfully and the trust score is a second value if the verification system cannot verify the public key of the second party, and the trusted storage system is configured to store the trust score, and wherein the verification system is configured to parse data stored by the trusted storage and generate a graph of nodes corresponding to parties and edges connecting the nodes, each edge representing a trust score of a trust relationship between two nodes, and wherein the verification system is configured to traverse the graph and calculate an aggregated trust score based on trust scores represented by a plurality of the edges, and wherein the verification system is configured to check the identity of human parties based on the result of a biometric check.

2. The system of claim 1, wherein the computing system further comprises:
   (i) a processor;
   (ii) a behavioural data generator which is configured to generate behavioural data in response to the use of the computing system by a party; and
   (iii) a memory storing executable instructions which, when executed by the processor, cause the processor to:
   (a) store, in the memory, a first block of behavioural data which is generated by the behavioural data generator over a first predetermined length of time;
   (b) store, in the memory, a second block of behavioural data which is generated by the behavioural data generator over a second predetermined length of time;
   (c) compare the second block of behavioural data with the first block of behavioural data;
   (d) generate a surety score based on a similarity between the second block of behavioural data and the first block of behavioural data, wherein the surety score is selected from a range of values, one end of the range of values being indicative of the second block of behavioural data being similar to the first block of behavioural data and the other end of the range of values being indicative of the second block of behavioural data being dissimilar to the first block of behavioural data; and
   (e) transmit an output to the verification system for the verification system to check the identity of the party using the computing system, wherein the output is indicative of:
   a verification of the identity of the party if the surety score is beyond a predetermined surety threshold, or a failure in the verification of the party if the surety score is not beyond the predetermined surety threshold.

3. The system of claim 2, wherein the behavioural data generator comprises at least one sensor which is selected from the group consisting of:
   (i) a location sensor configured to sense the geographical location of the computing system;
   (ii) a camera configured to capture still images and/or video;
   (iii) a gyroscope configured to sense an orientation of the computing system; or an
   (iv) accelerometer configured to sense an acceleration of the computing system, and wherein the computing system comprises:
   an encryption system which is configured to encrypt behavioural data generated by the behavioural data generator; and
   a biometrically gated memory which is configured to store encrypted behavioural data generated by the encryption system.

4. The system of claim 2, wherein the behavioural data generator is configured to generate behavioural data selected from the group consisting of:
   (i) walking cadence data indicative of the walking cadence of a user walking while carrying the computing system;
   (ii) typing cadence data indicative of the typing cadence of a user typing characters into a keyboard of the computing system;
   (iii) typing rhythm data statistically derived from the rhythm with which a user enters information into the computing system via a keyboard; or
   (iv) retinal saccade data indicative of a retinal saccade pattern of a user;
   (v) or a video stream containing biometric data; or
   (iv) an audio stream containing biometric data.

5. The system of claim 2, wherein the behavioural data generator is configured to generate behavioural data comprising at least one of:
   (i) operating system analytics data indicative of the use of an operating system of the computing system by a user;
   (ii) application usage data indicative of the use of at least one executable application installed in a memory in the computing system;
   (iii) keystore access data indicative of the access to an encryption key stored in a memory of the computing system;
   (iv) vocabulary usage data indicative of the vocabulary used by a user inputting words into the computing system; or
   (v) transaction data indicative of a transaction performed by the user using the computing system, and wherein the behavioural data generator is configured to generate behavioural data comprising network data by scanning computer networks which are accessible by the computing system.

6. A data management method for securely managing data transactions, the method comprising:
   (i) distributing, using a public key distribution system, a public key of a public/private key pair for each respective party involved in a transaction;
   (ii) storing a unique identifier and a public key for each respective party in a trusted storage system; and
   checking the identity of a party seeking to participating in a transaction involving an exchange of data, wherein: if the identity of the party seeking to participate in the transaction cannot be verified, the method prevents the transaction from being carried out; but if the identity of the party seeking to participate in the transaction can be verified, the method permits the transaction to be carried out, and the method stores a transaction record comprising a record of the transaction and a record of the party participating in the transaction,
      wherein the method further comprises: providing a trusted agent which is identified by a trusted agent identifier, the trusted agent identifier being pseudonymous or anonymous with respect to a party seeking to participate in a transaction;
   and wherein the method further comprises:
   (i) providing, on behalf of the party, an output from the trusted agent in relation to the transaction,
   (ii) performing pattern recognition on a party;
   (iii) generating pattern recognition data; and
   (iv) verifying the generated pattern recognition data at the trusted agent by transmitting a query based on the generated pattern recognition data to the trusted agent, and wherein the method further comprises:
   (i) training a pattern recognition model for a party by repeatedly:
   (ii) performing pattern recognition on a party;
   (iii) generating pattern recognition data; and
   (iv) verifying the generated pattern recognition data at the trusted agent by transmitting a query based on the generated pattern recognition data to the trusted agent, wherein the pattern recognition data is historical data and wherein the training data is live data,
      and further, wherein the method comprises performing at least one type of pattern recognition selected from a group consisting of:
   (i) fingerprint recognition,
   (ii) voice recognition,
   (iii) facial recognition, or
   (iv) retinal saccade pattern recognition;
   and wherein the method comprises: calculating a trust score which is indicative of a level of trust between a first party and a second party based on a public key of the second party, wherein the trust score is a first value if the method verifies the public key of the second party successfully, and the trust score is a second value if the method cannot verify the public key of the second party, wherein the method further comprises storing the trust score in the trusted storage system.

7. The method of claim 6, wherein the method comprises: parsing data stored by the trusted storage; and generating a graph of nodes corresponding to parties and edges connecting the nodes, wherein each edge represents a trust score of a trust relationship between two nodes, and wherein the method further comprises traversing the graph and calculating an aggregated trust score based on trust scores represented by a plurality of the edges.

8. The method of claim 6 wherein the method comprises:
   (i) storing, in a memory, a first block of behavioural data which is generated by a behavioural data generator of a computing system in response to the use of the computing system by a party over a first predetermined length of time;
   (ii) storing, in the memory, a second block of behavioural data which is generated by the behavioural data generator of the computing system in response to the use of the computing system over a second predetermined length of time;
   (iii) comparing the second block of behavioural data with the first block of behavioural data;
   (iv) generating a surety score based on a similarity between the second block of behavioural data and the first block of behavioural data, wherein the surety score is selected from a range of values, one end of the range of values being indicative of the second block of behavioural data being similar to the first block of behavioural data, and the other end of the range of values being indicative of the second block of behavioural data being dissimilar to the first block of behavioural data; and
   (v) providing an output which is indicative of a verification of the identity of the party if the surety score is beyond a predetermined surety threshold, or a failure in the verification of the party if the surety score is not beyond the predetermined surety threshold.

* * * * *